United States Patent
Aikawa et al.

(10) Patent No.: US 6,453,064 B1
(45) Date of Patent: *Sep. 17, 2002

(54) COMMON STRUCTURE EXTRACTION APPARATUS

(75) Inventors: Seiichi Aikawa; Fumiko Matsuzawa; Mayumi Tomikawa, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/390,862

(22) Filed: Feb. 17, 1995

(30) Foreign Application Priority Data

Feb. 28, 1994 (JP) .............................................. 6-030157
Jan. 26, 1995 (JP) ............................................. 7-010805

(51) Int. Cl.[7] .................................................. G06K 9/00
(52) U.S. Cl. ....................... 382/154; 382/128; 382/209; 382/305; 702/19
(58) Field of Search ............................... 382/129, 201, 382/209, 216, 217, 218, 219, 224, 225, 226, 228, 294, 154, 128, 305; 395/113, 115, 116, 119; 345/135, 139, 629, 653, 664, 679, 630; 364/496; 702/19

(56) References Cited

U.S. PATENT DOCUMENTS

| | | | |
|---|---|---|---|
| 4,881,175 A | * 11/1989 | Ladner | 364/496 |
| 5,025,388 A | * 6/1991 | Cramer, III et al. | 364/496 |
| 5,058,200 A | * 10/1991 | Huang et al. | 455/33 |
| 5,265,030 A | * 11/1993 | Skolnick et al. | 364/496 |
| 5,436,850 A | * 7/1995 | Eisenberg et al. | 364/496 |
| 5,568,384 A | * 10/1996 | Robb et al. | 382/132 |

FOREIGN PATENT DOCUMENTS

| | | | | |
|---|---|---|---|---|
| JP | 62-044897 | * | 2/1987 | G06K/9/02 |
| JP | 63-259598 | * | 10/1988 | G10L/3/00 |
| JP | 4-45781 | * | 2/1992 | C12M/1/00 |
| JP | 5-219932 | * | 8/1993 | C12M/1/00 |

OTHER PUBLICATIONS

Itai et al., "Present state of the medicine molecular design using the computer", Pharmacy Library, vol. 36, No. 1, 1991, pp. 10–23.*

Vriend et al.; "Detection of Common Three–Dimensional Substructures in Proteins"; Proteins, Structure, Function, and Genetics; No. 1, 1991.*

Itai & Tomioka; "Computer Graphics Directing to Lead Generation"; Extra Issue of "Contemporary Chemistry", vol. 13, 1987, pp. 57–72.*

Alexandrov et al.; Common Spatial Arrangements of Backbone Fragments in Homogous and Non–homologous Proteins; Journal of Mol. Biol., vol. 225, No. 1, May 5, 1992.*

(List continued on next page.)

*Primary Examiner*—Timothy M. Johnson
(74) *Attorney, Agent, or Firm*—Staas & Halsey, LLP

(57) ABSTRACT

The invention provides an apparatus for extracting a common structure from two three-dimensional structures each formed from a set of sequenced points. The apparatus is constructed so as to extract one of common portions with which the common portion length of the two point sets superposed with each other exhibits a greatest length and the cumulative sum of distances between matched points of the two point sets superposed with each other exhibits a lowest value as an optimum common structure. The common structure extraction apparatus is suitably used to analyze a molecular structure to make clear a mechanism for manifestation of a function of a substance in order to investigate a property of a novel substance such as a protein or artificially produce a novel substance in the fields of physics, chemistry and so forth.

38 Claims, 59 Drawing Sheets

OTHER PUBLICATIONS

N. Alexandrov et al., "Common Spatial Arrangements of Backbone Fragments in Homologous and Non–homologous Proteins", Journal of Molecular Biology, vol. 25, No. 1, 1992, pp. 5–9.*

G. Vriend et al., "Detection of Common Three–Dimensional Substructures in Proteins", European Molecular Biology Laboratory, 1991, pp. 52–58.*

* cited by examiner

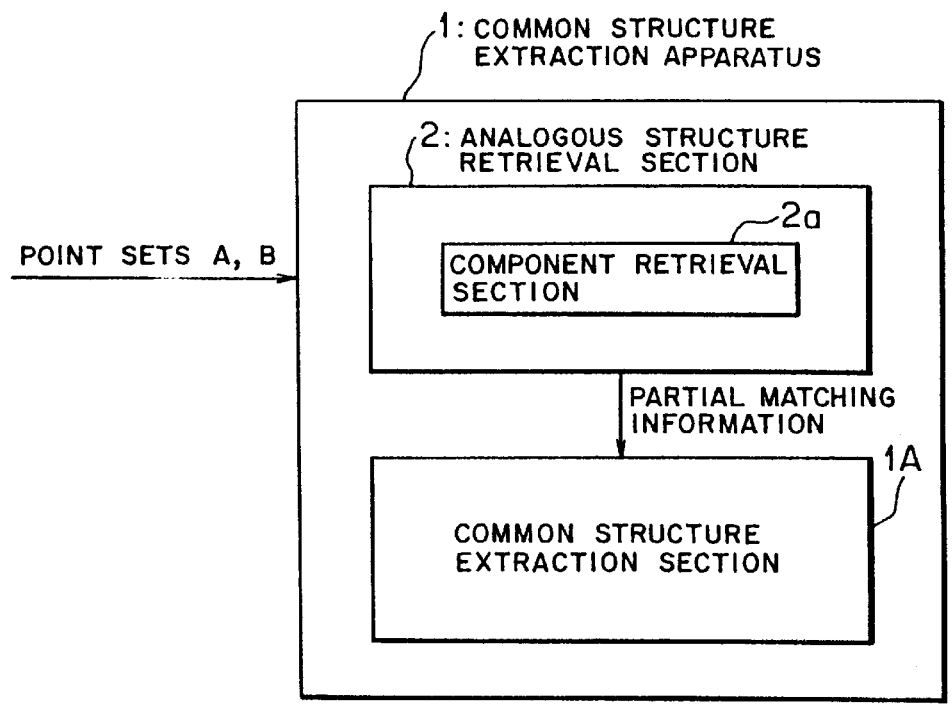
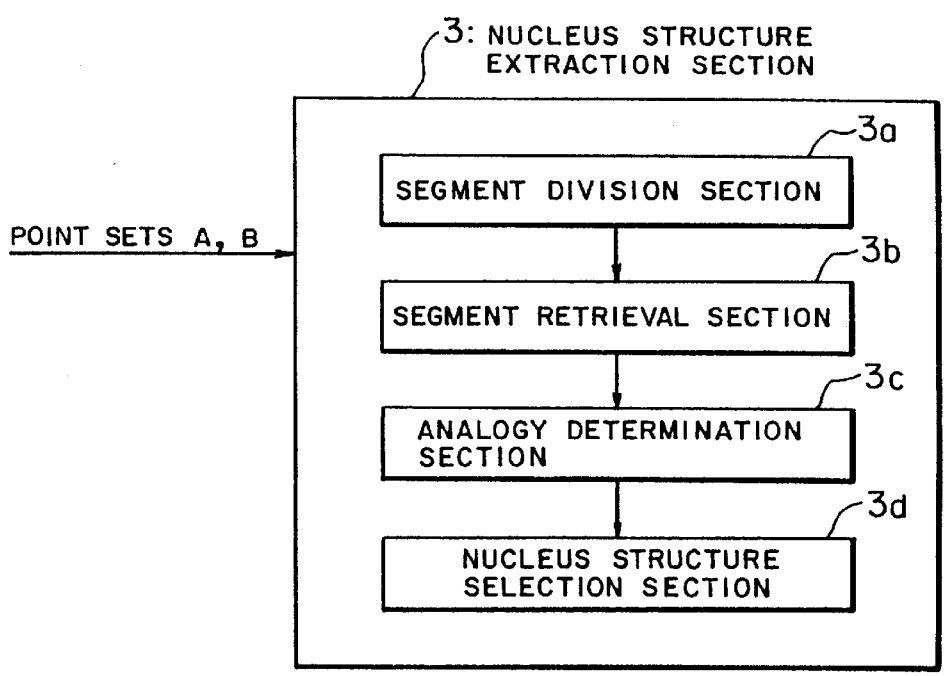

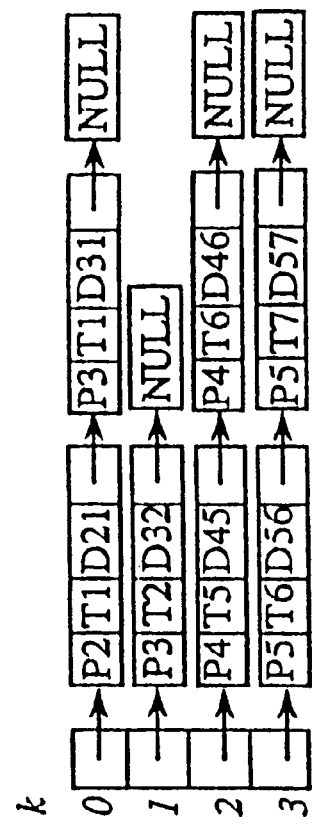
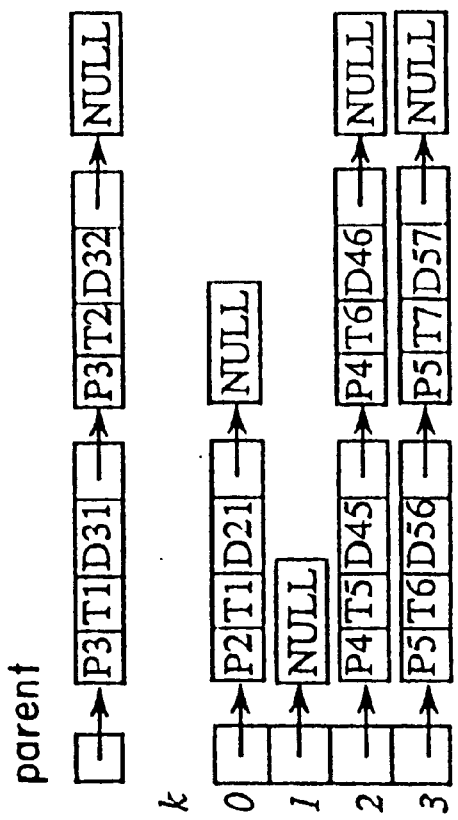
FIG. 12(a)
FIG. 12(b)

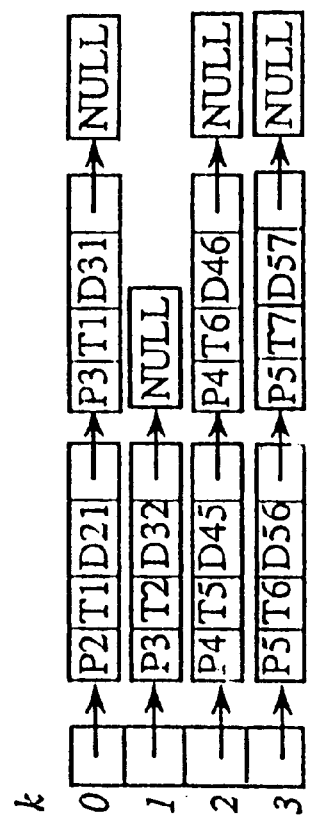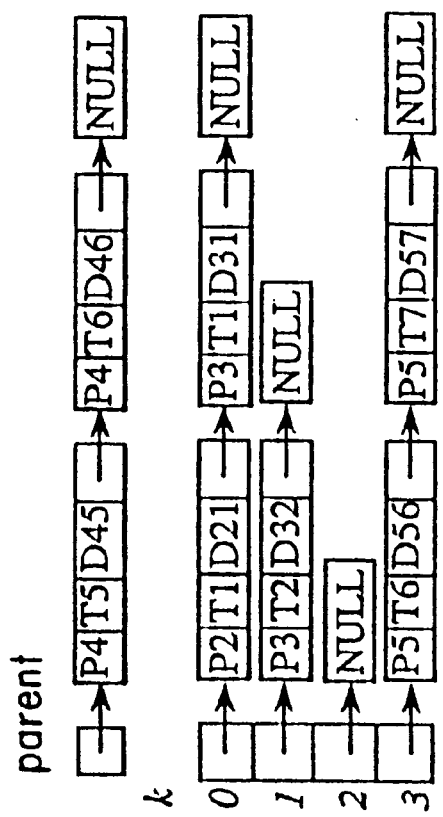
FIG. 13(a)
FIG. 13(b)

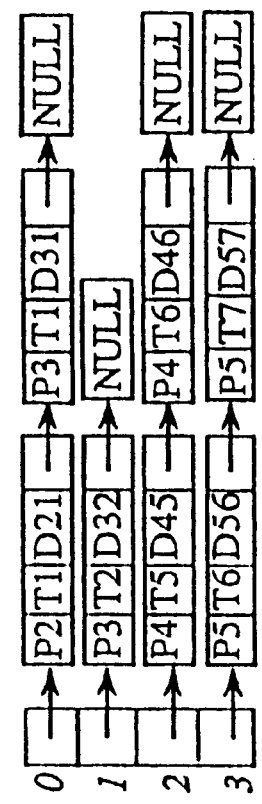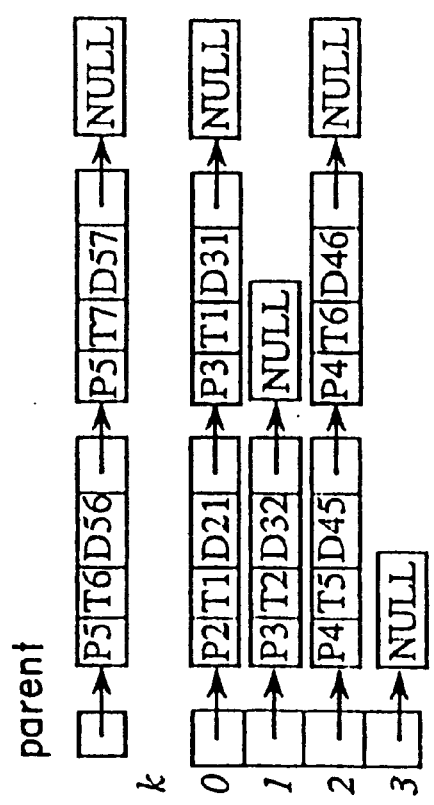
FIG. 14(a)
FIG. 14(b)

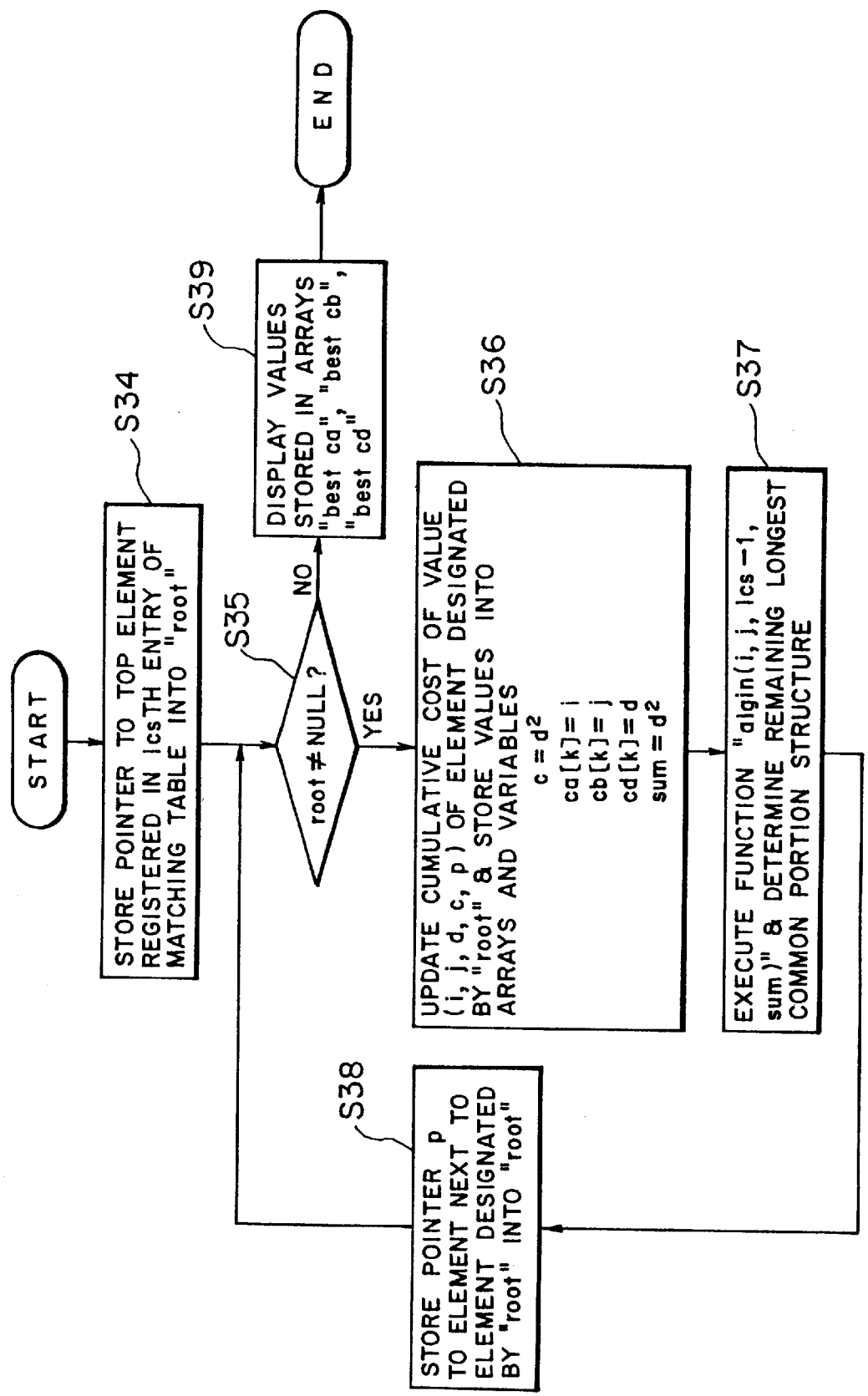

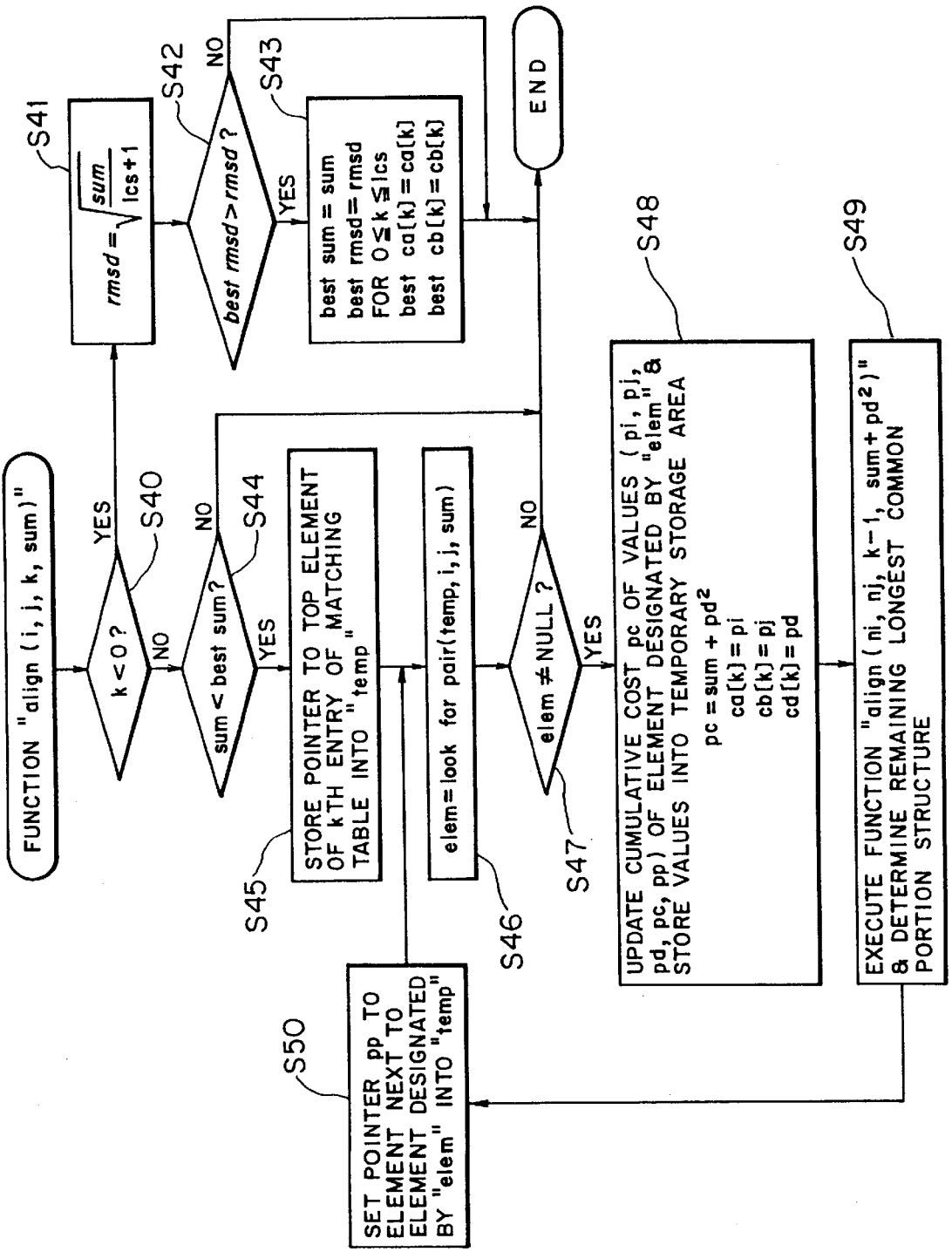

PROTEIN PA

PROTEIN PA

PROTEIN PB

PROTEIN PA

PROTEIN PB

SEGMENT 3

PROTEIN PA

ANALOGOUS STRUCTURE 2

PROTEIN PB

NUCLEUS STRUCTURE AO + SEGMENT 3

NUCLEUS STRUCTURE BO + ANALOGOUS STRUCTURE 2

SEGMENT 4

PROTEIN PA

PROTEIN PB

EACH BLANK SPACE DENOTES "0"

```
THRESHOLD  rmsd= 1.5, nil= 0, CONSTRAINT Distance:error= 10 ,Probe: 4ptp: 33-41, Target: 2alp
  29  30  31  32  33  34  35  36  37  ( serial )
   K   G   F   V   T   A   G   H   C  < target >
   Q   W   V   V   S   A   A   H   C  < probe  >
  33  34  35  36  37  38  39  40  41  ( serial)
rmsd = 0.483
```

FIG. 51 probe= 9, target= 198, combination= 2 Best rmsd= 0.483, Time= 1sec

```
  1   2   3   4   5   6   7   8   9  10  11  12  13  14  15  16  17  18  19  20  (serial)
  I   V   G   G   Y   T   C   G   A   N   T   V   P   Y   Q   V   S   L   N   S  <probe>
                                                                                    <target>
 21  22  23  24  25  26  27  28  29  30  31  32  33  34  35  36  37  38  39  40  (serial)
  G   Y   H   F   C   G   V   S   L   I   N   S   Q   W   V   V   S   A   A   H  <probe>
              L   C           K   G   F   V   V   T   A   A   H  <target>
             16  17  18  19          29  30  31  32  33  34  35  36  (serial)
         0.23 0.33 0.62 1.28      0.64 1.07 0.52 0.18 0.34 0.08 0.08 0.26  (distance)
 41  42  43  44  45  46  47  48  49  50  51  52  53  54  55  56  57  58  59  60  (serial)
  C   Y   K   S   G   I   Q   V   R   L   G   E   D   N   I   N   V   V   E   G  <probe>
  C   G                                                                          <target>
 37  38                                                                          (serial)
0.19 0.95                                                                        (distance)
 61  62  63  64  65  66  67  68  69  70  71  72  73  74  75  76  77  78  79  80  (serial)
  N   E   Q   F   I   S   A   S   K   S   I   V   H   P   S   Y   N   S   N   T  <probe>
                          G   R                                                  <target>
                         52  57                                                  (serial)
                       1.32 0.48 0.48                                            (distance)
 81  82  83  84  85  86  87  88  89  90  91  92  93  94  95  96  97  98  99 100  (serial)
  L   N   N   D   I   M   L   I   K   L   K   S   A   A   S   L   N   S   R   V  <probe>
      N   D   D   I   M   A   V   S   L   S   S   A   T   S   C   V   S   A   H  <target>
     62  63  64  65  66  67  68  69  71                                          (serial)
   1.49 0.59 0.76 0.24 0.85 0.90 0.63 0.65 1.45                                  (distance)
101 102 103 104 105 106 107 108 109 110 111 112 113 114 115 116 117 118 119 120  (serial)
  A   S   I   S   L   P   T   S   C   A   S   A   G   T   Q   C   L   I   S   G  <probe>
  L       S   L   P       S       A   A                       L   I   R   S      <target>
 76      91      S  94  95                                   102 103              (serial)
0.89    1.21    1.14                                       1.22 1.24             (distance)
```

FIG. 52

```
121 122 123 124 125 126 127 128 129 130 131 132 133 134 135 136 137 138 139 140   (serial)
 W   G   N   T   K   S   S   G   T   S   Y   P   D   V   L   K   C   L   K   A   <probe>
                                                         Y   Q          <target>
             105 106                                         109 110              (serial)
             1.37 1.46                                       1.41 1.38             (distance)

141 142 143 144 145 146 147 148 149 150 151 152 153 154 155 156 157 158 159 160   (serial)
 P   I   L   S   D   S   S   C   K   S   A   Y   P   G   Q       I   T   N   M   <probe>
                                                     V                    L      <target>
                                                     119             131         (serial)
                                                     1.41            1.07        (distance)

161 162 163 164 165 166 167 168 169 170 171 172 173 174 175 176 177 178 179 180   (serial)
 F   C   A   G   Y   L   E   G   G   K   D   S   C   Q   G   D   S   G   G   P   <probe>
 T   Q   G                           C   M   G   K   G   D   S   G   G   S      <target>
 132 133 134                         137 138 139 140 141 142 143 144 145 146     (serial)
 1.04 1.22 1.42                      0.70 0.86 0.43 0.53 0.66 0.61 0.57 0.36 0.53 0.39 (distance)

181 182 183 184 185 186 187 188 189 190 191 192 193 194 195 196 197 198 199 200   (serial)
 V   V   I   S   G   K   L   Q   Q   G   I   V   S   W   G   S   C   A   Q   K   <probe>
         T           G       Q           V   M   S   G   N       V               <target>
         152         155                 157 158 159 160 161 162 163             (serial)
         1.13        0.38                0.70 0.91 0.67 0.54 0.68 1.36 1.25        (distance)

201 202 203 204 205 206 207 208 209 210 211 212 213 214 215 216 217 218 219 220   (serial)
 N   K   P   G   V   Y   T   K   V   C   N   Y   V   S   W   I   K   Q   T   I   <probe>
 Q                                   P           Q                                <target>
 176                                 186         190                              (serial)
 1.30                                0.88        1.42                             (distance)

221 222 223   (serial)
 A   S   N   <probe>
             <target>

The number of matched residues = 72 (0.945)
```

FIG. 56 probe = tape 10/pdb 4ptp.ent(TRYPSIN)  target = tape 3/pdb 3est.ent(ELASTASE)

The number of residues in a probe = 9

```
38  39  40  41  42  43  44  45  46   ( serial )
N   W   V   M   T   A   A   H   C    < target >
Q   W   V   V   S   A   A   H   C    < probe >
33  34  35  36  37  38  39  40  41   ( serial )
0.2 0.1 0.1 0.3 0.1 0.1 0.1 0.2 0.1  (distance)
0.174
```

```
 1    2    3    4   5   6    7    8    9   10   11   12   13   14   15   16   17   18   19   20   ( serial )
 I    V    G    G   Y   T    C    G    A   N    T    V    P    Y    Q    V    S    L    N    S    < probe >
 V    V    G                 E    A    Q   R         S    W    P    S    Q    I    S    L    Q    Y    < target >
 1    2    3                 6    7    8   9        11   12   13   14   15   16   17   18   19   20   ( serial )
0.85 1.13 1.47              1.29 1.18 0.97 1.31     1.06 0.25 0.20 0.14 0.11 0.12 0.16 0.49 0.80 0.81 (distance)
```

```
21   22   23   24   25   26   27   28   29   30   31   32   33   34   35   36   37   38   39   40   ( serial )
G    Y    H    F    C    G    G    S    L    I    N    S    Q    W    V    V    S    A    A    H    < probe >
W    A    H    T    C    G    G    T    L    I    R    Q    N    W    V    M    T    A    A    H    < target >
26   27   28   29   30   31   32   33   34   35   36   37   38   39   40   41   42   43   44   45   ( serial )
1.19 0.52 0.31 0.32 0.26 0.30 0.14 0.14 0.07 0.24 0.80 0.24 0.24 0.13 0.12 0.27 0.13 0.11 0.08 0.25 (distance)
```

```
41   42   43   44   45   46   47   48   49   50   51   52   53   54   55   56   57   58   59   60   ( serial )
C    Y    K    S    G    I    Q    V    R    L    G    E    D    N    I    N    V    V    E    G    < probe >
C    V              T    F    R    V    V    V    G    E    H    N    L    N    Q    N    N    G    < target >
46   47              52   53   54   55   56   57   58   59   60   61   62   63   64   65   66   67   ( serial )
0.12 0.32           1.21 0.59 0.65 0.23 0.39 0.36 0.23 0.45 0.51 0.23 0.96 0.92 0.67 1.27 0.94 0.47 (distance)
```

FIG. 57

| 61 | 62 | 63 | 64 | 65 | 66 | 67 | 68 | 69 | 70 | 71 | 72 | 73 | 74 | 75 | 76 | 77 | 78 | 79 | 80 | ( serial ) |
|---|---|---|---|---|---|---|---|---|---|---|---|---|---|---|---|---|---|---|---|---|
| N | E | Q | F | I | S | A | S | K | S | I | V | H | P | S | Y | N | S | N | T | < probe > |
| T | E | Q | Y | V | G | V | Q | K | I | V | V | H | P | Y | W | | | | | < target > |
| 68 | 69 | 70 | 71 | 72 | 73 | 74 | 75 | 76 | 77 | 78 | 79 | 80 | 81 | 82 | 83 | | | | | ( serial ) |
| 0.34 | 0.28 | 0.20 | 0.35 | 0.26 | 0.35 | 0.51 | 0.62 | 0.76 | 0.69 | 0.78 | 0.64 | 0.59 | 0.64 | 0.53 | 0.44 | | | | | (distance) |

| 81 | 82 | 83 | 84 | 85 | 86 | 87 | 88 | 89 | 90 | 91 | 92 | 93 | 94 | 95 | 96 | 97 | 98 | 99 | 100 | ( serial ) |
|---|---|---|---|---|---|---|---|---|---|---|---|---|---|---|---|---|---|---|---|---|
| L | N | N | D | I | M | L | I | K | L | K | S | A | A | S | L | N | S | R | V | < probe > |
| G | Y | D | I | A | L | L | R | L | A | Q | S | V | T | L | N | S | Y | V | | < target > |
| 91 | 92 | 93 | 94 | 95 | 96 | 97 | 98 | 99 | 100 | 101 | 102 | 103 | 104 | 105 | 106 | 107 | 108 | 109 | | ( serial ) |
| 1.39 | 0.24 | 0.28 | 0.15 | 0.29 | 0.32 | 0.32 | 0.60 | 0.62 | 0.50 | 0.57 | 0.21 | 0.26 | 0.14 | 0.29 | 0.84 | 1.43 | 1.17 | 0.14 | | (distance) |

| 101 | 102 | 103 | 104 | 105 | 106 | 107 | 108 | 109 | 110 | 111 | 112 | 113 | 114 | 115 | 116 | 117 | 118 | 119 | 120 | ( serial ) |
|---|---|---|---|---|---|---|---|---|---|---|---|---|---|---|---|---|---|---|---|---|
| A | S | I | S | L | P | T | S | C | A | S | A | G | T | Q | C | L | I | S | G | < probe > |
| | | | | Q | L | G | | | P | R | T | | | | | | I | T | G | < target > |
| | | | | 110 | 111 | 112 | | | 115 | 116 | | | | 119 | | | 129 | 130 | 131 | ( serial ) |
| | | | | 0.35 | 0.42 | 0.80 | | | 1.47 | 1.19 | | | | 1.21 | | | 1.32 | 0.42 | 0.34 | (distance) |

| 121 | 122 | 123 | 124 | 125 | 126 | 127 | 128 | 129 | 130 | 131 | 132 | 133 | 134 | 135 | 136 | 137 | 138 | 139 | 140 | ( serial ) |
|---|---|---|---|---|---|---|---|---|---|---|---|---|---|---|---|---|---|---|---|---|
| W | G | N | T | K | S | S | G | T | S | Y | P | D | V | L | K | C | L | K | A | < probe > |
| W | G | L | T | R | | | G | | | | A | Q | T | L | Q | Q | | | | < target > |
| 132 | 133 | 134 | 135 | 136 | | | 139 | | | | 142 | 143 | 144 | 145 | 146 | 147 | | | | ( serial ) |
| 0.49 | 0.83 | 0.99 | 1.39 | 1.40 | | | 0.84 | | | | 1.20 | 0.50 | 0.67 | 0.52 | 0.69 | 0.85 | | | | (distance) |

FIG. 58

```
141 142 143 144 145 146 147 148 149 150 151 152 153 154 155 156 157 158 159 160  ( serial )
 P   I   L   S   D   S   S   C   K   S   A   Y   P   G   Q   I   T   S   N   M  < probe >
             V   D   Y   A   I   C   S   S                   T                M  < target >
            153 154 155 156 157 158 159 160                 167              172  ( serial )
           1.33 1.34 0.70 1.13 1.09 1.16 0.79 1.36          1.46             1.04 (distance)

161 162 163 164 165 166 167 168 169 170 171 172 173 174 175 176 177 178 179 180  ( serial )
 F   C   A   G   Y   L   E   G   G   K   D   S   C   Q   G   D   S   G   G   P  < probe >
     C   A   G                           V   R   S   C   Q   G   D   S   G   G   P  < target >
    174 175 176                         180 181 182 183 184 185 186 187 188 189 190 191 ( serial )
    1.01 1.15 1.20                      1.13 1.20 1.06 0.65 0.67 0.90 0.64 0.32 0.15 0.11 0.20 0.47 (distance)

181 182 183 184 185 186 187 188 189 190 191 192 193 194 195 196 197 198 199 200  ( serial )
 V   V   C   S   G   K   L   Q   G   I   V   S   W   G   S   G   C   A   Q   K  < probe >
 L                           H   G   V   T   S   F       S           C   N   V   T  < target >
192                         203 204 205 206 207 208     210          214 215 216 217 ( serial )
1.18                        1.07 0.85 0.24 0.16 0.15 0.66 0.34        1.03 1.38 0.43 1.01 (distance)

201 202 203 204 205 206 207 208 209 210 211 212 213 214 215 216 217 218 219 220  ( serial )
 N   K   P   G   V   Y   T   K   V   C   N   Y   V   S   W   I   K   Q   T   I  < probe >
 R   K   P   T   V   F   T   R   V   S   A   Y   I   S   W   I   N   N   V   I  < target >
218 219 220 221 222 223 224 225 226 227 228 229 230 231 232 233 234 235 236 237  ( serial )
0.93 0.49 0.47 0.77 0.73 0.54 0.28 0.90 0.76 0.86 1.23 0.88 0.91 0.83 0.99 0.93 0.87 1.06 0.65 0.73 (distance)

221 222 223  ( serial )
 A   S   N  < probe >
 A   S   N  < target >
238 239 240  ( serial )
1.30 1.49 1.12 (distance)   The number of matched residues = 171(0.784)
```

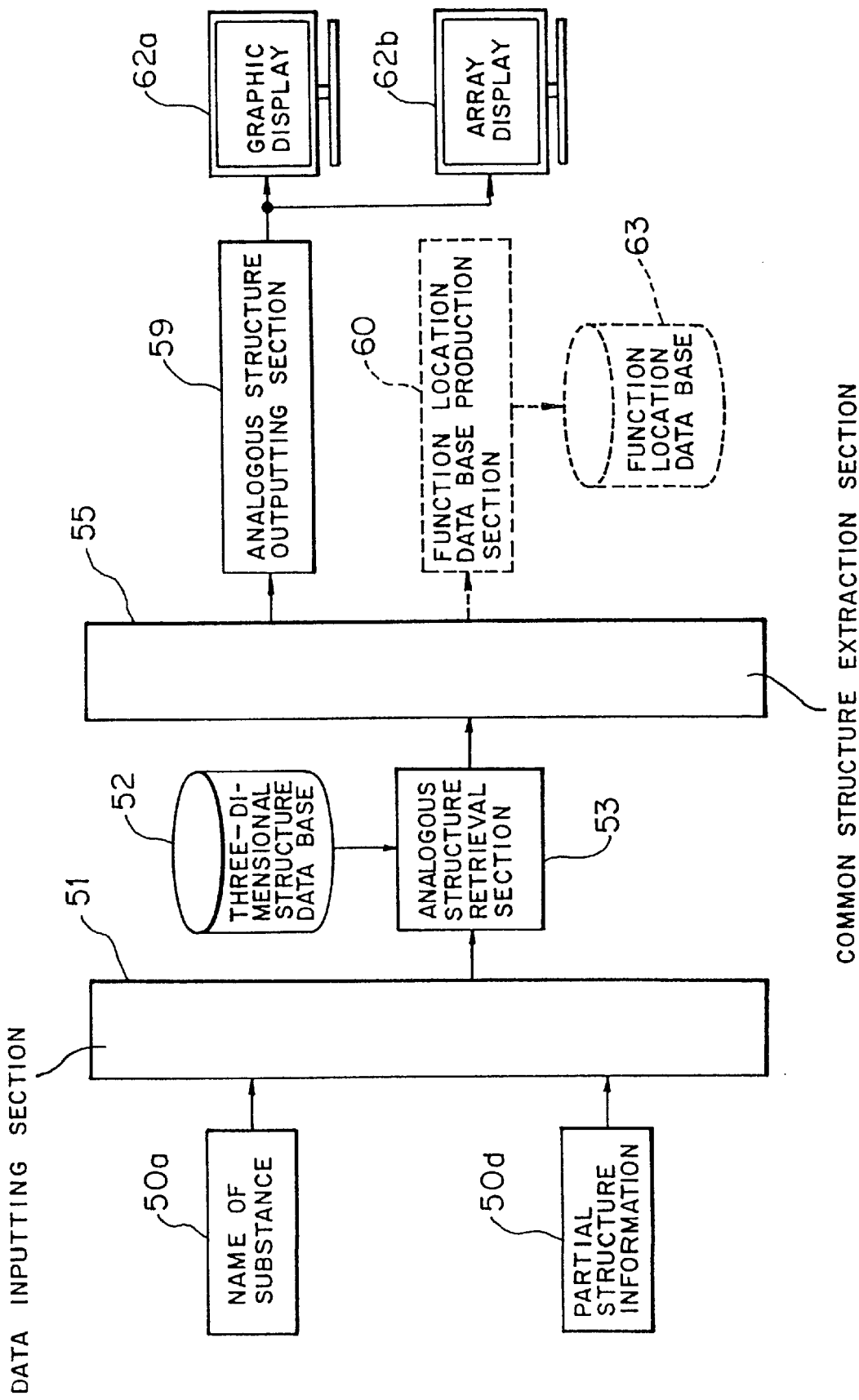

Method:comb
THRESHOLD rmsd= 1.2, nil= 0
CONSTRAINT Distance:error= 25

FIG. 60

Probe: /usr/local/grease/db/pdb/distr/tape10/pdb4ptp.ent: 33-41

Target: /usr/local/grease/db/pdb/distr/tape1/pdb2alp.ent

```
  18 145 146 147 148 149 150 151 152  ( serial )
   S   G   S   W   I   T   S   A   G  < target >
   Q   W   V   V   S   A   A   H   C  < probe  >
  33  34  35  36  37  38  39  40  41  ( serial )
rmsd = 0.769, lcs = 10

29  30  31  32  33  34  35  36  37  ( serial )
   K   G   F   V   T   A   G   H   C  < target >
   Q   W   V   V   S   A   A   H   C  < probe  >
  33  34  35  36  37  38  39  40  41  ( serial )
rmsd = 0.483, lcs = 72

65  66  67  68  69  70  71  72  73  ( serial )
   A   W   V   S   L   T   S   A   Q  < target >
   Q   W   V   V   S   A   A   H   C  < probe  >
  33  34  35  36  37  38  39  40  41  ( serial )
rmsd = 1.164, lcs = 10

144 145 146 147 148 149 150 151 152  ( serial )
   G   G   S   W   I   T   S   A   G  < target >
   Q   W   V   V   S   A   A   H   C  < probe  >
  33  34  35  36  37  38  39  40  41  ( serial )
rmsd = 1.195, lcs = 7
``` probe= 9, target= 198, combination= 30 Best rmsd= 0.483
Time= 2sec

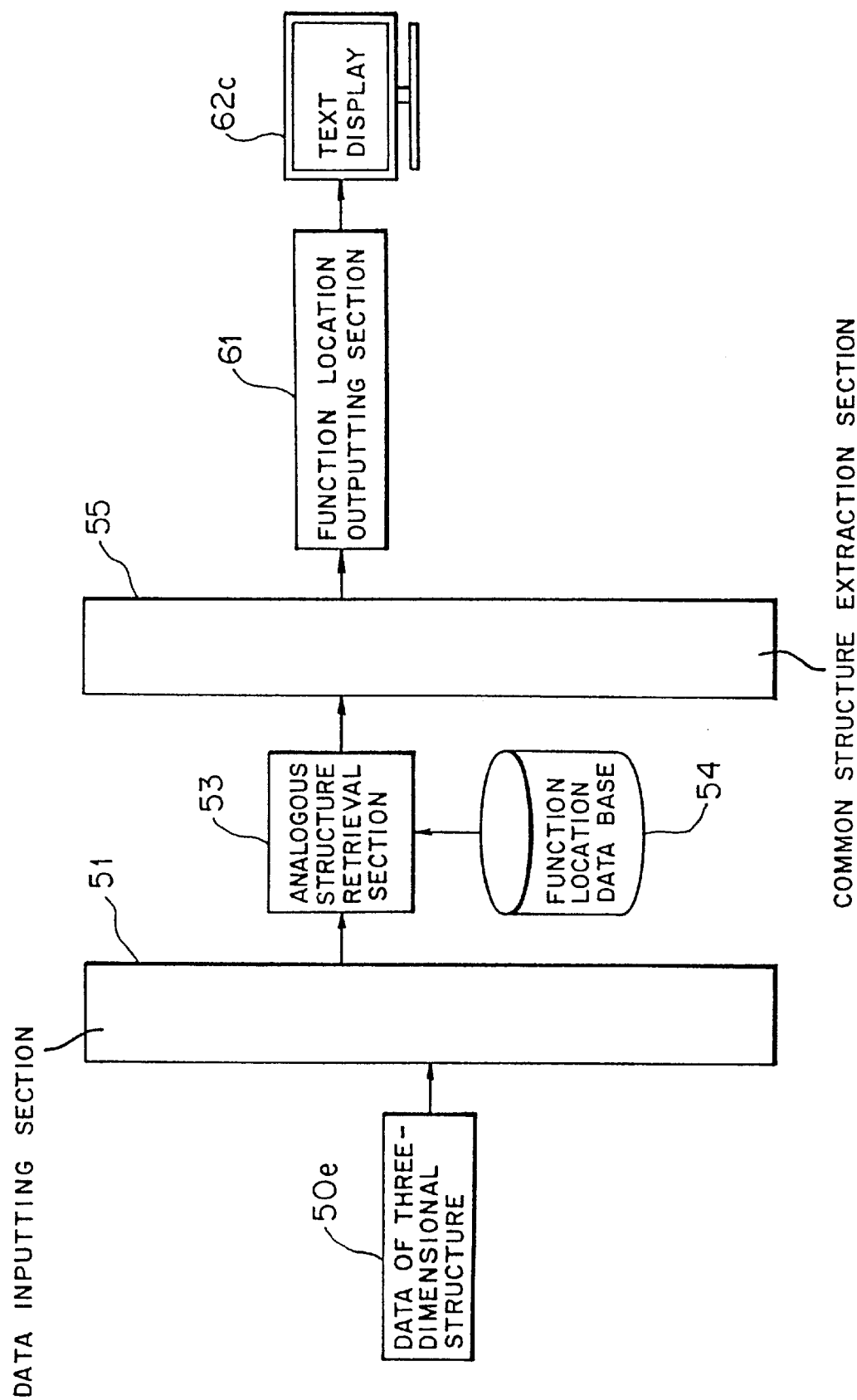

FIG. 62

```
The number of residues in a probe = 11
  15  16  17  18  19  20  21  22  92  93  94   ( serial )
   G   G   P   G   S   G   K   G   I   D   G   < target >
   G   A   G   G   V   G   K   S   L   D   T   < probe >
  10  11  12  13  14  15  16  17  56  57  58   ( serial )
   -   -  10.2 22.2 22.5  -   -   -   -   -   -
   -   -   -   -   -  22.4                     ( angle )
  0.8 0.7 0.7 0.3 0.7 0.4 0.4 0.4 0.1 0.6 1.0  (distance)
0.600

1   2   3   4   5   6   7   8   9  10  11  12  13  14  15  16  17  18  19  20   ( serial )
   M   T   E   Y   K   L   V   V   V   G   A   G   V   G   K   S   A   L   T       < probe >
               S   K   I   I   F   V   V   G   G   P   G   S   G   K   G   T   Q   C   < target >
               8   9  10  11  12  13  14  15  16  17  18  19  20  21  22  23  24  25   ( serial )
              2.76 1.38 0.34 0.27 0.62 0.50 0.47 0.80 0.73 0.67 0.29 0.66 0.36 0.40 0.35 0.72 0.40 0.34   (distance)

21  22  23  24  25  26  27  28  29  30  31  32  33  34  35  36  37  38  39  40   ( serial )
   I   Q   L   I   Q   N   H   F   V   D   E   Y   D   P   T   I   E   D   S   Y   < probe >
   E   K   I   V                                                   S               < target >
  26  27  28  29                                                  38               ( serial )
  0.84 2.07 2.20 1.46                                              0.84             (distance)

41  42  43  44  45  46  47  48  49  50  51  52  53  54  55  56  57  58  59  60   ( serial )
   R   K   Q   V   V   I   D   G   E   T   C   L   L   D   I   L   D   T   A   G   < probe >
                                           K   G   F   L   I   D   G               < target >
                                          88  89  90  91  92  93  94               ( serial )
                                          1.48 1.87 0.57 0.63 0.12 0.61 1.01        (distance)

61  62  63  64  65  66  67  68  69  70  71  72  73  74  75  76  77  78  79  80   ( serial )
   Q   E   E   Y   S   A   H   R   D   Q   Y   H   R   T   G   E   G   F   L   C   < probe >
                           E   K   Q           G           P   T   L   L   L   Y   < target >
                          98 100 101         102         112 113 114 115 116 117   ( serial )
                         2.65 2.82 2.52      2.95        2.22 2.23 0.95 0.73 0.87 0.68  (distance)
```

FIG. 63

```
 81  82  83  84  85  86  87  88  89  90  91  92  93  94  95  96  97  98  99 100   ( serial )
  V   F   A   I   N   N   T   K   S   F   E   D   I   H   Q   Y   R   E   Q   I   < probe >
  V   D   A               G   P                           E           I   A       < target >
 118 119 120             121 122                         158         161 162       ( serial )
0.61 2.09 2.80          2.87 2.62                       2.48        2.23 1.68      (distance)

101 102 103 104 105 106 107 108 109 110 111 112 113 114 115 116 117 118 119 120   ( serial )
  K   R   V   K   D   S   D   D   V   P   M   V   L   V   G   N   K   C   D   L   < probe >
  F               K           G   I   V   R   K   V   N   A           G   S       < target >
 163             166         168 169 170 171 172 173 174 175         177 178       ( serial )
1.93            2.04        2.01 1.62 1.98 1.68 1.00 0.93 1.52 2.16 0.68 2.74      (distance)

121 122 123 124 125 126 127 128 129 130 131 132 133 134 135 136 137 138 139 140   ( serial )
  A   A   R   T   V   E   S   R   Q   A   Q   D   L   A   R   S   Y   G   I   P   < probe >
                                                                                   < target >
                                                                                   ( serial )
                                                                                   (distance)

141 142 143 144 145 146 147 148 149 150 151 152 153 154 155 156 157 158 159 160   ( serial )
  Y   I   E   T   S   A   K   T   R   Q   G   V   E   D   A   F   Y   T   L   V   < probe >
              V           D   S                       V   L   D                   < target >
             179         180 184                     186 190 191                   ( serial )
            1.49        2.37 0.72                   1.11 2.96 2.62                 (distance)

161 162 163 164 165 166   ( serial )
  R   E   I   R   Q   H   < probe >
  T                       < target >
 192                       ( serial )
1.60                       (distance)
```

The number of matched residues = 67(1.659)
Extracted site
probe: 3-24/38/52-58/68-70/72/75-83/87-88/95/97-98/101/107/109-116/118-119/145/150-151/155-157/161
target: 8-29/38/88-94/98/100-101/102/112-120/121-122/158/161-162/163/166/168-175/177-178/179/180/184/186/190-191/192

```
Serial No.              Sequence
    1  *I V G G Y T C G A N    T V P Y Q V S L N*S
   21   G Y H F C G G S L I    N S Q H V V S A A H
   41   C Y K S G I Q V R L   *G E D N I N V V E G
   61   N E Q F I S A S K S    I V H P S Y N S N T
   81   L N N D I M L I K L    K S A A S L N S R V
  101   A S I S L P T*S C A    S*A G T Q C L I S G
  121   W G N T K S S G T S    Y P D V L K C L K A
  141   P I L S D S S C K S    A Y P G Q I T S N M
  161   F C A G Y L E G G K    D S C Q G D S G G P
  181   V V C S G K*L Q G I    V S W G S*G C A Q K
  201   N K P G V Y T K V C    N Y V S W I K Q T I
  221   A S N
```

Missing residues(*):
  Residue No.  1 - 15
  Residue No. 35 - 36
  Residue No. 67 - 68
  Residue No.126 -126
  Residue No.131 -131
  Residue No.205 -208
  Residue No.218 -218

FIG. 65

```
Serial No.              Sequence
    1  *V V G G T E A Q R N    S W P S Q I S L Q Y
   21   R S G S S W A H T C    G G T L I R Q N W V
   41   M T A A H C V D R E    L T F R V V V G E H
   61   N L N Q N N G T E Q    Y V G V Q K I V V H
   81   P Y W N T D D V A A    G Y D I A L L R L A
  101   Q S V T L N S Y V Q    L G V L P R A G T I
  121   L A N N S P C Y I T    G W G L T R*T N G Q
  141   L A Q T L Q Q A Y L    P T V D Y A I C S S
  161   S S Y W G S T V K N    S M V C A G G D G V
  181   R S G C Q G D S G G    P L H C L V N G Q Y
  201   A V H G V T S F V S    R L G C N V T R K P
  221   T V F T R V S A Y I    S W I N N V I A S N
```

Missing residues(*):
  Residue No.  1 - 15
  Residue No.146 -146

```
 1    2    3    4    5    6    7    8    9   10   11   12   13   14   15   16   17   18   19   20   (serial)
 I    V    G    G    Y    T    C         A    N    T    V    P    Y    Q    V    S    L    N    S   <probe>
 V    V    G    G    T    E    A         G         S    W    P    S    Q    I    S    L    Q    Y   <target>
 1    2    3    4    5    6    7                   11   12   13   14   15   16   17   18   19   20   (serial)
0.33 0.48 0.48 0.76 0.68 0.42 0.45                1.50 0.68 0.18 0.30 0.38 0.19 0.21 0.59 0.91 0.78  (distance)

21   22   23   24   25   26   27   28   29   30   31   32   33   34   35   36   37   38   39   40   (serial)
 G    Y    H    F    C    G    G    S    L    I    N    S    Q    W    V    V    S    A    A    H   <probe>
 W    A    H    T    C    G    G    T    L    I    R    Q    N    W    V    M    T    A    A    H   <target>
26   27   28   29   30   31   32   33   34   35   36   37   38   39   40   41   42   43   44   45   (serial)
1.38 0.58 0.32 0.38 0.38 0.48 0.31 0.33 0.37 0.70 1.19 0.56 0.71 0.46 0.36 0.25 0.27 0.37 0.33 0.41  (distance)

41   42   43   44   45   46   47   48   49   50   51   52   53   54   55   56   57   58   59   60   (serial)
 C    Y    K    S         I    Q    V    R    L    G    E    D    N    I    N    V    V    E    G   <probe>
 C    V              G    F    R    V    V    V    G    E    H    N    L    N    Q    Q         G   <target>
46   47                  53   54   55   56   57   58   59   60   61   62   63   64                67   (serial)
0.09 0.42                0.83 0.52 0.37 0.35 0.34 0.27 0.41 0.44 1.02 1.16 1.03      1.39 0.76       (distance)

61   62   63   64   65   66   67   68   69   70   71   72   73   74   75   76   77   78   79   80   (serial)
 N    E    Q    F    I    S    A    S    K    S    I    V    R    P    S    Y    N    S    N    T   <probe>
 T    E    Q    Y    V    G    V    Q    K    I    V    V    H    P    Y    W         N              <target>
68   69   70   71   72   73   74   75   76   77   78   79   80   81   82   83                       (serial)
0.32 0.30 0.37 0.16 0.30 0.29 0.70 0.67 0.44 0.61 0.53 0.56 0.47 0.85 0.73 0.64                     (distance)
```

FIG. 68

| | | | | | | | | | | | |
|---|---|---|---|---|---|---|---|---|---|---|---|
| 81 | 82 | 83 | 84 | 85 | 86 | 87 | 88 | 89 | 90 | 91 | 92 | 93 | 94 | 95 | 96 | 97 | 98 | 99 | 100 | (serial) |
| L | N | N | D | I | M | L | I | K | L | K | S | A | A | S | L | N | S | R | V | <probe> |
| V | G | Y | D | I | A | L | L | R | L | A | Q | S | V | T | L | N | S | Y | V | <target> |
| 88 | 91 | 92 | 93 | 94 | 95 | 96 | 97 | 98 | 99 | 100 | 101 | 102 | 103 | 104 | 105 | 106 | 107 | 108 | 109 | (serial) |
| 1.32 | 1.07 | 0.52 | 0.27 | 0.39 | 0.37 | 0.36 | 0.35 | 0.60 | 0.60 | 0.85 | 0.91 | 0.66 | 0.59 | 0.20 | 0.34 | 0.82 | 1.23 | 1.03 | 0.28 | (distance) |

| 101 | 102 | 103 | 104 | 105 | 106 | 107 | 108 | 109 | 110 | 111 | 112 | 113 | 114 | 115 | 116 | 117 | 118 | 119 | 120 | (serial) |
|---|---|---|---|---|---|---|---|---|---|---|---|---|---|---|---|---|---|---|---|---|
| A | S | I | S | L | P | T | S | C | A | S | A | G | T | Q | C | L | I | S | G | <probe> |
| Q | L | G | V | L | P | R | | | | L | | | S | P | C | Y | I | T | G | <target> |
| 110 | 111 | 112 | 113 | 114 | 115 | 116 | | | | 121 | | | 125 | 126 | 127 | 128 | 129 | 130 | 131 | (serial) |
| 0.28 | 0.50 | 0.79 | 1.05 | 1.16 | 0.53 | 0.76 | | | | 1.47 | | | 1.19 | 0.73 | 0.67 | 1.29 | 0.71 | 0.32 | 0.25 | (distance) |

| 121 | 122 | 123 | 124 | 125 | 126 | 127 | 128 | 129 | 130 | 131 | 132 | 133 | 134 | 135 | 136 | 137 | 138 | 139 | 140 | (serial) |
|---|---|---|---|---|---|---|---|---|---|---|---|---|---|---|---|---|---|---|---|---|
| W | G | N | T | K | S | S | G | T | S | Y | P | D | V | L | K | K | L | K | A | <probe> |
| W | G | L | T | R | | | | G | | | A | Q | T | L | Q | C | A | Y | L | <target> |
| 132 | 133 | 134 | 135 | 136 | | | | 139 | | | 142 | 143 | 144 | 145 | 146 | 147 | 148 | 149 | 150 | (serial) |
| 0.34 | 0.51 | 0.61 | 0.63 | 1.10 | | | | 1.15 | | | 1.44 | 0.63 | 0.46 | 0.15 | 0.12 | 0.20 | 0.77 | 1.21 | 1.08 | (distance) |

| 141 | 142 | 143 | 144 | 145 | 146 | 147 | 148 | 149 | 150 | 151 | 152 | 153 | 154 | 155 | 156 | 157 | 158 | 159 | 160 | (serial) |
|---|---|---|---|---|---|---|---|---|---|---|---|---|---|---|---|---|---|---|---|---|
| P | I | L | S | D | S | S | S | C | K | S | Y | P | G | Q | T | T | S | N | M | <probe> |
| P | V | Y | S | Y | | | C | S | | A | Y | | | T | I | K | A | S | M | <target> |
| 151 | 152 | 153 | 155 | | | 158 | 159 | | 163 | | | | 167 | 168 | 169 | 171 | 172 | | (serial) |
| 0.79 | 0.82 | 0.23 | 1.00 | | | 1.08 | 1.20 | | 1.18 | | | | 0.73 | 0.96 | 1.39 | 1.19 | 1.09 | | (distance) |

FIG. 69

```
161 162 163 164 165 166 167 168 169 170 171 172 173 174 175 176 177 178 179 180  (serial)
 F   C   A   G   Y   L   E   G   G   K   D   S   C   Q   G   D   S   S   G   P   <probe>
         174 175 176         179 180 181 182 183 184 185 186 187 188 189 190 191  <target>
                 A   G                 K   R   S   G   C   Q   G   D   S   G   P   (serial)
1.06 0.32 0.29             0.58 0.94 0.55 0.25 0.37 0.45 1.00 0.61 0.39 0.54 0.43 0.52 0.25  (distance)

181 182 183 184 185 186 187 188 189 190 191 192 193 194 195 196 197 198 199 200  (serial)
 V   L   E   S   G   Y   K   Q   G   I   V   S   W   G   S   G   C   A   Q       <probe>
192 193 194     200 201 202 203 204 205 206 207 208 209 210     214 215 216       <target>
 L   E           G   Y   K   H   G   I   V   S   F   G   S               C   N   K   (serial)
0.48 1.09 0.72   1.47 1.09 0.94 0.24 0.15 0.68 0.63 0.42 0.28 0.94 0.61           0.56 0.50 1.23  (distance)

201 202 203 204 205 206 207 208 209 210 211 212 213 214 215 216 217 218 219 220  (serial)
 N   K   P   G   V   Y   T   K   V   C   N   Y   V   S   W   I   K   Q   T   I   <probe>
219 220 221 222 223 224 225 226 227 228 229 230 231 232 233 234 235 236 237       <target>
 K   P   V   T   F   R   V   S   A   Y   I   S   W   I   N   Q   T   V   I       (serial)
1.28 1.25 0.60 0.66 0.62 0.49 0.57 0.50 0.30 0.28 0.07 0.29 0.34 0.16 0.17 0.50 0.69 0.40 0.27  (distance)

221 222 223  (serial)
 A   S   N   <probe>
238 239 240  <target>
 A   S   N   (serial)
0.56 0.66 0.50  (distance)
```

The number of matched residues = 186(r.m.s.d.= 0.709)

```
ID TRYPSIN_HIS
AC N000001
DT NOV-1993
ST 36, 41
3D ITLD; 3EST;
//
```

```
Serial No.                Sequence
         1   M E Q R I  T L K D Y  A M R F G  Q T K T A
        21   K D L G V  Y Q S A I  N K A I H  A G R K I
        41   F L T I N  A D G S V  Y A E E V  K P F P S
        61   N K K T T  A
```

```
Serial No.                    Sequence
       1    *P L T Q E Q L E D A   R R L K A I Y E K K
      21     K N E L G L S Q E S   V A D K M G M G Q S
      41     G V G A L F N G I N   A L N A Y N A A L L
      61     A K I L K V S V E E   F S P S I A R E I Y
      81     E M Y E A V S
```

Missing residues (*) :
    Residue No. 1 - 5

FIG. 77

```
 1  2  3  4  5  6  7  8  9 10 11 12 13 14 15 16 17 18 19 20  (serial)
 M  E  Q  R  I  T  L  K  D  Y  A  M  R  F  G  Q  T  K  T  A  <probe>
                            K  L  S  Q  E  S  V  A  <target>
                         21 26 27 28 29 30 31 32  (serial)
                      1.01 1.40 1.34 1.28 1.65 1.02 0.40 0.82 (distance)

21 22 23 24 25 26 27 28 29 30 31 32 33 34 35 36 37 38 39 40  (serial)
 K  D  L  G  V  Y  Q  S  A  I  N  K  A  I  H  A  G  R  K  I  <probe>
 D  K  M  G  M  G  Q  S  G  V  G  A  L  F  N         <target>
33 34 35 36 37 38 39 40 41 42 43 44 45 46 47 48              (serial)
1.26 0.90 0.81 0.93 0.32 0.77 0.63 0.22 0.39 0.47 0.45 0.58 0.17 0.47 0.31 0.35 (distance)

41 42 43 44 45 46 47 48 49 50 51 52 53 54 55 56 57 58 59 60  (serial)
 F  L  T  I  N  A  D  G  S  V  Y  A  E  E  V  K  P  F  P  S  <probe>
                                  L                          <target>
                                 59                          (serial)
                                1.47                         (distance)

61 62 63 64 65 66  (serial)
 N  K  K  T  T  A  <probe>
                   <target>
                   (serial)
                   (distance)
```

The number of matched residues = 25(r.m.s.d.=0.885)

COMMON STRUCTURE EXTRACTION APPARATUS

BACKGROUND OF THE INVENTION

1) Field of the Invention

This invention relates to a common structure extraction apparatus which extracts a common structure from two three-dimensional structures each formed from a set of sequenced points, and more particularly to an apparatus which retrieves and extracts analogous common portions from a plurality of substances having different three-dimensional structures.

2) Description of the Related Art

In the fields of physics and chemistry, in order to investigate a property of a novel or unknown substance or artificially produce a new substance, a molecular structure is analyzed to make clear a mechanism for manifestation of a function of the substance.

Thanks to results of investigations in the past, it is known that a function and a three-dimensional structure of a substance have a close relation to each other, and it is considered that a structurally analogous (or specific) portion contributes very much to a function of a substance.

Thus, three-dimensional structures of various substances have been made clear and determined by such techniques as an X-ray crystal analysis or an NMR (Nuclear Magnetic Resonance) method, and data bases are produced for the three-dimensional structures which have thus become clear.

When a research worker tries to retrieve and extract analogous portions between three-dimensional structures from such a data base as described above, a series of cumbersome operations must be performed. If such retrieval and extraction can be performed automatically, then the burden of the series of operations to the research worker can be reduced.

In recent years, in order to assist clarification and production of a novel substance and modification to a function of a known substance, much effort has been and is being directed to operations to determine a three-dimensional structure of an object substance by such a technique as an X-ray crystal analysis or an NMR method and store the thus determined three-dimensional structure into a data base. One of representative data bases which are spread world-wide is the Protein Data Bank (PDB) in which three-dimensional structures of proteins, ribonucleic acids and like substances are registered. Further, the Cambridge Structural Database (CSD) is known as a data base in which chemical substances are registered.

A protein is constituted from a plurality of amino acids connected to each other by way of peptide linkages like a chain folded in vivo to form a three-dimensional structure and manifests various functions. The individual amino acids are represented by numbering them in order from 1 beginning with a terminal of N (nitrogen) and ending with the other terminal of C (carbon). The numbers are called amino acid numbers or amino acid residue numbers.

A protein is normally constituted from about 20 amino acids and is arranged stably including a portion having an a helix structure, another portion having a beta structure which extends generally linearly in a zigzag pattern and a further portion of a disordered random coil structure at a variable rate. Meanwhile, each amino acid is constituted from a plurality of atoms depending upon the kind thereof. Accordingly, information including the name of a protein, a management number, the numbers of amino acids forming the protein, the kinds and three-dimensional coordinates of atoms constituting each of the amino acids is registered in the PDB.

Again, thanks to results of investigations in the past, it is known that a function and a three-dimensional structure of a substance have a close relation to each other, and much effort is directed to operations to make clear the relation between a function and a structure. Above all, since it is considered that a structurally analogous (or specific) portion between different substances having a same function contributes very much to the function of the substances, it is essentially required to find out an analogous structure which exists commonly between different three-dimensional structures.

Under present conditions, however, since no technique is available to directly extract a characteristic portion from three-dimensional coordinates of a three-dimensional structure of a substance, each research worker manually searches for a characteristic portion by displaying each three-dimensional structure by means of a 3D (three-dimensional) graphic system. Generally, there is no fixed method for deciding the orientation of a substance, and since a substance is rotated with reference to another substance to search for a characteristic portion thereof, much time is required for the operation.

When a research worker searches for an analogous three-dimensional structure, an rmsd (root mean square distance) value is used as a scale for the analogy between three-dimensional structures of substances. The rmsd value is a square root of a mean square distance between components of substances matched with each other. Empirically, where the rmsd value between two substances is smaller than 1 angstrom, it is considered that the two substances are very analogous to each other.

A popular method for calculation of an rmsd value will be described below with reference to FIGS. 79(A) to 79(D).

It is assumed that there are a substance A represented by such a point set $P=\{p_1, p_2, \ldots, p_i, \ldots, p_N\}$ as shown in FIG. 79(A) and another substance B represented by such a point set $T=\{t_1, t_2, \ldots, t_j, \ldots, t_N\}$ as shown in FIG. 79(B). The elements (points) constituting the substances A and B are matched with each other as shown in FIG. 79(C), and the substance B is rotated or moved and superposed on the substance A as shown in FIG. 79(D) so that the rmsd value between the thus matched elements may exhibit a lowest value. The rmsd value is calculated in accordance with the following equation:

$$rmsd = \sqrt{\frac{\sum_{k=1}^{N}(w_k(Ut_k - p_k))^2}{N}}$$

where N is the number of the matched points, U is a rotation matrix, and $w_k$ is a weight at each of the matched points.

A technique for calculation of rotation or movement of a substance which minimizes the rmsd value between such matched points has been proposed by Kabsh et al. and is utilized widely at present.

However, since the technique compares different substances with each other in regard to an equal number of points, it is the existing state of the things that it is found out by trial and error of a research worker what matching between components of a substance and components of the other substance minimizes the rmsd value.

Further, in order to produce a novel substance, existing substances must be investigated. For example, when it is intended to increase the heat resisting property of a certain substance, a structure common to substances which are high in heat resisting property is searched out, and the structure is additionally provided to the substance to be produced newly to promote the function.

Accordingly, a function of retrieving a necessary structure from a data base is required. However, it is the existing state of the things that, because of a similar reason to that described above, a structure is searched out from a data base by trial and error of a research worker using a computer graphic system in a similar manner as described above.

Furthermore, in recent years, the importance of an analogous structure is recognized also in designing and improvement of a protein. One of example is an experiment for improvement in function of human lysozyme (HL). It has been found out that the three-dimensional structure of the protein HL which does not have an activity to couple a calcium ion includes a structure analogous to that of α lactalbumin which is a protein which couples a calcium ion.

Thus, it has been reported that an experiment to replace an amino acid at a portion of the structure in HL with another amino acid of a different kind by a genetic recombination operation proved coupling of the resulted substance to a calcium ion (Kuroki R. et al., Proc. Natl. Acad. Sci, U.S.A., 86, pp.6,903–6,907, 1989). As can be seen also from the report, information which is very important for designing and improvement of a protein can be obtained by paying attention to analogy between structures.

The assignee of the present invention has proposed a three-dimensional structure processing apparatus designed so as to superpose sets of points forming three-dimensional structures, sets of points having sequential relations or sets of partially matched points with each other such that the rmsd value between them may have an optimum value or to search out a structure having a high degree of analogy from a data base of three-dimensional structures of protein (refer to Japanese Patent Laid-Open Application No. Heisei 6-180737, Application No. Heisei 4-331703, filed on Dec. 11, 1992).

In the three-dimensional structure processing apparatus, a combination of a fixed number of points on a three-dimensional coordinate system represented by a point set is prepared as a search key (probe), and the point set is searched from among point sets representing three-dimensional structures of a plurality of substances stored in a data base to determine whether or not a same or analogous structure to that of the point set serving as the probe is included as a structure of a portion of the three-dimensional structure of the substance.

To this end, the three-dimensional structure processing apparatus fundamentally operates in the following manner. First, upon matching of elements of two point sets, such a method as to match them with the objects displaced from each other or to make combinations of matching of points using a tree structure. Then, narrowing down of candidates (points determined to have been matched) based on a geometrical relation, narrowing down of candidates based on a predetermined threshold value requirement, narrowing down of candidates based on an attribute of a point and some other narrowing down are performed to produce combinations of elements satisfying the requirements. Thereafter, from among the thus produced combinations, a combination which presents a minimum mean of distances between individual points (which corresponds to an rmsd value) of the two point sets is searched out, and the position and the orientation in which the two three-dimensional structures coincide best with each other are calculated. Then, a result of the thus calculated superposition is outputted as a result of retrieval.

The narrowing down of candidates based on a geometrical relation is performed by any of such techniques as described in the following items ① to ③; the narrowing down of candidates based on a predetermined threshold value requirement is performed by such a technique as described in the following item ④; and the narrowing down of candidates based on an attribute of a point is performed in such a technique as described in the following item ⑤.

① Narrowing down of candidates based on a distance relation: upon matching, only those point sets between which the distance relation between an element in a point set (point set A) and s adjacent elements and the distance relation between an element in the other point set (point set B) and s adjacent elements remain within a tolerance are selected to narrow down the candidates.

② Narrowing down of candidates based on an angle: only those point sets between which angles between an element of a point set A and s adjacent elements remain within a tolerance from angles between an element in the other point set B and s adjacent elements are selected to narrow down the candidates.

③ Narrowing down of candidates based on a distance and an angle from the center of gravity: the centers of gravity are calculated among selected points, and distances and angles with respect to the thus calculated centers of gravity are compared with each other in a similar manner as in the technique ① or ② described above to narrow down the candidates.

④ Narrowing down of candidates based on a threshold value requirement; a predetermined threshold value is set, and when an attribute value of a candidate is higher than the threshold value, it is abandoned or trimmed away. In this instance, the number of nils (points for which matched points are not present) is limited such that, upon matching between elements of a point set A and the other point set B, when the total number of nils becomes greater than the threshold value, the elements are removed from candidates of combinations to avoid production of a useless candidate. Further, when elements $b_i$ of the point set B are matched with elements $a_i$ of the point set A, if the rmsd value among all points is extremely great, since it is desired to except the elements from candidates, a threshold level for the rmsd value is provided, and if the rmsd value is equal to or lower than the threshold level, then the point is left as a candidate, but if the rmsd value is higher than the threshold level, the point is excepted from a candidate. Thus, candidates for matching are narrowed down efficiently.

⑤ Narrowing down of candidates based on an attribute of a point: as an attribute of a point, for example, the kind, the hydrophilic property, the hydrophobic property or the polarity of charge of an atom, an atomic group or a molecule may be used. By checking whether or not such attribute or attributes of a point coincide with those of another point, it is determined whether the point should be left as a candidate.

If matching of components of substances can be automated as described above, then it is possible to retrieve and extract, from a data base, an analogous structure which exists commonly between different substances having a same function. However, when a three-dimensional structure of a substance is analyzed making use of the existing CSD or PDB, since retrieval of structures from a large amount of data and comparison between structures are performed by a manual operation, much time and labor are required, which is a burden to the operator.

Further, with the three-dimensional structure processing apparatus proposed by the assignee of the present invention, it can be retrieved whether or not a partial structure constituted from a point set of a fixed scale which has a known structure is present as a common structure in a three-dimensional structure of another substance.

However, the three-dimensional structure processing apparatus has a subject to be solved in that it is difficult to detect, when two three-dimensional structures having similar functions and having a common structure are superposed as a whole, what portions of the entire three-dimensional structures have a common structure because a portion which makes a key for retrieval (probe) is unknown.

If a common structure which is similar in structure can be extracted when partial matching is performed to superpose two three-dimensional structures with each other, then it is recognized that also the substance of one of the two three-dimensional structures has a same function as the function which the substance having the other three-dimensional structure has.

Further, when two different three-dimensional structures are known to have a plurality of common structures from the fact that they have similar functions, it is sometimes unknown what common structure makes the center (or makes a nucleus). In this instance, if the partial structure (structure which makes a key) serving as the center for superposition is determined in error, then when the two three-dimensional structures are superposed at the nucleus provided by the partial structure, even if an analogous common structure is actually included in the two three-dimensional structures, a common structure cannot be detected. Therefore, another subject to be solved by the three-dimensional structure processing apparatus is precise discrimination of a common structure which makes the center.

SUMMARY OF THE INVENTION

It is an object of the present invention to provide a common structure extraction apparatus wherein analogous portions in different three-dimensional structures can be extracted automatically by means of a computer to allow automation of superposed display of three-dimensional structures in a computer graphic system or retrieval of an analogous three-dimensional structure from a data base to reduce the time, the number of operators and the cost required for a retrieving and extracting operation of a common structure and achieve a high efficiency in a retrieving and extracting operation of a common structure.

In order to attain the object described above, according to the present invention, there is provided a common structure extraction apparatus for extracting, from two sequenced point sets each forming a three-dimensional structure, a set of points of a common portion between the two point sets as a common structure between the two three-dimensional structures, which comprises an entire structure superposition section for parallelly and rotationally moving the entire two point sets in accordance with partial matching information for partial matching between the two point sets to superpose the two point sets with each other, a common portion length calculation section for calculating a number of points paired with each other to form a common portion between the two point sets superposed with each other by said entire structure superposition section as a common portion length, a cumulative distance calculation section for accumulating distances between the points paired with each other to form a common portion between the two point sets superposed with each other by said entire structure superposition section to obtain cumulative distance information, and a common portion extraction section for extracting that one of common portions between the two point sets with which the common portion length calculated by said common portion length calculation section exhibits a greatest length and the cumulative distance information calculated by said cumulative distance calculation section exhibits a lowest value as a common structure.

With the common structure extraction apparatus, a plurality of three-dimensional structures which can be partially matched with each other can be superposed with each other to accurately and rapidly extract another common structure existing between the three-dimensional structures. This allows display of a common structure by a graphic system, retrieval of an analogous structure from a data base, estimation of a function based on analogy in structure and so forth.

Accordingly, since an operation which has conventionally been proceeded by trial and error by research workers in order to achieve improvements for discovery or reinforcement of a function of a substance such as a protein can be established and executed as a research and development cycle in which a function is estimated based on a structure and then a result of the estimation is proved by an experiment, the efficiency in operation can be improved very much.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 3 is a block diagram showing a construction of an analogous structure retrieval section provided for the common structure extraction apparatus;

FIG. 4 is a block diagram showing a construction of a nucleus structure extraction section provided for the common structure extraction apparatus;

FIGS. 12(a) and 12(b), 13(a) and 13(b), and 14(a) and 14(b) are diagrammatic views showing different examples of updating of the matching table;

FIG. 15 is a flow chart illustrating a longest common portion extraction procedure of the common structure extraction apparatus;

FIG. 16 is a flow chart illustrating detailed processing of a function "align" which is executed in longest common portion extraction processing by the common structure extraction apparatus;

FIGS. 41(A) and 41(B) are diagrammatic views illustrating examples of an analogous structure map produced by the analogous structure map production processing illustrated in FIG. 39;

FIGS. 51 and 52 are tables illustrating an example of an extracted common structure in an alignment display format;

FIGS 56 to 58 are tables illustrating an example of common structures between trypsin and elastase in an alignment display format;

FIG. 59 is a block diagram showing components which cooperatively function as a common structure extraction apparatus which retrieves a three-dimensional structure;

FIG. 60 is a table illustrating a result of retrieval of analogous structures from alpha-lytic protease conducted using a histidine active portion of trypsin as a probe;

FIG. 61 is a block diagram showing components which cooperatively function as a common structure extraction apparatus which performs estimation of a function;

FIGS. 62 and 63 are tables illustrating a result of extraction of common structures from ras protein and adenylate kinase in the alignment display format;

FIG. 65 is a table showing an array of amino acids of trypsin which is a kind of protein;

FIG. 66 is a similar view but showing an array of amino acids of elastase;

FIGS. 67 to 69 are tables showing a result of extraction of common structures between trypsin and elastase conducted using a result of the nucleus structure extraction in the alignment display format;

FIG. 77 is a table illustrating a result of extraction of common structures between λ-phage Cro protein and λ-phage repressor in the alignment display format;

DESCRIPTION OF THE PREFERRED EMBODIMENT

A. Aspect of the Invention

Figure 1:
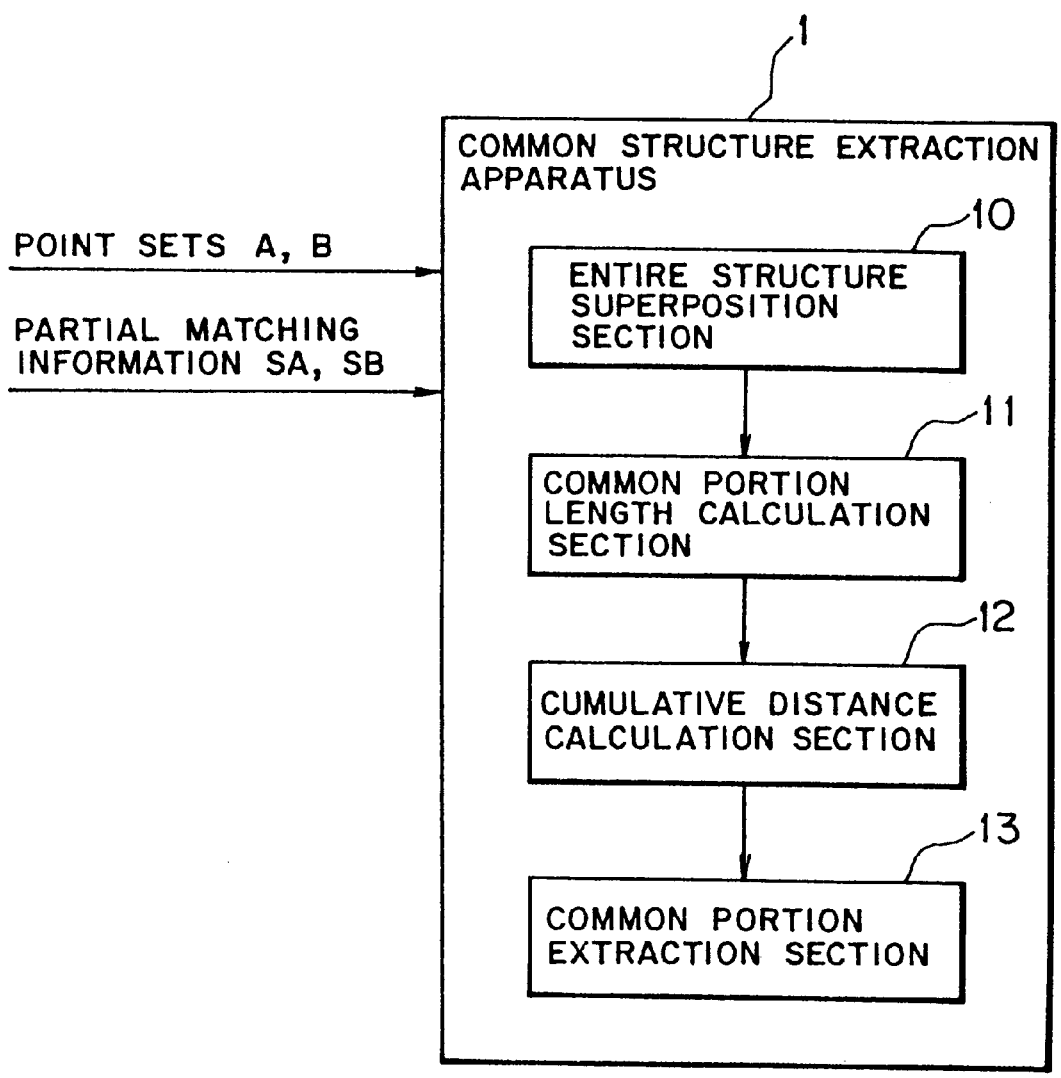
FIG. 1 is a block diagram illustrating an aspect of the present invention.

Referring first to FIG. 1, there is shown a common structure extraction apparatus according to an aspect of the present invention. The common structure extraction apparatus is generally denoted at 1 and generally constructed so as to extract, from two sets A and B of sequences points each forming a three-dimensional structure, a set of points of a common portion between the two point sets A and B as a common structure between the two three-dimensional structures.

The common structure extraction apparatus 1 includes an entire structure superposition section 10, a common portion length calculation section 11, a cumulative distance calculation section 12, and a common portion extraction section 13.

The entire structure superposition section 10 parallelly and rotationally moves the entire two point sets A and B in accordance with partial matching information for partial matching between the two point sets A and B to superpose the two point sets A and B with each other.

The common portion length calculation section 11 calculates the number of points (set elements) paired with each other to form a common portion between the two point sets A and B superposed with each other by the entire structure superposition section 10 as a common portion length (element number).

The cumulative distance calculation section 12 accumulates the distances between the points paired with each other to form a common portion between the two point sets A and B superposed with each other by the entire structure superposition section 10 to obtain cumulative distance information.

The common portion extraction section 13 extracts that one of common portions between the two point sets A and B with which the common portion length calculated by the common portion length calculation section 11 exhibits a greatest length and the cumulative distance information calculated by the cumulative distance calculation section 12 exhibits a lowest value as a common structure.

The entire structure superposition section 10 includes a gravity center calculation section for calculating the centers of gravity of subsets of the two point sets A and B matched with each other by partial matching information, a parallelly moving section for parallelly moving the two point sets A and B so that the two centers of gravity calculated by the gravity center calculation section may coincide with each other, a rotational angle calculation section for calculating a rotational angle around the centers of gravity necessary to superpose the subsets of the two point sets with each other, and a rotating superposition section for rotating an entire one of the two point sets A and B by the rotational angle calculated by the rotational angle calculation section to superpose the entire two point sets A and B with each other.

Meanwhile, the common portion length calculation section 11 includes a matching table production section for producing a matching table for storing combinations of points which may possibly be matched as a common portion between the two point sets A and B superposed with each other by the entire structure superposition section 10, and a longest common portion length calculation section for calculating, based on the matching table produced by the matching table production section, the number of paired points in a point set matched as a common portion between the two point sets A and B as a longest common portion length.

Further, the cumulative distance calculation section 12 calculates a square root of a mean square value of distances between points paired as a common portion between the two point sets A and B superposed with each other by the entire structure superposition section 10 as the cumulative distance information.

The common structure extraction apparatus may further comprise a cost function calculation section for calculating a cost function based on distances between points paired as a common portion between the two point sets A and B. In particular, the cost function calculation section calculates, when a plurality of routes having an equal longest common portion length are present as common portions between the two point sets A and B, each time a point constituting any of the routes is successively searched out while the cumulative distance calculation section 12 successively searches points constituting the routes in order to calculate the cumulative distance information, the value of the cost function at the point In this instance, the cumulative distance calculation section 12 compares, when a certain point is searched out, a new value of the cost function calculated by the cost function calculation section at the point and an old value of the cost function calculated previously by the cost function calculation section at the point, and when the new value is equal to or higher than the old value, the cumulative distance calculation section 12 stops searching for the route and starts searching for a next route, but when the new value is lower than the old value, the cumulative distance calculation section 12 continues searching for the route. The cost function may be a cumulative sum of square values of distances between paired points from start points to searching points of the routes.

In the meantime, the common structure extraction apparatus 1 may be constructed such that a common structure extracted by the common portion extraction section 13 is used as the partial matching information, and a series of processes by the entire structure superposition section 10, the common portion length calculation section 11, the cumulative distance calculation section 12 and the common portion extraction section 13 are repeated recursively until the number of points to be paired as a common portion between the two point sets exhibits no more variation to extract an optimum common structure.

Or, the common structure extraction apparatus may be constructed such that it further comprises an analogous structure retrieval section for dividing one of the two point sets A and B in order beginning with a first one of points of the point set in accordance with a sequence of the points into subsets of a fixed number of points and searching a point set analogous to each of the subsets as an analogous structure from the other point set A or B, and the common structures is extracted using each of the analogous structures retrieved by the analogous structure retrieval section as the partial matching information.

Or else, the common structure extraction apparatus 1 may be constructed such that it further comprises a nucleus structure extraction section for extracting, from the two point sets A and B, a point set which makes a nucleus for appropriate superposition of the two point sets A and B. as a nucleus structure, and the nucleus structure extraction section divides one of the two point sets A and B into segments of a fixed length in accordance with a sequence of points of the point set while successively displacing the start point for such division one by one point beginning with the first point of the point set, retrieves point sets analogous to the segments obtained by the division as analogous structures from the other point set A or B, selects a most analogous one of the thus retrieved analogous structures as a nucleus structure, and outputs the thus selected nucleus structure as the partial matching information.

In this instance, the nucleus structure extraction section may allocate points of the two point sets A and B to rows and columns in accordance with a sequence of the points and sets predetermined data at cross points of the rows and the columns in accordance with the positions of the retrieved analogous structures on the two point sets A and B to produce an analogous structure map in order to grasp a distribution of the analogous structures existing between the two point sets A and B, and refer to the analogous structure map to extract the nucleus structure.

Further, the common structure extraction apparatus 1 may further comprise a display section for displaying two three-dimensional structures formed from the two point sets A and B based on the common structures extracted by the common portion extraction section 13 in a superposed relationship with each other. In this instance, the display section is constructed so as to display the two three-dimensional structures as a three-dimensional graphic display.

Furthermore, the common structure extraction apparatus may further comprise an alignment outputting section for outputting information regarding those points of the two point sets A and B which constitute the common structures extracted by the common portion extraction section 13 in a juxtaposed relationship with each other in accordance with a sequence of the points in each of the point sets A and B, or a model structure outputting section for outputting the common structures extracted by the common portion extraction section 13 as three-dimensional coordinate information.

Otherwise, the common structure extraction apparatus may further comprise a data inputting section for inputting partial structure information as information regarding one of the two point sets A and B, a three-dimensional structure data base for storing in advance information regarding three-dimensional structures as information regarding the other point set A or B, an analogous structure retrieval section for retrieving three-dimensional structures analogous to the partial structure information inputted from the data inputting section as analogous structures from the three-dimensional structure data base, and an analogous structure outputting section for outputting information regarding the analogous structures retrieved by the analogous structure retrieval section and information regarding the common structures extracted by the common portion extraction section 13 using the analogous structures each as the partial matching information.

Or, the common structure extraction apparatus may further comprise a data inputting section for inputting information regarding a partial structure having a known function as information regarding one of the two point sets A and B, a three-dimensional structure data base for storing in advance information regarding three-dimensional structures as information regarding the other point set A or B, a function location data base for storing relations between predetermined functions and three-dimensional structures relating to the functions, an analogous structure retrieval section for retrieving three-dimensional structures analogous to the partial structure inputted from the data inputting section and having the known function as analogous structures from the three-dimensional structure data base, and a function location data base production section for outputting and registering information regarding the analogous structures retrieved by the analogous structure retrieval section, information regarding the common structures extracted by the common portion extraction section 13 using each of the analogous structures as the partial matching information and information regarding the predetermined functions to and into the function location data base.

Or otherwise, the common structure extraction apparatus may further comprise a data inputting section for inputting information regarding an object three-dimensional structure having an unknown function as information regarding one of the two point sets A and B, a function location data base for storing relations between certain functions and three-dimensional structures relating to the functions, an analogous structure retrieval section for retrieving structures analogous to the three-dimensional structures stored in the function location data base from the object three-dimensional structure inputted from the data inputting section, and a function location outputting section for specifying and outputting a function of the object three-dimensional structure and a structure relating to the function based on common structures retrieved by the common portion extraction section 13 using the analogous structures retrieved by the analogous structure retrieval section each as the partial matching information.

The common structure extraction apparatus may further comprise an analogy determination section for determining analogy between the two point sets A and B having the common structures extracted by the common portion extraction section 13 using the nucleus structure extracted by the nucleus structure extraction section as the partial matching information, and a display section for displaying, when the analogy determination section determines that the analogy between the two point sets having the common structures is high, the common structures.

Or, the common structure extraction apparatus may further comprise a data inputting section for inputting information regarding a three-dimensional structure having a known function as information regarding one of the two point sets A and B and inputting information regarding a three-dimensional structure having an unknown function as information regarding the other point set A or B, a function location data base for storing relations between certain functions and three-dimensional structures relating to the functions, a function estimation section for referring to the function location data base based on the common structures extracted by the common portion extraction section 13 using, as the partial matching information, the nucleus structure extracted by the nucleus structure extraction section from the three-dimensional structure inputted from the data inputting section and having the known function and the three-dimensional structure having the unknown structure to perform function estimation of the three-dimensional structure having the unknown function, and a display section for displaying a function location of the three-dimensional structure having the unknown function, estimation by the function estimation section.

Each of the three-dimensional structures may be three-dimensional structure of a substance. In this instance, each of the point sets constituting the three-dimensional structure of the substance is taken, regarding molecules or atoms constituting the substance as points, as a sequenced set of such molecules or atoms sequenced in accordance with a predetermined array.

Further, each of point sets which forms the three-dimensional structure of a protein is taken, regarding amino acids constituting the protein as points, as a sequenced set of the amino acids sequenced in accordance with array numbers of the amino acids.

In the common structure extraction apparatus 1 described above with reference to FIG. 1, the entire two is point sets A and B are parallelly and rotationally moved in accordance with partial matching information by the entire structure superposition section 10 so that they are superposed with each other, and that one of common portions between the two point sets A and B with which the common portion length calculated by the common portion length calculation section 11 exhibits a greatest length and the cumulative distance information calculated by the cumulative distance calculation section 12 exhibits a lowest value is extracted as a common structure by the common portion extraction section 13.

Accordingly, portions of two three-dimensional structures having common structures can be automatically extracted using a computer. Further, when the structure of a portion of one of two three-dimensional structures is known, by superposing the two three-dimensional structures with each other using the portion of the three-dimensional structure as a location for superposition (partial matching information), it can be estimated or determined whether the two three-dimensional structures have analogous structures at partial structures other than the superposition location.

Further, each time a point constituting any of the routes is successively searched out while the cumulative distance calculation section 12 successively searches points constituting the routes in order to calculate the cumulative distance information, a new value of the cost function calculated by the cost function calculation section at the point and an old value of the cost function calculated previously by the cost function calculation section at the point are compared with each other by the cumulative distance calculation section 12, and only when the new value is lower than the old value, searching for the route is continued. Accordingly, when a point for which searching has been performed already is searched newly as another route, if it is estimated that the cumulative distance information of the route does not provide a minimum value, searching of the route is stopped immediately, and searching of another new route is started. Consequently, useless searching can be eliminated.

On the other hand, since a series of processes by the common structure extraction apparatus 1 are repeated recursively until the number of points forming a common portion between the two point sets A and B exhibits no more variation, an optimum common portion can be extracted.

Further, when the two common structures have no functionally known function or no common partial structure between them is known, that is, when the partial matching information is not definite in advance, since an analogous structure between the two point sets A and B is retrieved by the analogous structure retrieval section and is used as the partial matching information, the partial matching information can be settled automatically to perform extraction of a common structure.

Similarly, when the partial matching information is not definite in advance, a nucleus structure which makes the center of superposition is extracted efficiently by the nucleus structure extraction section and is used as the partial matching information. Accordingly, the partial matching information can be settled automatically and efficiently to perform extraction of a common structure.

Further, a condition wherein the two three-dimensional structures are superposed with each other is displayed automatically on the display section, and only by referring to the display section, an operator can discriminate a common structure or a specific structure of the two three-dimensional structures.

Similarly, where information regarding a common structure is automatically outputted by the alignment outputting section or three-dimensional coordinate information of a common structure is automatically outputted from the model structure outputting section, only by referring to the output, an operator can discriminate a common structure or a specific structure of the two three-dimensional structures.

By the way, the common structure extraction apparatus 1 of the present invention can provide a function as a three-dimensional structure retrieval apparatus where it includes the data inputting apparatus, the three-dimensional structure data base, the analogous structure retrieval section and the analogous structure outputting section. In particular, a three-dimensional structure analogous to a partial structure having a known function from the data inputting section is retrieved as an analogous structure from the three-dimensional structure data base by the analogous structure retrieval section, and information regarding the analogous structure, information regarding the common structures extracted using the analogous structure as the partial matching structure and information regarding predetermined functions are automatically outputted to and registered into the function location data base by the function location data base production section.

Or, the common structure extraction apparatus 1 of the present invention can present a function as a function location data base production apparatus where it comprises the data inputting section, the three-dimensional data base, the function location data base, the analogous structure retrieval section and the function location data base production section. In particular, three-dimensional structures analogous to a partial structure inputted from the data inputting section and having a known function are retrieved as analogous structures by the analogous structure retrieval section, and information regarding the analogous structures, information regarding common structures extracted using each of the analogous structures as the partial matching information and information regarding predetermined functions are automatically outputted to and registered and into the function location data base by the function location data base production section.

Further, the common structure extraction apparatus 1 of the present invention can present a function as a function estimation apparatus where it comprises the data inputting section, the function location data base, the analogous structure retrieval section and the function location outputting section. In particular, structures analogous to the three-dimensional structures stored in the function location data base are retrieved from the object three-dimensional structure inputted from the data inputting section by the analogous structure retrieval section, and a function of the object three-dimensional structure and a structure relating to the function is specified and outputted automatically by and from the function location outputting section based on common structures retrieved using each of the retrieved analogous structures as the partial matching information.

Furthermore, where the analogy determination section determines analogy between the common structures extracted using the nucleus structure extracted by the nucleus structure extraction section as the partial matching information and a result of the determination is displayed on the display section, an operator can grasp the analogy of the common structures only by referring to the display section.

Further, the common structure extraction apparatus 1 of the present invention can present a function as a function estimation apparatus which employs nucleus structure extraction where it comprises the data inputting section, the function location data base, the nucleus structure extraction section, the function estimation section and the display section. In particular, a nucleus structure is extracted by the nucleus structure extraction section from a three-dimensional structure having a known function from the data inputting section and another three-dimensional structure having an unknown structure, and the function location data base is referred to by the function estimation section based on common structures extracted using the nucleus structure as the partial matching information to perform function estimation of the three-dimensional structure having the unknown function. Then, a result of the estimation is automatically displayed on the display section Consequently, an operator can grasp the function of the three-dimensional structure having the unknown function only by referring to the display section.

Where the three-dimensional structure of the object for extraction is a three-dimensional structure of a substance or a three-dimensional structure of a protein, retrieval of the three-dimensional structure or function estimation based on analogy of the three-dimensional structure can be performed.

As described in detail above, with the common structure extraction apparatus 1 of the present invention, two three-dimensional structures which can be matched partially with each other can be superposed with each other to extract another common structure existing between the three-dimensional structures accurately and rapidly. Consequently, the time, the hands and the cost required for discovering operation of an analogous structure between two three-dimensional structures or a function based on the structure are reduced, and the operation can be performed efficiently.

Further, since useless retrieval processing upon extraction processing of a common structure can be prevented by introduction of a cost function, extraction processing of a common structure can be performed very efficiently.

Meanwhile, by recursively repeating a series of processes for extraction of a common structure, an optimum common portion can be extracted and all common structures between the two three-dimensional structures can be extracted with certainty.

Further, even if partial matching information between two three-dimensional structures is not definite in advance, since a common structure can be extracted accurately and rapidly by performing retrieval of analogous structures or extraction of a nucleus structure between two three-dimensional structures, the common structure extraction apparatus 1 of the present invention is advantageous in that discovery operation of an analogous structure between a plurality of three-dimensional structures or of a function based on the analogous structure can be performed efficiently.

Further, where display of two three-dimensional structures in a superposed condition, outputting of information regarding a common structure for alignment display or outputting of three-dimensional coordinate information of a common structure is performed, an operator can readily discriminate a common structure or a specific structure of two three-dimensional structures, which contributes very much to improvement in efficiency of discovery operation of a common structure.

By the way, with the common structure extraction apparatus 1 of the present invention, a function as a three-dimensional structure retrieval apparatus can be provided which automatically outputs information regarding analogous structures between two three-dimensional structures and information regarding common structures extracted using each of the analogous structures as partial matching structure. The three-dimensional structure retrieval apparatus contributes very much to improvement in efficiency in operation for discovering an analogous structure between two three-dimensional structures or a function based on a structure.

Further, with the common structure extraction apparatus 1 of the present invention, a function as a function location data base production apparatus can be provided which produces a function location data base using the function of extracting a common structure between two three-dimensional structures. Consequently, a function location data base which is required to discover a function of a three-dimensional structure having an unknown function can be produced readily, and this contributes very much to improvement in efficiency in operation for discovering a function of a three-dimensional structure.

Furthermore, with the common structure extraction apparatus 1 of the present invention, a function as a function estimation apparatus can be provided which estimates a function of a three-dimensional structure having an unknown function using the function of extracting a common structure between two three-dimensional structures. This contributes very much to improvement in efficiency in operation for discovering a function of a three-dimensional structure.

Further, where analogy of a common structure extracted based on a nucleus structure is displayed, an operator can grasp and make the most of the analogy of the common structure for various determinations in discovery of a function of a three-dimensional structure.

Furthermore, with the common structure extraction apparatus 1 of the present invention, a function as a function estimation apparatus can be provided which extracts a nucleus structure between two three-dimensional structures and estimates a function of a three-dimensional structure having an unknown function using the nucleus structure. This contributes very much to improvement in efficiency in operation for discovering a function of a three-dimensional structure.

Where the three-dimensional structure of an object for extraction is a three-dimensional structure of a substance or a three-dimensional structure of a protein, retrieval of three-dimensional structures of various substances or proteins and function estimation based on analogy between three-dimensional structures can be performed. This contributes very much to improvement in efficiency in operation for discovering functions of various substances or proteins.

General advantages of the common structure extraction apparatus 1 of the present invention described above will be described below.

In particular, with the common structure extraction apparatus 1 of the present invention, a plurality of three-dimensional structures which can be partially matched with each other can be superposed with each other to accurately and rapidly extract another common structure existing between the three-dimensional structures. This allows display of a common structure by a graphic system, retrieval of an analogous structure from a data base, estimation of a function based on analogy in structure and so forth.

Accordingly, since an operation which has conventionally been proceeded by trial and error by research workers in order to achieve improvements for discovery or reinforcement of a function of a substance such as a protein can be established and executed as a research and development cycle in which a function is estimated based on a structure and then a result of the estimation is proved by an experiment, the efficiency in operation can be improved very much.

Further, by automatically extracting a nucleus structure which makes the center of superposition of two three-dimensional structures using the technique of nucleus structure extraction and extracting a common structure based on the thus extracted nucleus structure, the efficiency in operation for discovery or estimation of a three-dimensional structure and a function of a substance such as a protein is improved very much.

Furthermore, where a cost function is introduced, useless retrieval processing upon extraction processing of a common structure between substances such as proteins can be prevented. Consequently, extraction processing of a common structure can be performed very efficiently, and common structures can be extracted over a wide range and the accuracy in extraction can be improved significantly.

B. Basic Construction of the Present Embodiment

Figure 2:
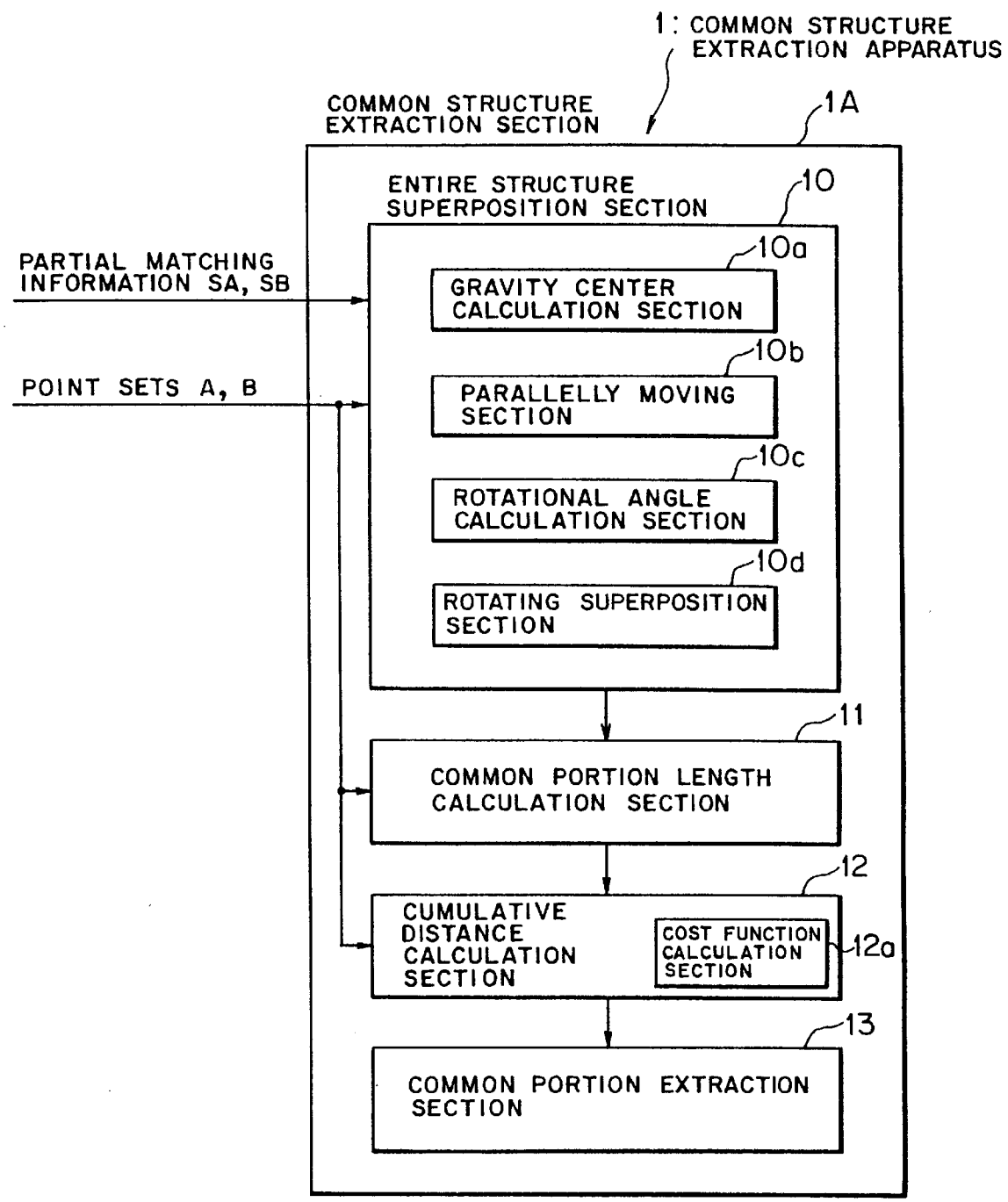
FIG. 2 is a block diagram showing a basic construction of a common structure extraction apparatus to which the present invention is applied.

The basic construction of a common structure extraction apparatus to which the present invention is applied is shown in FIGS. 2 to 4. Referring first to FIG. 2, the common structure extraction apparatus is generally denoted at 1 and includes a common structure extraction section 1A. Similarly to the common structure extraction apparatus 1 described hereinabove with reference to FIG. 1, the common structure extraction section 1A extracts, from two sequenced point sets A and B individually constituting three-dimensional structures, a point set of a portion common between the two point sets A and B as a common structure between the two three-dimensional structures A and B. The common structure extraction section 1A includes an entire structure superposition section 10, a common portion length calculation section 11, a cumulative distance calculation section 12, and a common portion extraction section 13.

The entire structure-superposition section 10 moves the entire two point sets A and B by parallel movement and/or rotational movement to superpose them with each other in accordance with partial matching information SA and SB by which the two point sets A and B are to be matched with each other. To this end, the entire structure superposition section 10 includes a gravity center calculation section 10a, a parallelly moving section 10b, a rotational angle calculation section 10c and a rotating superposition section 10d.

The gravity center calculation section 10a calculates the centers of gravity of subsets of the two point sets A and B which are matched with each other in accordance with the partial matching information SA and SB. The parallelly moving section 10b parallelly moves the two point sets A and B so that the two centers of gravity calculated by the gravity center calculation section 10a may be registered with each other. Further, the rotational angle calculation section 10c calculates a rotational angle around the registered center of gravity necessary to superpose the subsets of the two point sets A and B with each other. The rotating superposition section 10d rotates an entire one of the two point sets A and B in accordance with the rotational angle calculated by the rotational angle calculation section 10c to superpose the two entire point sets A and B with each other.

The common portion length calculation section 11 includes a matching table production section 11a and an LCS calculation section 11b as hereinafter described with reference to FIG. 5, and calculates the number of paired points (set elements) in a common portion of the two point sets A and B superposed with each other by the entire structure superposition section 10 as a common portion length (element number).

The cumulative distance calculation section 12 calculates a square route (hereinafter referred to as rmsd value) of a mean square value of distances between the points paired with each other in the common portion of the two set points A and B superposed with each other by the common portion length calculation section 11 as accumulated distance information.

The common portion extraction section 13 extracts, as a common structure, a common portion between the two point sets A and B with which the common portion length calculated by the common portion length calculation section 11 exhibits a greatest value and the rmsd value calculated by the cumulative distance calculation section 12 exhibits a smallest value.

Meanwhile, the cumulative distance calculation section 12 in the present embodiment includes a cost function calculation section 12a, operation of which will be hereinafter described in detail with reference to FIGS. 15 to 30. In the present embodiment, where the two point sets A and B present, as common portions between them, a plurality of routes having an equal longest common portion length, when the cumulative distance calculation section 12 successively searches for points defining the routes in order to calculate rmsd values, each time a point defining a route is searched, a value of a cost function at the point is calculated by the cost function calculation section 12a. The cost function here is a cumulative sum of square values of distances between paired points beginning with a start point and ending with a searching point of the route.

In the present embodiment, when a certain point is searched, the cumulative distance calculation section 12 compares a new value of the cost function calculated at the point by the cost function calculation section 12a with an old value of the cost function calculated previously at the point by the cost function calculation section 12a, and when the new value is greater than the old value, the cumulative distance calculation section 12 stops searching of the route and begins searching of a next route, but when the new value is equal to or lower than the old value, the cumulative distance calculation section 12 continues searching of the route.

The common structure extraction apparatus 1 of the present embodiment is constructed such that a series of processes by the entire structure superposition section 10, the common portion length calculation section 11, the cumulative distance calculation section 12 and the common portion extraction section 13 are repeated recursively using a common structure extracted by the common portion extraction section 13 as partial matching information until portions of the two point sets A and B as common portions do not have different numbers of points to be paired in order to extract an optimum common structure.

Referring now to FIG. 3, the common structure extraction apparatus 1 includes an analogous structure retrieval section 2 for successively retrieving the point set B with respect to components (partial structure) of the point set A. When partial matching information of the two point sets A and B is not definite in advance, a result of retrieval of the analogous structure retrieval section 2 is outputted as partial matching information to the common structure extraction section 1A.

The analogous structure retrieval section 2 divides, when two point sets A and B representing different three-dimensional structures are inputted thereto, one of the point sets A and B, that is, the point set A, for each fixed components (subset) in accordance with a sequential relation of points, and retrieves a structure (analogous structure) analogous to each fixed components from, the other point set B. The analogous structure retrieval section 2 includes a component retrieval section 2a which has a function of retrieving an analogous structure from the entire point set B using each fixed components as a probe (retrieval key). In this instance, the determination of analogy is based on determination between presence or absence of a matching relationship between two points to be matched in accordance with such a geometrical relation, a threshold condition or an attribute of a point as described hereinabove. Then, an analogous structure or structures retrieved by the component retrieval section 2a are provided as partial matching information to the common structure extraction section 1A.

Referring now to FIG. 4, the common structure extraction apparatus 1 further includes a nucleus structure extraction section 3 for extracting, when partial matching information of two point sets A and B is not definite in advance, as a nucleus structure a point set which makes a nucleus for appropriate superposition of the two point sets A and B. The nucleus structure extraction section 3 includes a segmentation section 3a, a segment retrieval section 3b, an analogy discrimination section 3c and a nucleus structure selection section 3d.

The segmentation section 3a divides the point set A for a fixed length (L) into segments successively displacing the segmentation starting point in accordance with the sequence of the points of the point set A beginning with the first one of the points. The segment retrieval section 3b retrieves an analogous structure from the other point set B using a point set analogous to each segment obtained by segmentation by the segmentation section 3a as a probe (retrieval key).

The analogy discrimination section 3c discriminates analogy between analogous structures retrieved by the segment retrieval section 3b, and the nucleus structure selection section 3d selects a most analogous one of the retrieved analogous structures as a nucleus structure in accordance with results of discrimination of analogy by the analogy discrimination section 3c and outputs the nucleus structure as partial matching structure to the common structure extraction section 1A.

It is to be noted that details of the nucleus structure extraction procedure by the nucleus structure extraction section 3 will be hereinafter described with reference to FIGS. 31 to 44. Meanwhile, the components of the embodiment shown in FIGS. 2 to 4 are realized by an apparatus (a general system configuration will be hereinafter described) which includes an inputting and/or outputting section, a CPU (central processing unit), a memory and a data base (which holds data of three-dimensional structures and so forth hereinafter described) and has an information processing function.

C. Basic Operation of the Embodiment

In the common structure extraction apparatus 1 of the present embodiment described above, two three-dimensional structures each constituted from a set of points arranged in a three-dimensional space are superposed with each other entirely based on partial matching information which represents portions of the two three-dimensional structures which can be matched with each other, and the length (number of points (elements)) of each superposed common portion is calculated, whereafter a point set of that common portion which has a greatest length and has a smallest rmsd value is extracted as a common structure between the two three-dimensional structures. The common structure extracted here represents a common structure (except a structure represented by partial matching information) provided by the two three-dimensional structures represented by the point sets A and B, and it is estimated that the two three-dimensional structures have a common function because they have the common structure.

Further, where the analogous structure retrieval section 2 is used, when two point sets A and B of three-dimensional structures are given, using a component of the point set A as a probe (retrieval key), an analogous structure is retrieved from the other point set B (target), and using the thus retrieved analogous structure as partial matching information, a common structure is extracted by a similar procedure (detailed procedure will be hereinafter described) as described above. Then, similar retrieval and extraction processing is successively repeated for each component obtained by division of the point set A to automatically extract common structures between the two three-dimensional structures.

In short, the point set B is retrieved for all components of the point set A to retrieve a structure similar to the components of the point set A from the structure of the point set B. When a plurality of similar structures are retrieved, one of the structures which is highest in analogy is selected. After an analogous structure is obtained by such retrieval processing as just described, the analogous structure is supplied as partial matching structure to the common structure extraction section 1A. In the common structure extraction section 1A, the two entire point sets A and B are superposed with each other with reference to the partial matching information by the entire structure superposition section 10 to extract common portions between them. The extraction processing is successively performed for the individual components of the point set A, and a structure which has a greatest length is extracted from among all combinations of points.

On the other hand, when a common portion (nucleus structure) which makes the center of superposition of two three-dimensional structures is unknown, the nucleus structure extraction section 3 divides one of the two three-dimensional structures A and B into segments and retrieves, from the other three-dimensional structure, a structure analogous to each segment to match them to extract a nucleus structure which makes the center of superposition.

When a structure (nucleus structure) which makes the center of superposition of two point sets A and B representing three-dimensional structures is to be extracted by the nucleus structure extraction section 3, the point set A is divided for each fixed length (L) into segments by the segmentation section 3a. Then, taking the sequence of elements (points) constituting the three-dimensional structure into consideration, the segment retrieval section 3b retrieves structures similar to structures of the segments from the other three-dimensional structure (point set B).

Then, the analogy discrimination section 3c determines, for an analogous structure (result of retrieval) of the point set B corresponding to each segment, the analogy between the three-dimensional structure (point set A) which includes the segment which makes the key for retrieval and the three-dimensional structure (point B) which includes the retrieved analogous structure to successively form nucleus structures of the two three-dimensional structures. After the nucleus structures for all of the segments are obtained, the nucleus structure selection section 3d selects those of the nucleus structures which are longer than a fixed length, and processing by the common structure extraction section 1A is performed using the thus selected nucleus structures as partial matching information. In this instance, when a plurality of nucleus structures are selected, common structure extraction processing is performed for each of the nucleus structures.

C1. Definition of a Sequenced Point Set

Before operation of the present embodiment is described in more detail, a sequenced point set which represents a three-dimensional structure used in the following description will be described.

Two three-dimensional structures includes a point set $A=\{a_1, a_2, \ldots, a_i, \ldots, a_{NA}\}(1 \leq i \leq NA)$ and another point set $B=\{b_1, b_2, \ldots, b_j, \ldots, b_{NB}\}(1 \leq j \leq NB)$, and each point (each element) is represented by three-dimensional coordinates of $a_i=(x_i, y_i, z_i)$ or $b_j=(x_j, y_j, z_j)$. It is to be noted that NA and NB are the total numbers of elements of the point set A and B, respectively.

It is assumed here that the point set A satisfies the sequential relation of $a_1<a_2<\ldots<a_{NA}$ (or $a_1>a_2>\ldots$) $a_{NA}$) while the other point set B similarly satisfies the sequential relation of $b_1<b_2<\ldots<b_{NB}$ (or $b_i>b_2>\ldots>b_{NB}$).

Such point sets may be, for example, point sets representing three-dimensional structures of various kinds of protein (sets where amino acids are regarded as points).

C2. Superposition of Entire Structures

When the common structure extraction section 1A in the present embodiment shown in FIG. 2 performs extraction of a common structure, where a partially common structure is known in advance as known data of the point sets A and B representing two three-dimensional structures, the entire structure superposition section 10 superposes the two entire sequenced point sets A and B with each other in accordance with the partial matching information (represented by SA and SB corresponding to the point sets A and B, respectively) of the known common portion. It is to be noted that the partial matching information is constituted from subsets of the sequenced point sets A and B.

Here, each of the partial matching information SA and SB of the point sets A and B is a sequence point set represented as a subset $SA=\{(a_{ma(1)}, a_{ma(2)}, \ldots, a_{ma(M)}\}$ or $SB=\{b_{mb(1)}, b_{mb(2)}, \ldots, b_{mb(M)}\}$ constituted from M points ($1 \leq ma(1) < ma(2) < \ldots < ma(M) \leq NA$, and $1 \leq mb(1) < mb(2) < \ldots < mb(M) \leq NB$).

Further, the individual elements of the two subsets SA and SB are matched in order beginning with the top one. In particular, $a_{ma(1)}$ and $b_{mb(1)}$, $a_{ma(2)}$ and $b_{mb(2)}$, ..., and $a_{ma(M)}$ and $b_{mb(M)}$ are individually matched with each other. In this instance, different elements of the subsets SA and SB satisfy a sequential relation based on the sequential relations of the point sets A and B, and the matching relation in which such sequential relation is reversed is not permitted.

Based on the matching information SA and SB designated in such a manner as described above, the entire structure superposition section 10 calculates such a rotational angle at which the elements of the two point sets A and B are superposed with each other to the utmost. Then, the entire structure superposition section 10 rotates the point sets A and B in accordance with the thus calculated rotational angle to superpose the two entire point sets A and B with each other. Different steps ① to ④ of the procedure in this instance will be described below.

① The gravity center calculation section 10a calculates the centers $G_{SA}$ and $G_{SB}$ of gravity of individual subsets based on the partial matching information SA and SB.

② The parallelly moving section 10b parallelly moves the point sets A and B until the centers $G_{SA}$ and $G_{SB}$ of gravity of them are registered with each other so that the centers $G_{SA}$ and $G_{SB}$ of gravity calculated by the entire structure superposition section 10 may be the origin of a three-dimensional coordinate system. In this instance, also coordinates of the individual points constituting the partial matching information SA and SB are moved parallelly.

③ The rotational angle calculation section 10c calculates a rotational angle U with which the partial matching information SA and SB is superposed optimally with each other. Here, it is assumed to rotate the partial matching information SA until it is superposed optimally with the partial matching information SB. The technique of calculating the rotational angle U may be any conventionally known technique (a technique is disclosed, for example, in Wolfgang Kabsh et al., Acta Cryst., A32, p.922, 1976).

④ The rotating superposition section 10d rotates the point set A in accordance with the rotational angle U calculated by the rotational angle calculation section 10c. In this instance, also the coordinates of the individual points constituting the partial matching information SA are rotated. At this point of time, the two point sets A and B are in a condition spatially superposed with each other in accordance with the partial matching information SA and SB.

After the entire structures of the two point sets A and B are superposed with each other by rotation over the optimum rotational angle U, the common portion length calculation section 11 identifies spatially adjacent points based on distances of the points superposed with each other and calculates a length of a common portion (number of points (elements) forming a common structure). Then, the cumulative distance calculation section 12 calculates an rmsd value of the common structure. Then, the common portion extraction section 13 performs extraction of a common structure based on the length of the common portion (longest common structure length: LCS (Longest Common Structure)) and the rmsd value. C3. Calculation of the Longest Common Structure Length (LCS)

Figure 5:
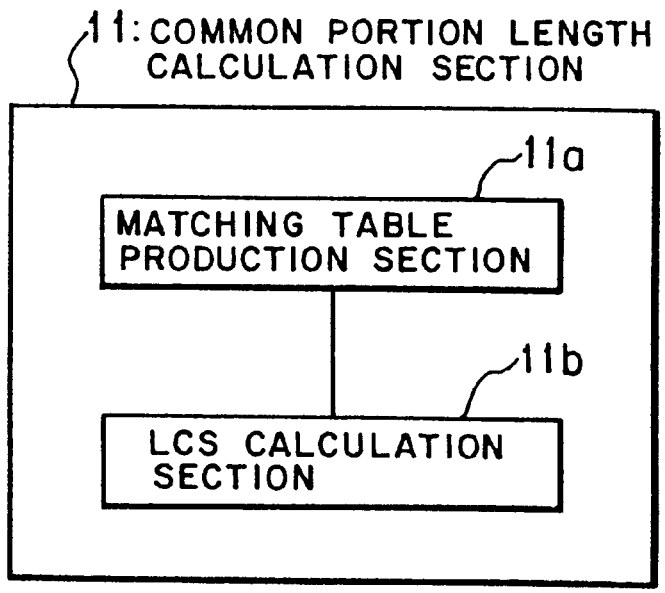
FIG. 5 is a block diagram showing a common portion length calculation section provided in the common structure extraction apparatus.

An example of the construction of the common portion length calculation section 11 is shown in FIG. 5, and operation of the common portion length calculation section 11, the cumulative distance calculation section 12 and the common portion extraction section 13 is illustrated in FIGS. 6 to 14.

Referring first to FIG. 5, the common portion length calculation section 11 of the common structure extraction section 1A in the present embodiment includes a matching table production section 11a, and an LCS calculation section (longest common portion length calculation section) 11b.

The matching table production section 11a produces a matching table in which combinations of points which may possibly be matched as common portions of the two point sets A and B superposed with each other by the entire structure superposition section 10 are stored. More particularly, the matching table production section 11a produces such a matching table as shown in FIGS. 11 to 14 in accordance with a procedure hereinafter described with reference to FIGS. 7 to 9 taking distances between points superposed with each other by the entire structure superposition section 10 into consideration.

The LCS calculation section 11b calculates, as a longest common structure length, a number of points (number of elements) of one of the point sets A and B which are matched with each other as a common portion of the two point sets A and B based on a matching table produced by the matching table production section 11a.

Now, if it is assumed that an element $a_i$ of the point set A (probe) and another element $b_j$ of the point set B (target) which are positioned at a distance shorter than a predetermined threshold value "ERROR" in the superposed portion (common portion) of the two point sets A and B make a point pair, then the length (LCS) of the longest common portion is calculated by applying the following calculation schema to all point pairs.

The function LCS(i, j) given below represents the length of longest common portions constituted from the first to ith points of the point set A and the first to jth points of the point set B. Accordingly, the LCS(NA, NB) represents the length of the longest common portion in the entire two point sets A and B. Here, it is assumed that all of the point pairs are in a condition sorted in order of the magnitude of i or j.

$$LSC(i, j) = \begin{cases} \max\{LSC(i_0, j_0) \mid i_0 < i \le NA, j_0 < j \le NB\} + 1 \\ 1 \text{ if no such } i_0 \text{ and } j_0 \text{ exit.} \end{cases}$$

In the calculation schema given above, when a point pair $(i_0, j_0)$ where is<i and $j_0$<j does not exist, the length LCS(i, j) of the longest common portion of the point pair (i, j) is 1. On the other hand, when point pairs $(i_0, j_0)$ where $i_0$<i and $j_0$<j exist, a sum of 1 and the length LCS($i_0, j_0$) of that one of the point pairs whose longest common portion exhibits a maximum length is the length LCS(i, j) of the maximum common portion.

B1. Production of a Matching Table

Upon production of a matching table, the distance between a pair of points of the superposed point sets A and B is represented by "distance($a_i$, $b_j$)". A matching table in which spatially adjacent point pairs between the point sets A and B are registered is produced assuming that points of a point pair with regard to which the distance "distance($a_i$, $b_i$)" is shorter than the designated threshold value "ERROR" is positioned adjacent each other.

Figure 6:
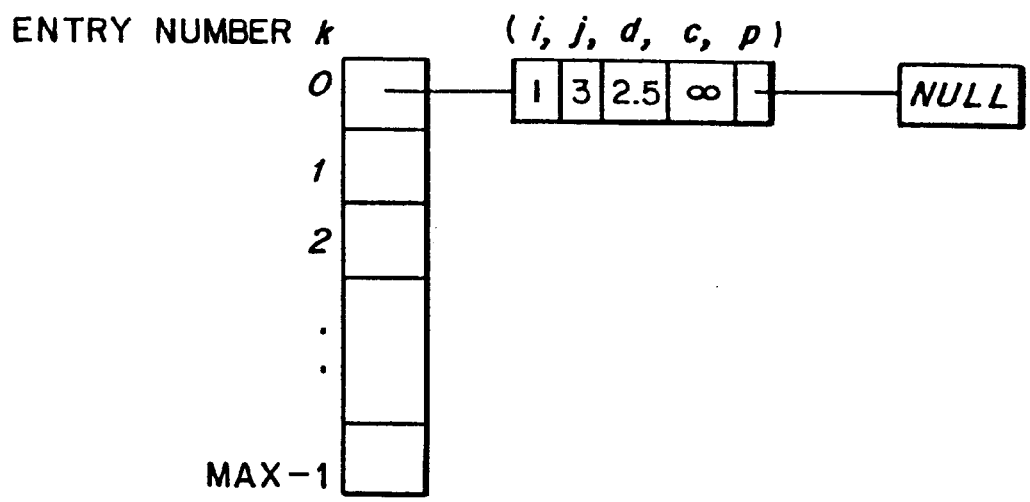
FIG. 6 is a diagrammatic view showing a construction of a matching table employed in the common structure extraction apparatus.

FIG. 6 shows the construction of such matching table. Here, the number of entries of data registered in the matching table is represented by "max". The "max" represents the number of elements of the point set A which have adjacent points in the point set B.

Each element of the data registered in each entry of the matching table is represented by (i, j, d, c, p).

Here, i is a subscript to an element of the point set A and indicates that the element of the point set A which makes a point pair is the ith point $a_i$. Similarly, j is a subscript to an element of the point set B and indicates that the element of the point set B which makes up a point pair with the point $a_i$ is the jth point $b_j$.

Meanwhile, d is the distance between the point $a_i$ and the point $b_j$ (calculated from three-dimensional coordinates of the points $a_i$ and $b_j$), and c is the cumulative cost value calculated by the cost function calculation section 12a. The initial value of the cumulative cost value c is $\infty$ (infinity), that is, a sufficiently high value with respect to an actual cost value. Calculation of the cumulative cost value c will be hereinafter described with reference to FIGS. 15 to 30.

Further, p is a pointer to a next element. When no next element exists, "NULL" is stored into the pointer p.

A procedure (initial table production procedure) for setting an initial value to the matching table described above by the matching table production section 11a will be described subsequently with reference to the flow chart (steps S1 to S14) shown in FIG. 7.

Figure 7:
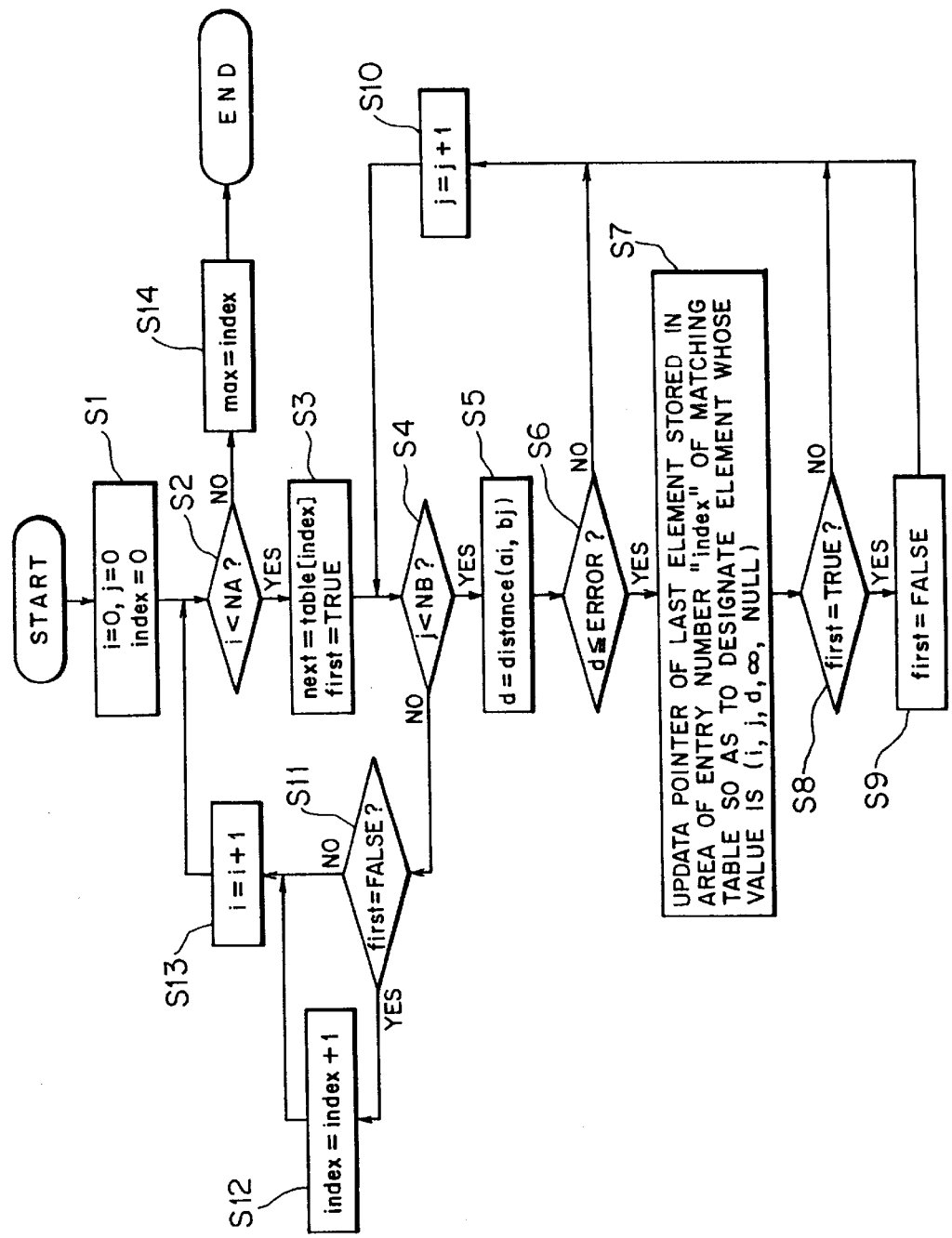
FIG. 7 is a flow chart illustrating an initial table production procedure of the common structure extraction apparatus.

It is to be noted that, in FIG. 7, "index" represents the number of an entry (k (=0 to max-1) in FIG. 6), and "NULL" represents data stored into the pointer p when no succeeding element exists as an element of the point set B corresponding to each entry (which corresponds to each element of the point set A).

Meanwhile, "first" is initially set to "TRUE", but subsequently set to "FALSE" if at least one element of the point set B matched with an element of the point set A for each entry (that is, elements the distance d between which is within the value of "ERROR") is found out so that the pointer p is updated. Consequently, "first" when it is set to "FALSE" indicates that an element of the entry is set.

Referring to FIG. 7, upon production of the initial table, i, j and "index" (entry number k) are set to i=0, j=0 and index=0, respectively (step S1). Then, it is determined whether or not the suffix i of the element of the point set A is smaller than the element number NA of the point set A (step S2). If i<NA, then "table [index]" is set as "next" which designates an area (entry) into which initial data should be registered, and "TRUE" is set as "first" as described hereinabove (step S3).

Then, it is determined whether or not the suffix j of the element of the point set B is smaller than the element number NB of the point set B (step S4). If j<NB, then the distance d="distance($a_i$, $b_j$)" between the points $a_i$ and $b_j$ is calculated (step S5), and then it is determined whether or not the distance d is within the predetermined threshold value "ERROR" (step S6).

If d$\le$"ERROR", then a pointer of the last element stored in an area "table [index]" of the entry number "index" of the matching table designated by "next" is updated so as to designate an element for which (i, j, d, $\infty$, NULL) are stored data (step S7).

Thereafter, it is determined whether or not the setting of "first" is "TRUE" (step S8), and if "first"="TRUE", then "first" is set to "FALSE" (step 9), and then the suffix i of the element of the point set B is incremented by one (step S10), whereafter the control sequence returns to step S4. It is to be noted that, when d>"ERROR" is determined at step S6 or "first"≠"TRUE" is determined at step S8, the control sequence returns to step S4 after the processing at step S10.

When i$\le$NB is determined at step S4, it is determined whether or not the setting of "first" is "FALSE" (step S11), and if "first"="FALSE", then the entry number "index" is incremented by one (step S12). Consequently, the control sequence advances to initial data registration to a next entry. Thus, the suffix i of the element of the point set A is incremented by one (step S13), and then the control sequence returns to step S2.

On the other hand, when "first"≠"FALSE", that is, "first"="TRUE", is determined at step S11, since this represents a condition wherein no element of the point set B matched with the element $a_i$ has been found out, the control sequence advances, without executing the updating processing of the entry number (step S12), directly to step S13, at which the suffix i of the element of the point set A is incremented by one, whereafter the control sequence returns to step S2.

When i$\ge$NA is determined at step S2, it is determined that registration has been completed for all of the elements of the point set A, and "max" is set to "max"="index" (step S14), thereby completing the initial table production processing.

By the algorithm illustrated in FIG. 7, the initial table which is the matching table shown in FIG. 6 to which the initial data are set is produced, and one or a plurality of elements of the point set B which are present within the fixed distance are set in order of entry corresponding to the individual elements of the point set A for each entry.

Figure 10:
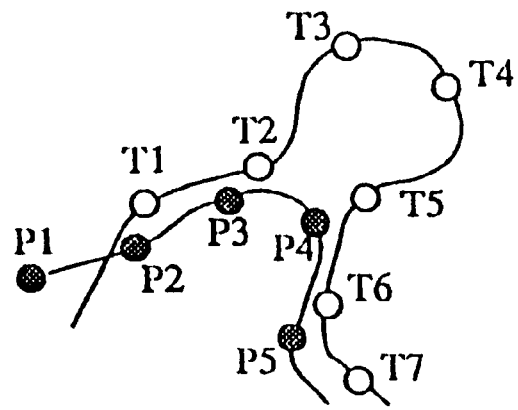
FIG. 10 is a diagrammatic view showing an example of two sequenced point sets.
Figure 11:
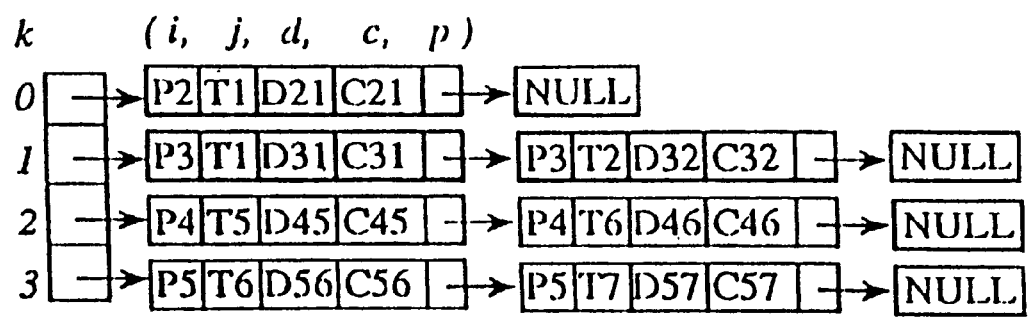
FIG. 11 is a diagrammatic view showing an example of an initial table produced from the point sets shown in FIG. 10.

FIG. 10 shows an example of arrays of two sequenced point sets, and FIG. 11 shows an example of the initial table produced for the two point sets shown in FIG. 10.

In the example shown in FIG. 10, a point set P (probe; corresponds to the point set A)={P1, P2, P3, P4, P5} and another point set T (target; corresponds to the point set B)={T1, T2, T3, T4, T5, T6, T7} are shown in a superposed condition with each other. Further, within a range of the predetermined threshold value "ERROR" from the point P1, no element of the point set T exists; within another range of the predetermined threshold value "ERROR" from the point P2, the point T1 exists; within a further range of the predetermined threshold value "ERROR" from the point P3, the points T1 and T2 exist; within a still further range of the predetermined threshold value "ERROR" from the point P4, the points T5 and T6 exist; and within a yet further range of the predetermined threshold value "ERROR" from the point P5, the points T6 and T7 exist.

If an initial table is produced in accordance with the procedure illustrated in FIG. 7 for the two point sets P and T shown in FIG. 10, then such an initial table (initial condition of the matching table which represents adjacent relations of the individual points) as shown in FIG. 11 is produced. In FIG. 11, the values set as the distance d in each entry are, for example, D21=0.3, D31=1.0, D32=0.5, D45=0.4, D46=1.2, D56=0.6, and D57=1.4. Further, as initial values of the cumulative cost value c (C21, C31, C32, C45, C46, C66, C57), ∞ (a sufficiently high value) is set to each entry.

2. Calculation of the Length of a Longest Common Portion

After the initial table is produced in such a manner as described above, the LCS calculation section 11$b$ shown in FIG. 5 calculates an LCS (Longest Common Structure: the number of elements of a matched point set) while updating the thus produced matching table from the initial state. The LCS calculation procedure of the LCS calculation section 11$b$ will be described below with reference to the flow chart (steps S15 to S24) shown in FIG. 8 and the flow chart (steps S25 to S33) shown in FIG. 9.

Figure 8:
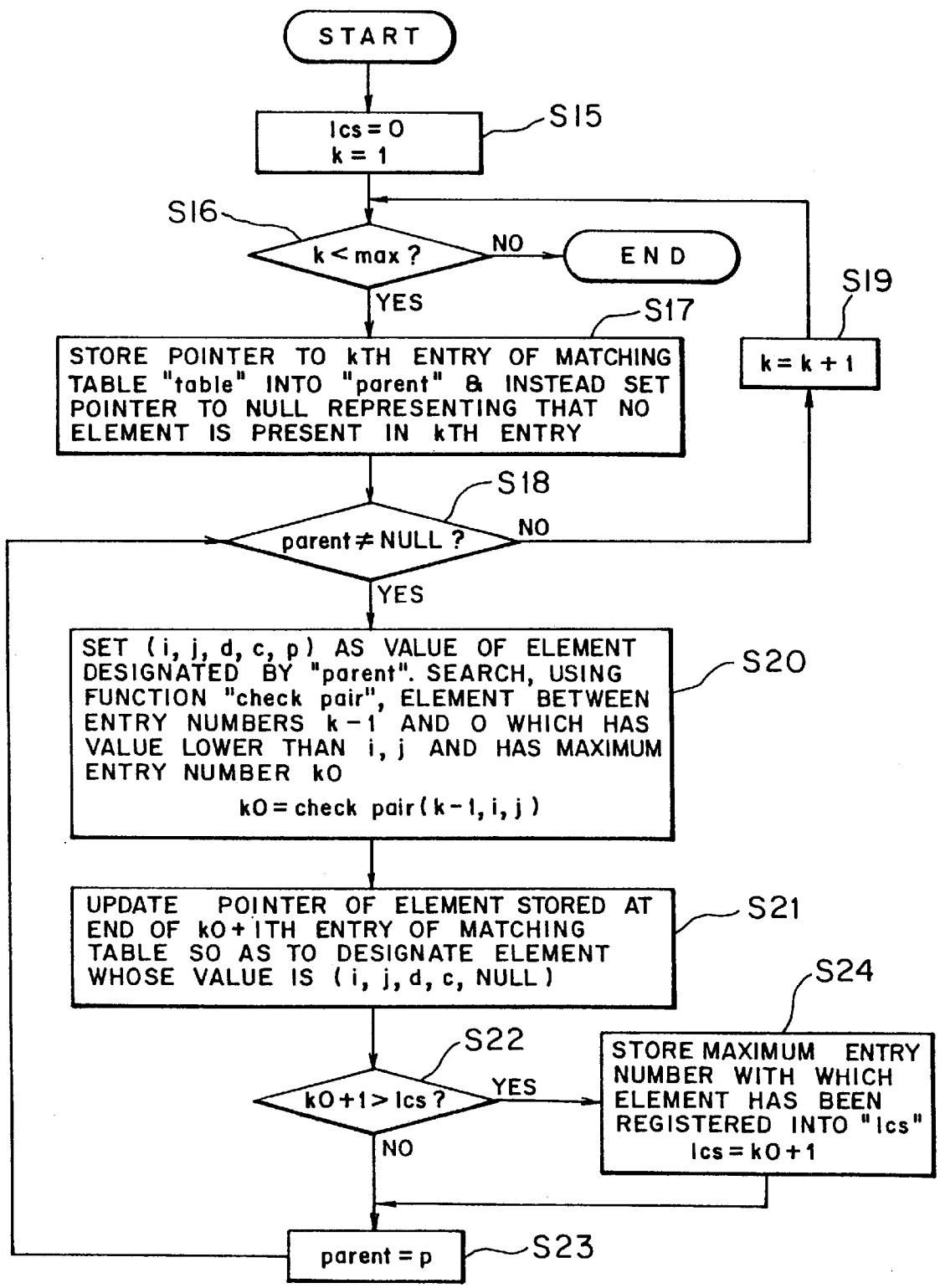
FIG. 8 is a flow chart illustrating an LCS calculation procedure of the common structure extraction apparatus based on updating of the matching table shown in FIG. 6.
Figure 9:
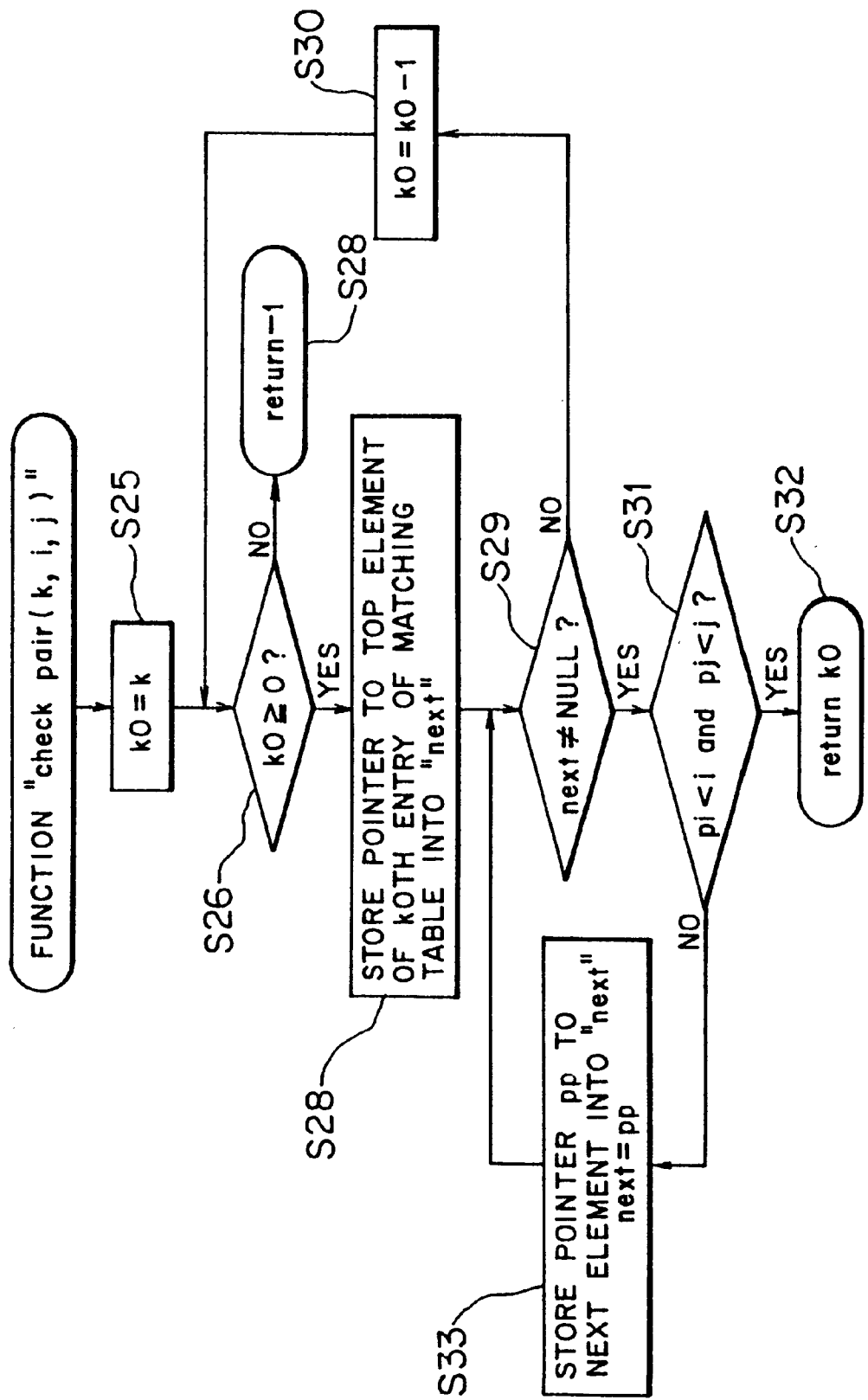
FIG. 9 is a flow chart illustrating a searching process for matched elements of the common structure extraction apparatus.

It is to be noted that the flow chart of FIG. 8 illustrates a procedure of calculating an LCS by updating the matching table, and the flow chart of FIG. 9 illustrates an algorithm for a function "check pair(k, i, j)" required for calculation of an LCS (that is, processing for searching a matched element). In FIGS. 8 and 9, k is an entry number described hereinabove with reference to FIG. 6, and "parent" is an area of the matching table in which a pointer to the kth entry is stored.

In the algorithm illustrated in FIG. 8, the following processing is performed for elements of the entry numbers k=1 to max−1 to calculate an LCS.

First, lcs and k are set to lcs=1 and k=1, respectively, as initial values (step S15), and then, it is determined whether or not the entry number k is smaller than "max" (the number of entries of data registered in the matching table) (step S16).

If k≧max, then the processing is ended immediately, but if k<max, then the pointer to the top element of the kth entry in the matching table is stored into the area "parent", and instead, "NULL" representing that there is no element is placed into the keth entry of the matching table (step S17 refer to FIGS. 12($a$), 13($a$) and 14($a$) ).

Then, it is determined whether or not data designated by the pointer in the area "parent" is "NULL" (step S18), and if "parent"="NULL", then the entry number k is incremented by one (step S19), whereafter the control sequence returns to step S16. On the contrary, if "parent"≠"NULL", then elements designated by the pointer in the area "parent" are successively fetched beginning with a top one thereof, and the following processing is performed for the individual elements of the entry number k0=k−1. It is to be noted that values of elements designated by the pointer in the area "parent" are given as (i, j, d, c, p).

In particular, the elements of the entry number k0 (k0≧0) of the matching table are successively referred to beginning with a top one thereof to retrieve, from the entries from the entry number k0 to the entry number 0, those elements which have suffixes of values lower than those of the suffixes i, j of the element designated by the area "parent" and have the maximum entry number k0 to check, using the function "check pair", whether or not there exist corresponding elements (step S20).

In this check, the function "check pair(k, i, j)" for searching a matched element is executed, and the algorithm therefor is illustrated in FIG. 9. Referring to FIG. 9, upon starting checking based on the function "check pair(k, i, j)", k of the function "check pair(k, i, j) is set to k0 (step S25), and then it is determined whether or not k0 is k0≧0 (step S26). If k0<0, then the value of the function "check pair(k−1, i, j)" is determined to be −1 (step S27), and then the control sequence returns to step S20.

On the other hand, if k0Δ0, then the pointer to the top element of the k0th entry of the matching table is stored into the area "next" (step S28). In this instance, the values of elements designated by the pointer in the area "next" are given as (pi, pi, pd, pc, pp).

Then, it is determined whether or not data designated by the pointer in the area "next" is "NULL" (step S29), and if "next"="NULL", then k0 is decremented by one (step S30), whereafter the control sequence returns to step S26. On the other hand, if "next"≠"NULL", then it is determined whether pi<i and pj<j (step S31).

When the requirements at step S31 are satisfied, k0 then is determined as the value of the function "check pair(k−1, i, j)" (step S32), and the control sequence returns to step S20. But when the requirements at step S31 are not satisfied, a pointer pp to a next element is stored into the area "next" (step S33), and then, the control sequence returns to step S29.

With the procedure described above with reference to FIG. 9, if a matched element is searched out, then an element designated by the pointer in the area "parent" is added subsequently to the end of the elements of the k0+1th entry of the matching table. In other words, the pointer of the element registered at the last end of the elements of the k0+1th entry of the matching table is updated so as to designate elements whose stored data are (i, j, d, c, NULL) (step S21 in FIG. 8).

On the other hand, if there is no corresponding element, then a next element of the k0th entry is fetched, and similar processing to that described above is performed repetitively. If there is no relevant element in the koth entry, then similar processing is repetitively performed for the k0−1th entry of the matching table.

If k<0 is determined at step S26, since −1 is outputted as the value of the function "check pair(k−1, i, j)", an element is added to the last end of the 0th entry of the matching table.

Then, at a point of time at which the processing at step S21 is completed, it is determined whether or not k0+1 >lcs (step S22). If k0+1≦lcs, then the pointer p of the element designated by the area "parent" at present is stored into the area "parent" (step S23), and then, the control sequence returns to step S18 to repeat similar processing to that described above.

On the other hand, when k0+1>lcs is determined at step S22, the maximum entry number among the numbers of entries in which an element has been registered is stored into lcs. In other words, lcs is set to lcs=k0+1 (step S24).

At this point of time, since lcs indicates the maximum value of the entry number among the numbers of entries in which an element is stored in the matching table, an actual LCS (maximum common structure length, the number of elements of a matched point set) is given as lcs to which 1 is added (LCS=lcs+1).

Results of the processing described hereinabove with reference to FIGS. 8 and 9 when it has been performed successively for the initial table (refer to FIG. 11) produced from such two point sets P and T as shown in FIG. 10 are illustrated in FIGS. 12(a) to 14(a).

In FIGS. 12(a) and 12(b), results of the processing when k=1 are shown. By storing the elements at the entry of k=1 into the area "parent" as shown in FIG. 12(a) and performing the processing described above, the matching table is updated as seen in FIG. 12(b). In particular, the first element at the entry of k=1 is added to the end of the entry of k=0.

Similarly, the processing when k=2 is illustrated in FIGS. 13(a) and 13(b). By storing the elements at the entry of k=2 into the area "parent" as shown in FIG. 13(a) and performing the processing described above, the matching table is updated as seen in FIG. 13(b). Actually, however, in the example illustrated in FIGS. 13(a) and 13(b), there is no difference at the entry of k=2 before and after the updating.

Similarly, the processing when k=3 is illustrated in FIGS. 14(a) and 14(b). By storing the elements at the entry of k=3 into the area "parent" as shown in FIG. 14(a) and performing the processing described above, the matching table is updated as seen in FIG. 14(b). Actually, however, in the example illustrated in FIGS. 14(a) and 14(b), there is no difference at the entry of k=2 before and after the updating.

It is to be noted that, since processing for the cumulative cost value is not performed in the matching table shown in FIGS. 12(a) to 14(b), no cumulative cost value is shown in FIGS. 12(a) to 14(b).

Further, in the example shown in FIGS. 10 to 14(b), since elements are stored finally up to the entry of k=3, the value of lcs described above is 3, and the longest common structure length LCS is 4 (=lcs+1). Consequently, this value is outputted from the LCS calculation section 11b.

C4. Extraction Processing of a Common Structure (Longest Common Portion)

The final matching table shown in FIG. 14 which has been produced and updated in order to calculate an LCS by the LCS calculation section 11b indicates that there exists a longest common portion of lcs+1 elements constituted from elements at the lcs-1th, lxa–1th, . . . , and 0th entries in reverse order beginning with an element or elements registered in the lcsth entry.

Figure 17:
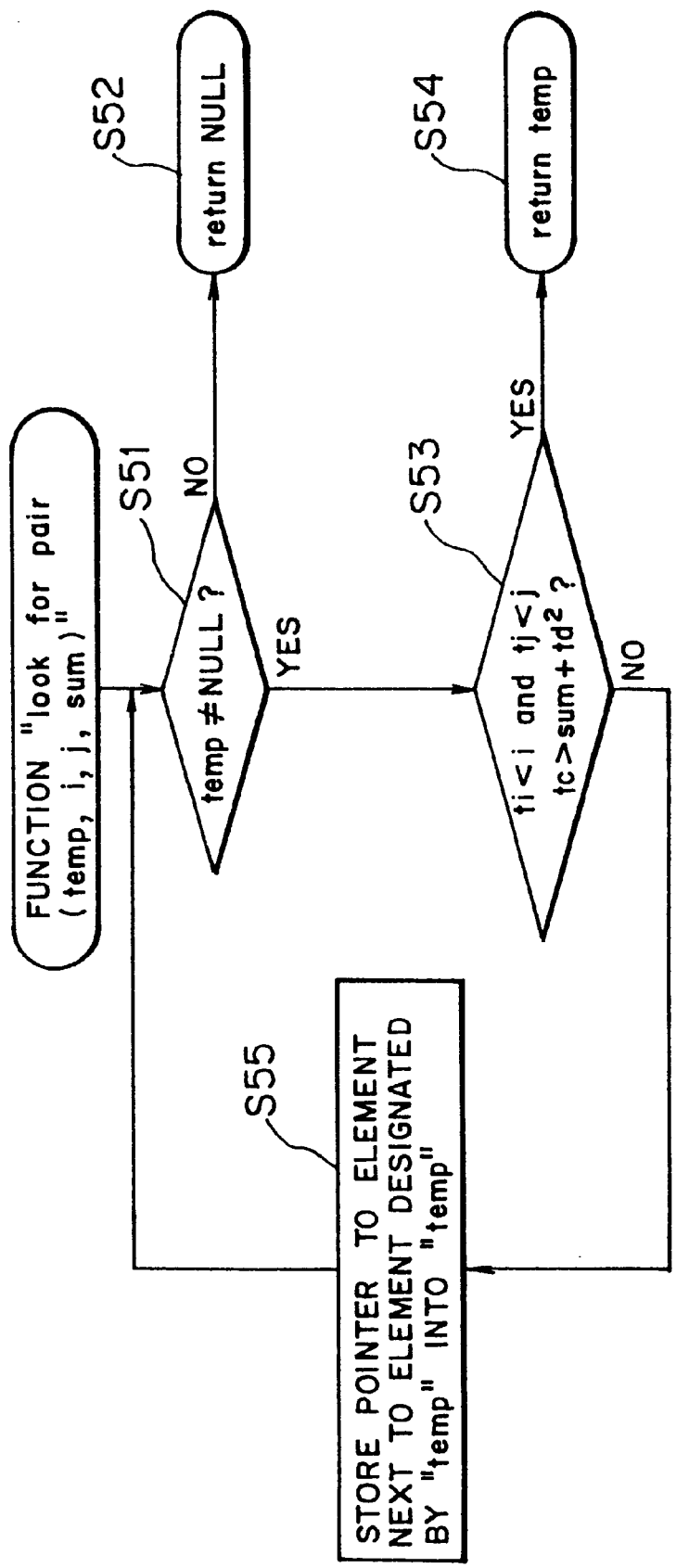
FIG. 17 is a flow chart illustrating detailed processing of another function "look for pair" which is executed in the longest common portion extraction processing by the common structure extraction apparatus.

Thus, the cumulative distance calculation section 12 (cost function calculation section 12a) and the common portion extraction section 13 In the embodiment shown in FIG. 2 searches the matching table in accordance with an algorithm illustrated in FIGS. 15 to 17 to detect a combination which is a longest common portion satisfying the sequential relation and presents a smaller rmsd value. The rmsd value is a square root of a mean square distance of distances dk registered in the elements of the matching table, and is calculated in accordance with the following equation:

$$rmsd = \sqrt{\frac{\sum_{k=0}^{lcs} d_k^2}{lcs + 1}}$$

In the following, the longest common portion extraction procedure in the present embodiment will be described with reference to the flow chart (steps S34 to S39) shown in FIG. 15. It is to be noted that FIG. 16 is a flow chart (steps S40 to S50) illustrating contents of processing of a function "align(i, j, k, sum)" executed in the process illustrated in FIG. 15, and FIG. 17 is a flow chart (steps S51 to S55) illustrating contents of processing of another function "look for pair(temp, i, j, sum)" executed in the processing illustrated in FIG. 16.

Referring to FIG. 15, upon extraction of a longest common,portion, the pointer to a top element registered in the lcsth entry of the matching table produced and updated, for example, in such a manner as seen in FIG. 14(b), is stored into the area "root" (step S34).

Then, it is determined whether or not the data designated by the pointer in the area "root" is "NULL" (step S35), and if "root"="NULL", then values stored in arrays "best ca, best cb, best cd", which will be hereinafter described, are displayed (step S39 ), thereby ending the processing.

It is to be noted that, in the array "best ca", the suffix i of a longest common portion of the point set A (point set P) is stored; in the array "best cb", the suffix j of a longest common portion of the point set B (point set T) is stored; and in the array "best cd", the distance between the point $a_i$ and the point $b_i$ is stored.

On the other hand, if "root"≠"NULL" is determined at step S35, then the cumulative cost value c of the values (i, j, d, c, p) of the element designated by the pointer in the area "root" is updated, and the values of the element after such updating are stored into the relevant arrays and variable (step S36). In particular, c, ca[k], cb[k], cd[k] and "sum" are set to c=$d^2$, ca[k]=i, cb[k]=j, cd[k]=d, and "sum"=$d^2$, respectively.

Thereafter, the function "align(i, j, lcs–1, sum)" processed in accordance with the flow chart shown in FIG. 16 is executed to determine the remaining longest common portions (step S37).

Here, contents of the processing of the function "align(i, j, k, sum)" will be described with reference to FIG. 16. As seen from FIG. 16, it is first determined whether or not k (=lcs–1)<0 (step S40).

If k<0, then the rmsd value is calculated in accordance with [sum/(lcs+1)]$^{1/2}$ (step S41), and then, it is determined whether or not the rmsd value is smaller than a variable "best rmsd" (minimum rmsd value) (step S42). If "best rmsd"≦"rmsd", then the processing of the function "align(i, j, k, sum) is ended. On the other hand, If "best rmsd">"rmsd", then "sum" at present is placed into the variable "best rmsd" (minimum "sum"), and the rmsd value calculated at step S41 is placed into another variable "best rmsd". Further, ca[k] and cb[k] where 0≦k≦lcs are placed into arrays "best ca[k]" and "best cb[k]", respectively (step S43).

On the other hand, if k≧0 is determined at step S40, then it is determined whether or not the value of "sum" at present is smaller than the value of a variable "best sum" at present (step S44). If "sum"≧"best sum", then the processing of the function "align(i, j, k, sum)" is ended.

On the other hand, if "sum"<"best sum" is determined at step S44, then the pointer to the top element of the kth entry of the matching table is stored into the area "temp" (step S45), and a function "look for pair(temp, i, j, sum)", which is processed in accordance with a flow chart shown in FIG. 17, is executed, and a result of the processing by the function is set to an area "elem" (step S46).

Contents of the processing of the function "look for pair(temp, i, j, sum)" will be described below with reference to FIG. 17. In this instance, values of the elements designated by the pointer in the area "temp" are given as (ti, tj, td, tc, tp).

As seen from FIG. 17, it is first determined whether or not the data designated by the pointer in the area "temp" is "NULL" (step S51), and if "temp"="NULL", then "NULL" is determined as the value of the function "look for pair (temp, i, j, sum)", and the control sequence returns to step S46 (step S52).

On the other hand, if "temp"≠"NULL" is determined at step S51, then it is determined whether or not ti<i, tj<j and tc>sum+td$^2$ (step S53).

If the requirements at step S53 are satisfied, then "temp" is determined as the value of the function "look for pair (temp, i, j, sum)", and the control sequence returns to step S46 (step S54). But if the requirements at step S53 are not satisfied, then the pointer tp to a next element of the element designated by the pointer stored in the area "temp" at present is stored into the area "temp" (step S55), whereafter the control sequence returns to step S51.

After the value of the function "look for pair(temp, i, j, sum)" is placed into the area "elem" in this manner, it is determined whether or not the data in the area "elem" is "NULL" as seen in FIG. 16 (step S47), and if "elem"= "NULL", then the processing of the function "align(i, j, k, sum) is ended.

When "elem"≠"NULL" (that is, "elem"="temp") is determined at step S47, the cumulative cost value pc of the values (pi, pi, pd, pc, pp) of the element designated by the pointer in the area "elem" is updated and the values after such updating are stored into a temporary storage area (step S48). In particular, pc, ca[k], cb[k] and cd[k] are set to pc=sum+ pd$^2$, ca[k] =pi, cb[k]=pj, and cd[k]=pd, respectively.

Thereafter, the function "align(i, j, k−1, sum)" is executed to determine the remaining longest common portion (step S49), and then, the pointer pp to a next element of the element designated by the pointer stored in the area "elem" at present is stored into the area "temp" (step S50), whereafter the control sequence returns to step S46.

After such processing as described above has been performed for the function "align(i, j, k, sum)", the control sequence advances from step S37 to step S38 in FIG. 15. At step S38, the pointer p to a next element of the element designated by the pointer stored in the area "root" at present is stored into the area "root", and then, the control sequence returns to step S35.

Then, when "root"="NULL" is finally determined at step S35, values stored in the arrays "best ca", "best cb" and "best cd" are displayed and extracted as a longest common portion (step S39).

Subsequently, the longest common portion extraction processing in the present embodiment described above with reference to FIGS. 15 to 17 will be described more briefly. Since the matching table has a network structure, during searching of a longest common portion, a same element is passed a number of times as a node. However, upon searching of a longest common portion, since only it is required to select a route which provides a minimum rmsd value, if the square sum of the distances between the elements upon passing the individual nodes (elements) till now is the cumulative cost value c (cost function), then searching must be performed only for the cases wherein the cumulative cost value of a route to be searched newly is smaller than the cumulative cost value till now.

Therefore, in the present embodiment, in a search of a route in the matching table, the cumulative cost value c of the individual elements which form a longest common portion is calculated by the cost function calculation section 12a, and searching of a route is repeated only when the cumulative cost value of a route to be searched newly is smaller than the cumulative cost value till now (when the determination at step S53 In FIG. 17 is YES) whereas wasteful searching provided by overlapping passing of a same node is prevented thereby to realize high speed extraction processing of a longest common portion (common structure).

Figure 18:
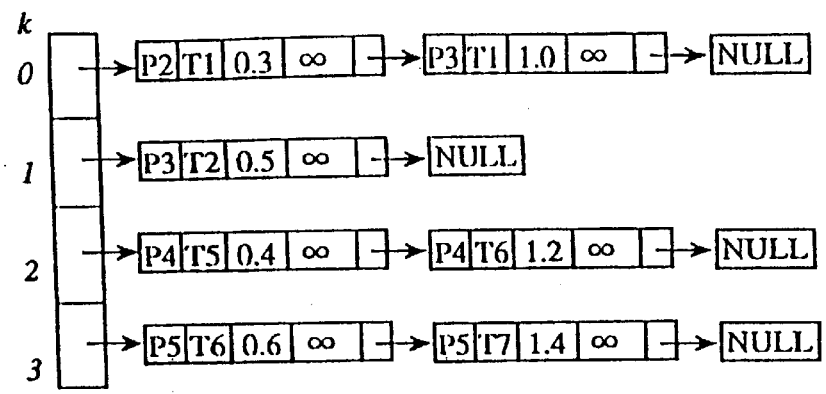
FIGS. 18 to 28 are diagrammatic views of different searching conditions on the matching table illustrating an example of the longest common portion extraction processing by the common structure extraction apparatus.

An example of extraction processing of a longest common portion described hereinabove with reference to FIGS. 15 to 17 for the final matching table shown in FIG. 14 is illustrated in FIGS. 18 to 28. FIG. 18 illustrates an initial condition wherein the initial values described hereinabove are set as the distances and the cumulative cost values of the individual elements in the matching table of FIG. 14.

Figure 19:
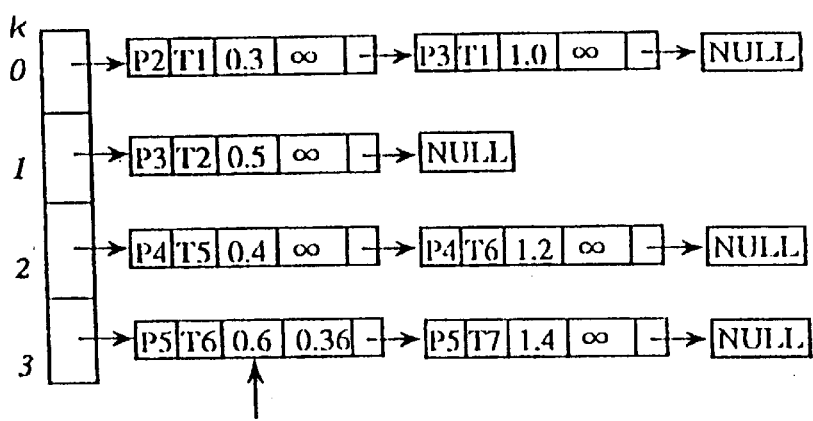

Then, searching of a longest common portion is started from the top element in the entry of k=3 as seen in FIG. 19. In this instance, the square value 0.36 of the distance D56 (=0.6) between the pair of points P5 and T6 is stored in place of ∞ as the cumulative cost value C56 of the top element.

Figure 20:
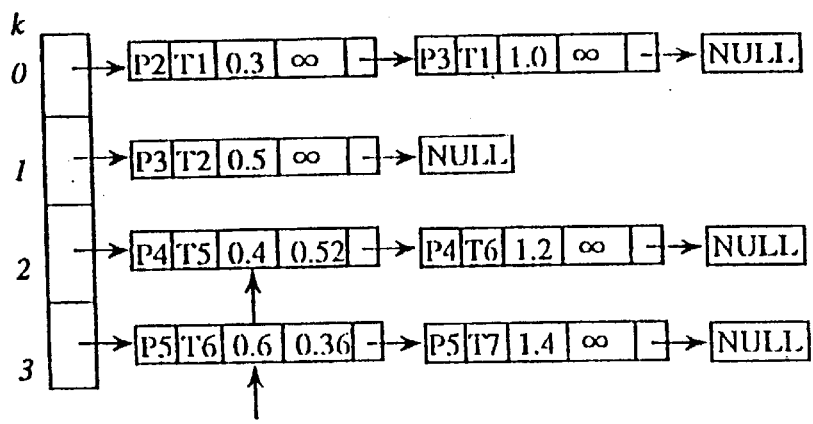

From the element which includes the pair of points P5 and T6 in the entry of k=3, the top element in the entry of k=2 is searched as seen in FIG. 20. The suffixes of the pair of points P4 and T5 of the top element are smaller than the suffixes of the pair of points P5 and T6, respectively. Further, the square value 0.16 of the distance D45 (=0.4) between the pair of points P4 and T5 and the cumulative cost value 0.36 of the preceding elements are added to calculate the cumulative cost value 0.52. Then, the cumulative cost value 0.52 calculated now and ∞ stored as the present cumulative cost value C45 are compared with each other. Here, since the cumulative cost value 0.52 is apparently smaller, the cumulative cost value 0.52 calculated now is stored as the new cumulative cost value C45.

Figure 21:
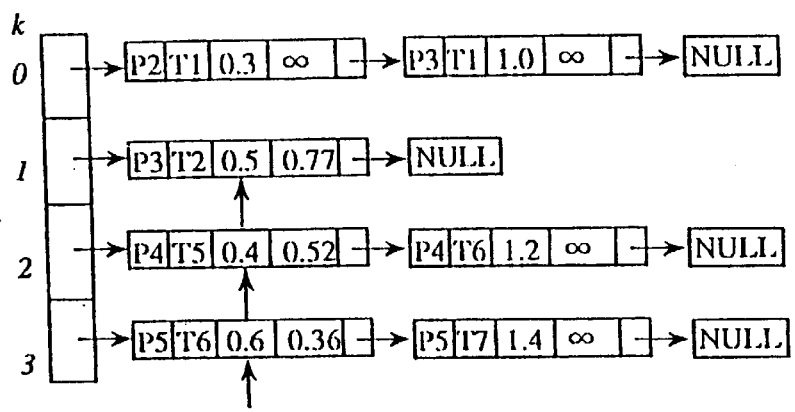

Similarly, the top element in the entry of k=1 is searched out from the elements including the pair of points P4 and T5 in the entry of k=2 as seen in FIG. 21. The suffixes of the pair of points P3 and T2 of the top elements are smaller than the suffixes of the pair of points P4 and T5, respectively. Further, the square value 0.25 of the distance D32 (=0.5) between the points P3 and T2 in pair and the cumulative cost value 0.52 of the precedent elements are added to calculate the cumulative cost value 0.77. Then, the cumulative cost value 0.77 calculated now and ∞ stored as the present cumulative cost value C32 are compared with each other. Since the cumulative cost value 0.77 is apparently smaller, the cumulative cost value 0.77 calculated now is stored as the new cumulative cost value C32.

Figure 22:
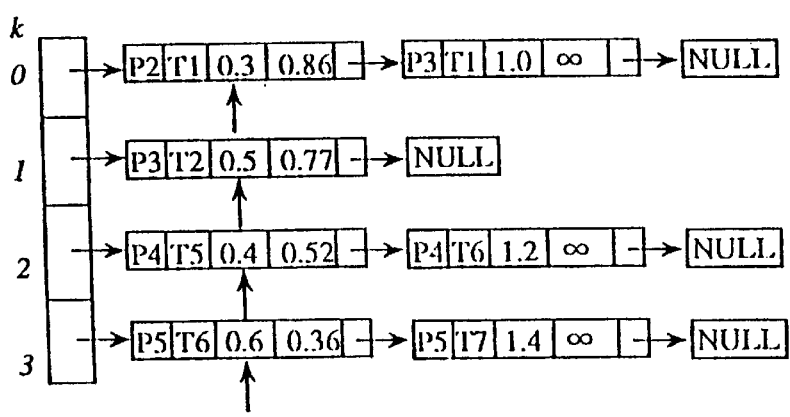

Similarly, from the elements including the pair of points P3 and T2 in the entry of k=1, the top element in the entry of k=0 is searched as seen in FIG. 22. The suffixes of the points P2 and T1 in pair in the top elements are smaller than the suffixes of the points P3 and T2 in pair, respectively. Further, the square value 0.09 of the distance D21 (=0.3) between the points P2 and T1 in pair and the cumulative cost value 0.77 of the precedent elements are added to calculate the cumulative cost value 0.86. Then, the cumulative cost value 0.86 calculated now and ∞ stored as the present cumulative cost value C21 are compared with each other. Since the cumulative cost value 0.86 is apparently smaller, the cumulative cost value 0.86 calculated now is stored as the new cumulative cost value C21.

Figure 23:
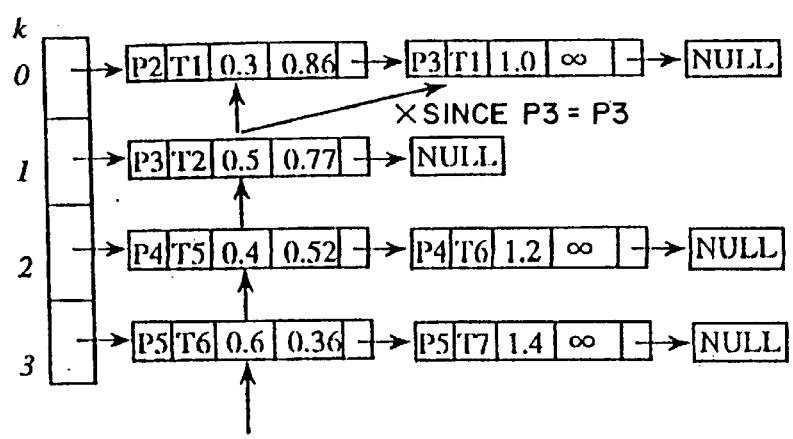

Subsequently, from the elements including the points P3 and T2 in pair in the entry of k=1, the second element in the entry of k=0 is searched as seen in FIG. 23. Since the point P3 in the second element coincides with the point P3 in the precedent element, the route being searched now is determined to be inappropriate.

Figure 24:
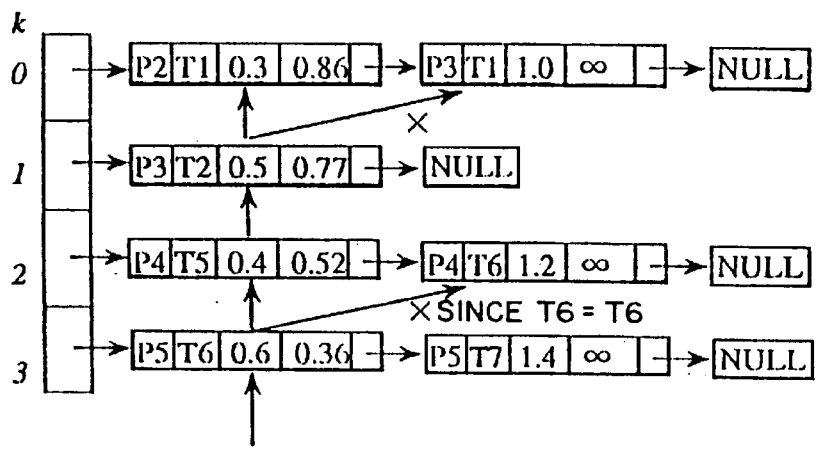

Then, from the elements including the points P5 and T6 in pair in the entry of k=3, the second element in the entry of k=2 is searched as seen in FIG. 24. Since the point T6 of the second element coincides with the point T6 of the last element, the route being searched now is determined to be inappropriate.

Figure 25:
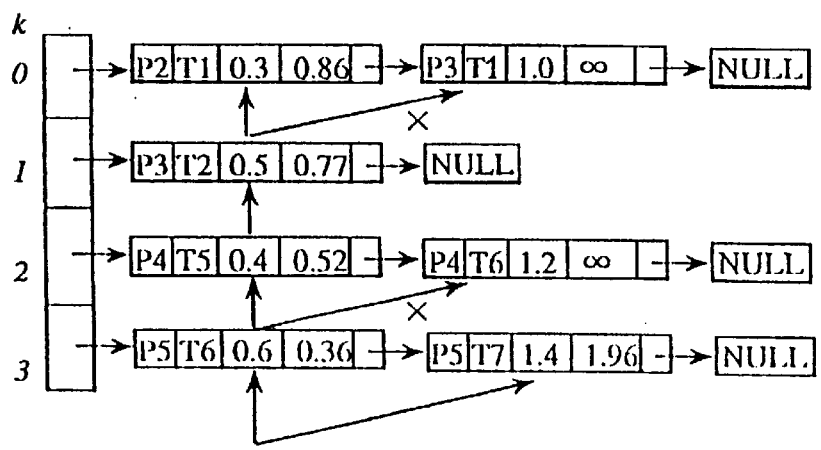

By the processing described above, the searching beginning with the top element in the entry of k=3 is completed, and then, searching for a longest common portion is started beginning with the second element in the entry of k=3 as seen from FIG. 25. In this instance, the squared value 1.96 of the distance D57 (=1.4) between the points P5 and T7 in pair is stored in place of ∞ as the cumulative cost value of the second element.

Figure 26:
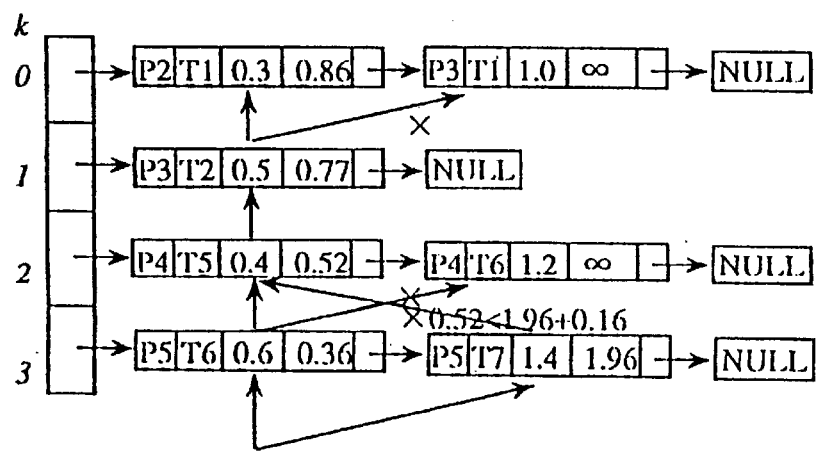

As seen from FIG. 26, from the elements including the points P5 and T7 in pair in the entry of k=3, the top element in the entry of k=2 is searched. The suffixes of the points P4 and T5 in pair of the top element are smaller than the suffixes of the points P5 and T7 in pair, respectively. Further, the square value 0.16 of the distance D45 (=0.4) between the points P4 and T5 in pair and the cumulative cost value 1.96 of the precedent elements are added to calculate the cumulative cost value 2.12. Then, the cumulative cost value 2.12 calculated now and 0.52 currently stored as the cumulative cost value C45 are compared with each other. Since the cumulative cost value 2.12 calculated now is apparently higher, the route being searched now is determined to be appropriate.

Figure 27:
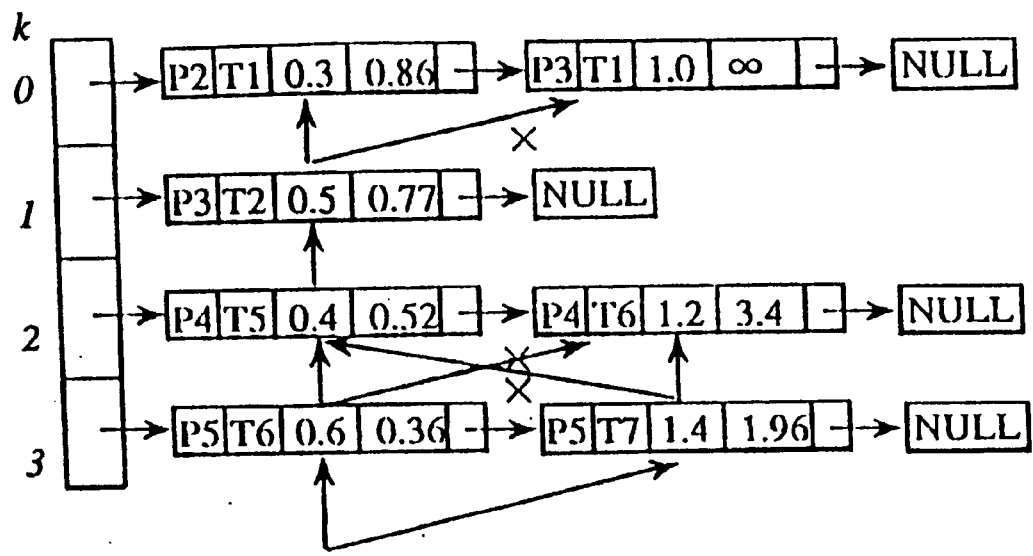

As seen from FIG. 27, from the elements including the points P5 and T7 in pair in the entry of k=3, the top element in the entry of k=2 is searched. The suffixes of the points P4 and T6 in pair in the second element are smaller than the suffixes of the points P5 and T7 in pair, respectively. Further, the square value 1.44 of the distance D46 (=1.2) between the points P4 and T6 in pair and the cumulative cost value 1.96 of the precedent elements are added to calculate the cumulative cost value 3.4. Then, the cumulative cost value 3.4 calculated now and ∞ stored as the present cumulative cost value C46 are compared with each other. Since the cumulative cost value 3.4 is smaller apparently, the cumulative cost value 3.4 calculated now is stored as the new cumulative cost value C46.

Figure 28:
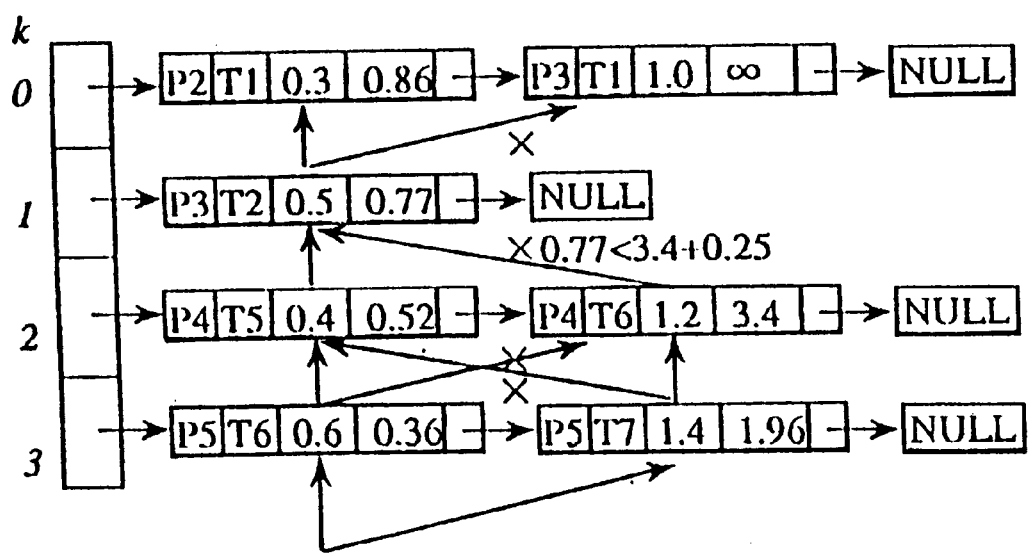

As seen from FIG. 28, from the elements including the points P4 and T6 in pair in the entry of k=2, the top element in the entry of k=1 is searched. The suffixes of the points P3 and T2 in pair in the top element are smaller than the suffixes of the points P4 and T6 in pair, respectively. Further, the square value 0.25 of the distance D32 (=0.5) between the points P3 and T2 in pair and the cumulative cost value 3.4 of the precedent elements are added to calculate the cumulative cost value 3.65. Then, the cumulative cost value 3.65 calculated now and 0.77 stored as the present cumulative cost value C32 are compared with each other. Since the cumulative cost value 3.65 is greater apparently, the route being searched now is determined to be inappropriate.

Figure 29:
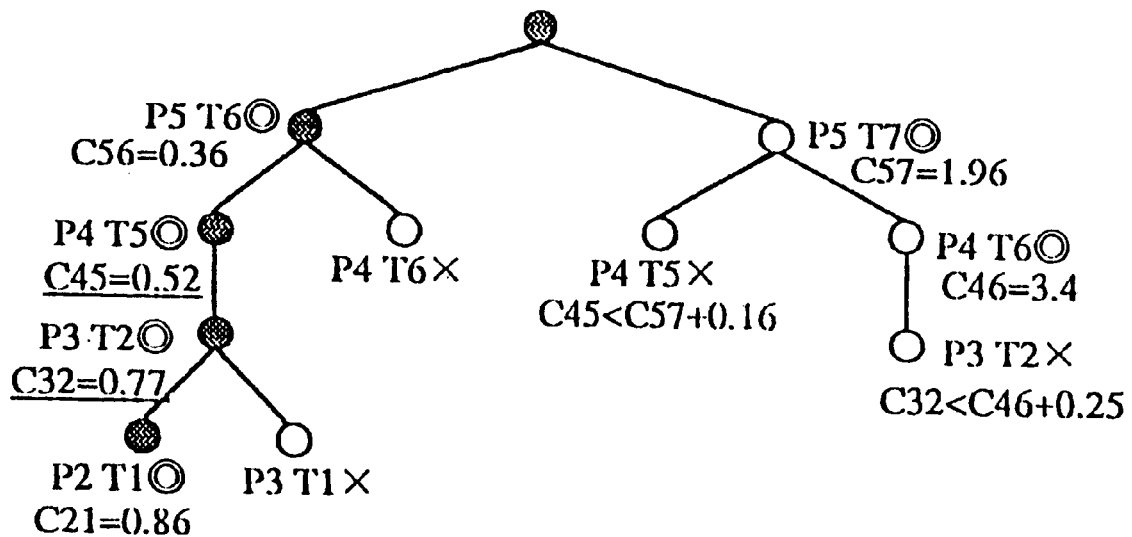
FIG. 29 is a diagrammatic view illustrating, in the form of a tree structure, an example of the longest common portion extraction processing (optimization search) by the common structure extraction apparatus.

FIG. 29 illustrates the processing procedure described hereinabove with reference to FIGS. 18 to 28 in the form of a single tree structure. From the matching table obtained as shown in FIG. 14, three combinations of point pairs which provide longest common portions of LCS=4 can be extracted. The combinations of point pairs are: ① (P5, T6)-(P4, T5)-(P3, T2)-(P2, T1); ② (P5 T7)-(P4, T5)-(P3, T2)-(P2, T1); and ③ (P5, T7)-(P4, T6)-(P3, T2)-(P2, T1).

In the longest common portion extraction processing in the present embodiment, however, optimization searching is performed introducing a cost function (square sum of the distances between points in pair), and a combination (route) of points in pair which provides a smallest value of the cost function (cumulative cost value), that is, which provides a smallest rmsd value, is extracted as a longest common portion (common structure) from among the three combinations.

Figure 30:
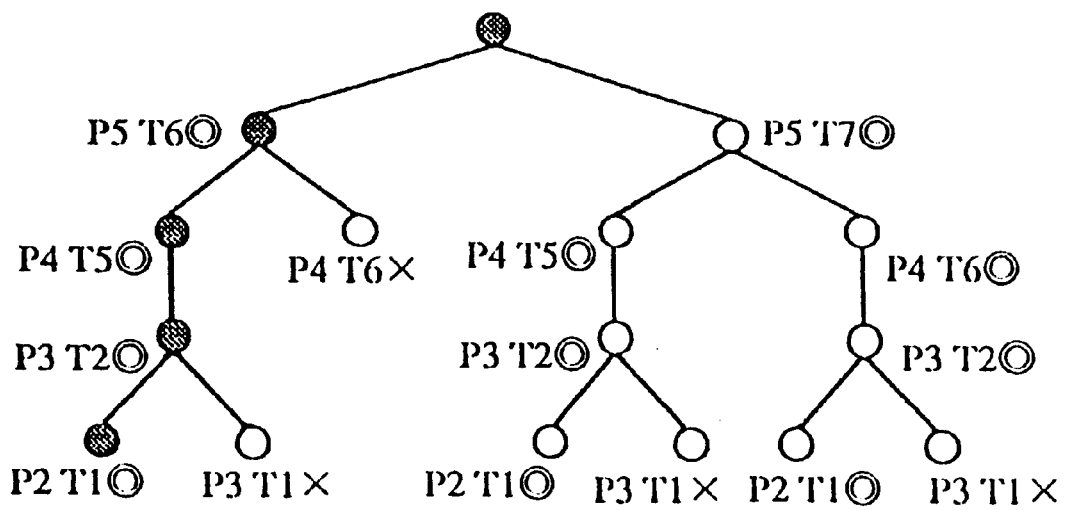
FIG. 30 is a similar view but illustrating an example of the longest common portion extraction processing by the common structure extraction apparatus by all solution searching.

Conversely, where such a cost function as described above is not introduced, that is, where all solution searching is employed, after the three combinations of point pairs which provide longest common portions of LCS=4 are all extracted, it is necessary to calculate an rmsd value for each of the combinations and select and extract one of the combinations which provides a smallest rmsd value as seen from FIG. 30. Accordingly, the processing time in this instance is very long compared with the processing time required when the optimization searching mentioned above is performed.

It is to be noted that, in FIGS. 29 and 30, the mark ⊙ represents a point pair determined as a node of an appropriate route, and the mark X represents a point pair determined as a node of an inappropriate route.

C5. Automatic Extraction of a Common Structure

Subsequently, an automatic extraction processing for a common structure (function of the analogous structure retrieval section 2 shown in FIG. 3) in the present embodiment will be described.

Where sequenced point sets A and B are given, a common structure is extracted from the point set B using a component of the point set A as a probe (search key). In the extraction processing, L elements (subset) are extracted in order beginning with the top element of the point set A in accordance with the sequential relationship of the point set A, and an analogous structure of each of the subsets is retrieved from the point set B. The retrieval method then may be a technique similar to that disclosed in Japanese Patent Laid-Open Application No. Heisei 6-180737 mentioned hereinabove.

Then, using each of the thus retrieved analogous structures as partial matching information, longest common portions are extracted by the technique described hereinabove with reference to FIGS. 5 to 29, and a structure which provides a greatest length among all combinations of point pairs which provide the longest common portions makes a longest common portion between the point sets A and B. that is, a common structure. In the following, the automatic extraction procedure of a common structure will be described below.

In particular, when the point set A includes elements $a_i$ ($1 \leq i \leq NA$), the following steps ① and ② are successively performed for $i=1, L+1, 2L+1, \ldots, NA-L+1$ (NA is a multiple of L):

① Using a subset $\{a_i, \ldots, a_i+L-_1\}$ of the point set A as a probe, a structure (analogous structure) analogous to the probe is retrieved from the point set B. ② Using a result of the retrieval by ① as partial matching information, a longest common portion between the point sets A and B is extracted.

By repetitively applying the steps ① and ② described above to all elements, a longest common portion (optimum common structure) can be determined.

C6. Extraction of a Nucleus Structure

Subsequently, operation of the nucleus structure extraction section 3 shown in FIG. 4 will be described with reference to FIGS. 31 to 44.

The nucleus structure extraction processing by the nucleus structure extraction section 3 is performed to extract a nucleus structure (a point set which makes a nucleus for appropriate superposition of two point sets) from two three-dimensional structures each formed from a point set which includes sequenced points at three-dimensional coordinates. It is to be noted that the following description proceeds on the assumption that the two three-dimensional structures are proteins PA and PB constituted from point sets A and B, respectively. However, it is a matter of course that a nucleus structure can be extracted by similar processing if two point sets in question have three-dimensional coordinates Further, where the three-dimensional structures are proteins, the point sets A and B can be taken, regarding amino acids constituting the proteins PA and PB as points, as sequenced sets of amino acids sequenced in accordance with the array numbers of the amino acids.

The procedure (algorithm) of the nucleus structure extraction processing in the present embodiment will be described with reference to a flow chart (steps S61 to S70) shown in FIG. 31.

Basically, the point set A constituting the protein PA is divided into a plurality of segments of a fixed length L by the segmentation section 3a, and the segments of the protein PA are taken out one by one beginning with the top one thereof by the segment retrieval section 3b, and then retrieval processing (step S63) which will be hereinafter described is performed for the protein PB using each segment as a retrieval key.

Figure 31:
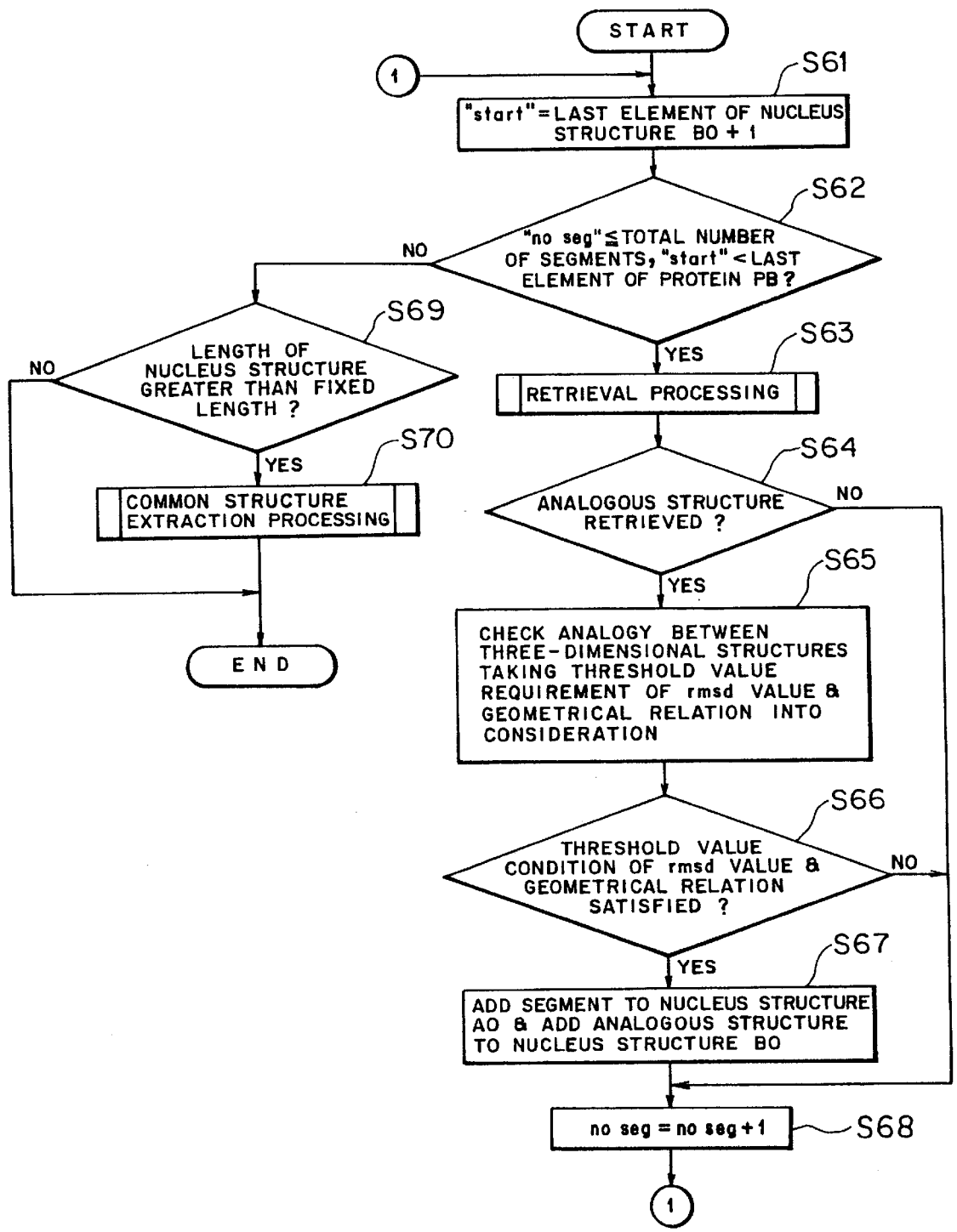
FIG. 31 is a flow chart illustrating a procedure of nucleus structure extraction processing by the common structure extraction apparatus.

In FIG. 31, "start" represents a value obtained by adding "1" to the number of the last element (point) of a nucleus structure B0 retrieved in the last cycle from the protein PB, and "no seg" represents the number of a segment which serves as a probe (retrieval key) in the present cycle among the segments of the protein PA.

The processing illustrated in FIG. 31 is performed for each segment, and when a nucleus structure B has been obtained already in the last cycle, an element next to the last element of the nucleus structure B0 is determined as a retrieval starting position "start" (step S61). It is to be noted that, when no nucleus structure B0 has been obtained, the retrieval starting position "start" is set to "start"="1".

Then, it is determined whether or not the number "no seg" of the probe segment is equal to or smaller than the total number of the segments and the number "start" representative of the retrieval starting position is smaller than the number representative of the last element of the protein PB (step S62). When the two requirements are satisfied, the retrieval processing is executed (step S63).

Figure 32:
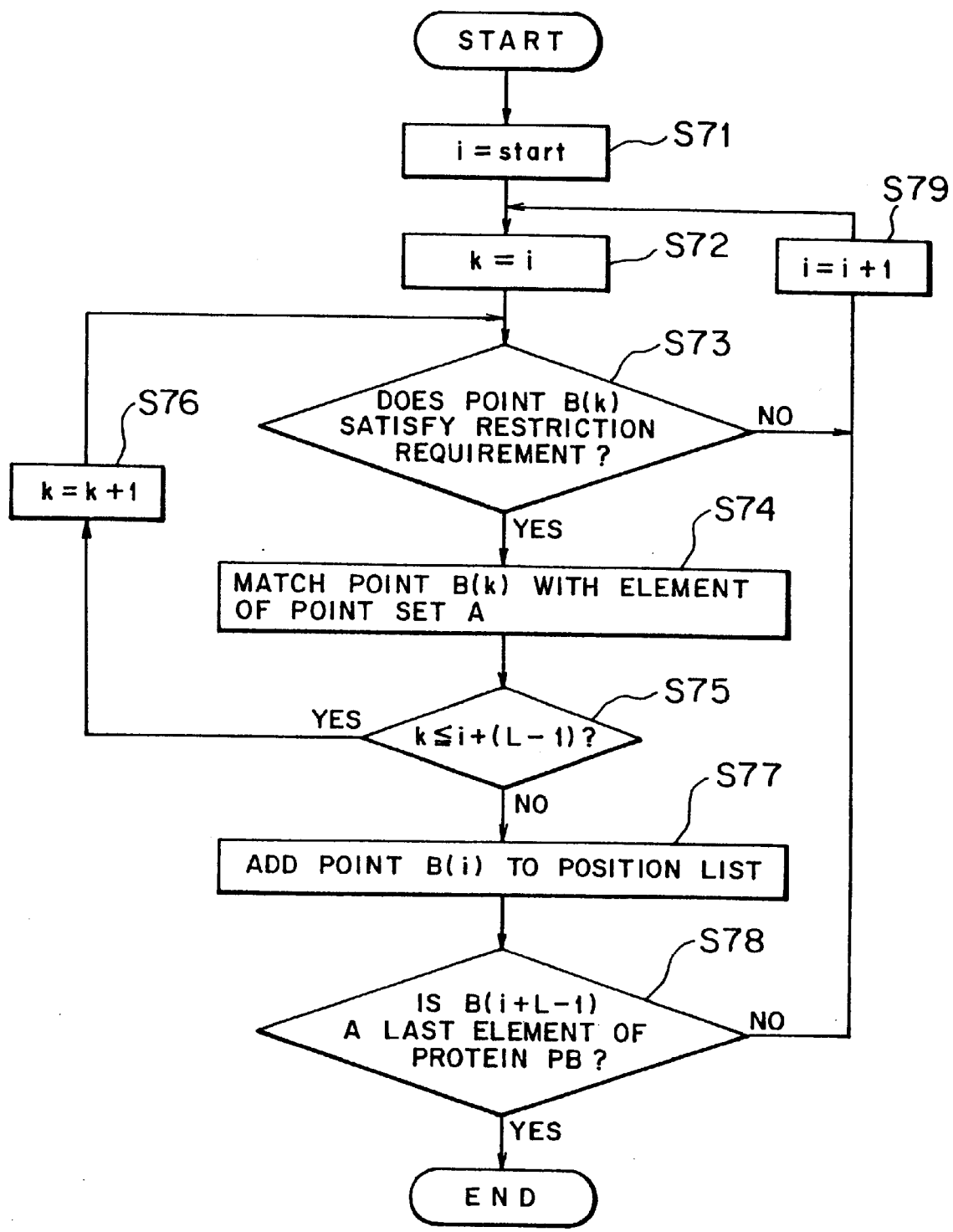
FIG. 32 is a flow chart illustrating a procedure of searching processing executed in the nucleus structure extraction processing illustrated in FIG. 31.

The algorithm of the retrieval processing at step S63will be described with reference to the flow chart (steps S71 to S79) shown in FIG. 32. As seen from FIG. 32, in the retrieval processing, the number "start" representative of the retrieval starting position described hereinabove is set as a number i (step S71), and the number i is set as a number k which designates an element (point) of the point set B (step S72), whereafter it is determined whether or not a point B(k) (an element corresponding to bk described hereinabove) of the point set B satisfies a restriction requirement (step S73).

When the restriction requirement is satisfied, the point B(k) is matched with the segment (subset of the point set A which includes L elements) which is selected as the probe at present (step S74). The matching is performed taking a geometrical relation between the point B(k) and elements of the segment of the point set A, a threshold value condition and so forth into consideration.

Then, it is determined whether or not the number k is equal to or smaller than i+(L−1) (step S75), and if k≦i+(L−1), then the number k is incremented by 1 (step S76), whereafter the control sequence returns to step S73.

By repeating the processing at steps S73 to S76, matching between the L elements of the point set B beginning with the point B(i) with the elements of the segment of the point set A is performed. On the other hand, when it is determined at step S73 that the point B(k) does not satisfy the restriction requirement, the number i is incremented by one (step S79), and then the control sequence returns to step S72 so that matching of next L elements of the point set B beginning with a point displaced by one with the segment of the point set A is performed subsequently.

When k>i+(L−1) is determined at step S75, since this signifies that the L elements of the point set beginning with the point B(i) are matched with the L elements of the segment of the point set A, the point B(i) is added to an area prepared as a position list (step S77).

Thereafter, it is determined whether or not the point B(i+L−1) is the last element of the protein PB (step S78), and if the point B(i+L−1) is not the last element, the control sequence returns to step S79 in order to repeat processing similar to that described above. But if the point B(i+L−1) is the last element, then the retrieval processing for the present segment of the point set A is ended, and the control sequence advances to step S64 of FIG. 31.

By the retrieval processing described above with reference to FIG. 32, L elements are successively selected in accordance with the sequence of components from the point set B constituting the protein PB, and matching between the L elements of the point set B and elements of the segment of the point set A is performed. Then, when all of the elements of the segment of the point A and the L segments of the point set B are matched (when an analogous structure is retrieved), the element B(i) of the point set B matched with the first element of the segment of the point set A is additionally recorded into the area prepared as the position list.

After the retrieval processing at step S63 is completed, it is determined whether or not an analogous structure has been retrieved by the retrieval processing (step S64), and if an analogous structure has been retrieved, that is, when an element of the point set B is recorded in the position list, analogy of a three-dimensional structure or structures is investigated based on all analogous structures recorded in the position list.

In particular, analogy of a three-dimensional structure is investigated by the analogy discrimination section 3c using a nucleus structure A0 and another nucleus structure B0 obtained formerly, a segment which has been used as a retrieval key in the present cycle and a matched analogous structure. In this instance, not only a threshold value requirement of a preset rmsd value is taken into consideration, but also a geometrical relation between a point set constituting a structure which includes the nucleus structure A0 and the segment and another point set having a structure including the nucleus structure B0 and the analogous structure (subset of the point set B) matched with the segment is taken into consideration (step S65).

Then, it is determined based on a result of the investigation of analogy at step S65 whether or not the threshold value requirement of the rmsd value and the geometrical relation are satisfied (step S66). If the requirements are satisfied, then the present segment and the analogous structure of the point set B matched with the segment are selected and added to the nucleus structure A0 and the nucleus structure B0, respectively, by the nucleus structure selection section 3d (step S67). Then, the number "no seg" of the probe segment is incremented by one (step S68) in order to prepare for advancement to nucleus structure extraction processing based on a next segment, and then the control sequence returns to step S61 to repeat processing similar to that described above.

It is to be noted that, when it is determined at step S64 that no analogous structure has been retrieved, or when it is determined at step S66 that the predetermined requirements have not been satisfied, the control sequence advances directly to step S68 so as to perform nucleus structure extraction processing based on a next segment.

When nucleus structure extraction processing has been performed up to the last segment or when the retrieval starting position comes to the last element of the protein PB, the requirements at step S62 described hereinabove are not satisfied any more, and consequently, the control sequence now advances to step S69.

At step S69, it is determined whether or not the length of the thus extracted nucleus structure is equal to or greater than a fixed value, and if the length is not equal to or greater than the fixed value, then the processing is ended, but if the length is equal to or greater than the fixed value, then the common structure extraction processing described hereinabove with reference to FIGS. 2 to 30 is executed using the nucleus structure as partial matching information (step S70). When a plurality of nucleus structures have been obtained, the common structure extraction processing is executed for each of the nucleus structures.

A detailed example of the nucleus structure extraction processing described above with reference to FIGS. 31 and 32 is illustrated in FIGS. 33 to 38.

Figure 33:
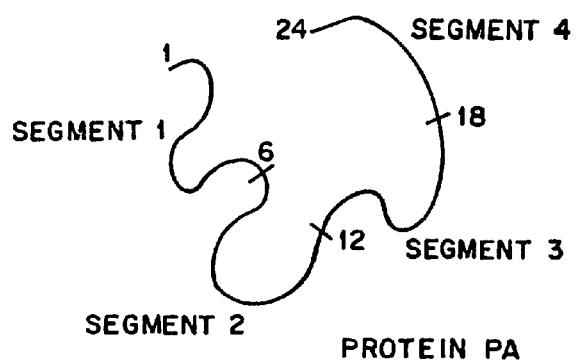
FIG. 33 is a diagrammatic view illustrating an example of nucleus structure extraction processing of the common structure extraction apparatus.

Referring first to FIG. 33, the protein PA (point structure A constituted from 24 points) is first divided into four segments of a fixed length L (=6), and then, the numbers ("no seg" described hereinabove) of 1 to 4 are applied to the segments. It is to be noted that the point set A of the protein PA is constituted from elements (points) designated by the array numbers 1 to 24 of amino acids constituting the protein PA, and the elements of the array numbers 1 to 6 are included in the segment 1; the elements of the array numbers 7 to 12 are included in the segment 2; the elements of the array numbers 13 to 18 are included in the segment 3; and the elements of the array numbers 19 to 24 are included in the segment 4.

Using each of the segments of the protein PA divided in this manner as a key, an analogous structure is retrieved from the protein PB. It is to be noted that, in FIGS. 34(A) to 38(B), (A) represents the structure of the protein PA, and the (B) represents the structure of the protein PB.

Figure 34A:
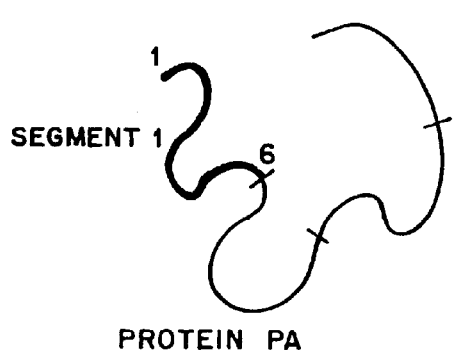
FIGS. 34(A) and 34(B), 35(A) and 35(B), 36(A) and 36(B), 37(A) and 37(B), and 38(A) and 38(B) are diagrammatic views illustrating different steps of the nucleus structure extraction processing illustrated in FIG. 33.
Figure 34B:
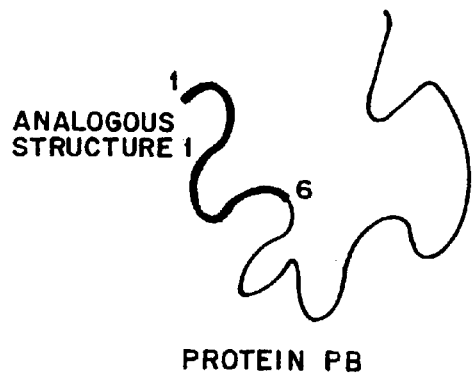

First, a structure analogous to the segment 1 of the protein PA is retrieved from the protein PB as seen from FIGS. 34(A) and 34(B). In this instance, if the elements of the array numbers 1 to 6 of amino acids constituting the protein PB are retrieved as an analogous structure 1 to the segment 1 as seen in FIG. 34(B), then the array numbers of the amino acids constituting the segment 1 are registered into a nucleus structure A0 and the array numbers of the amino acids constituting the analogous structure 1 are registered into another nucleus structure B0 as given below:

Nucleus Structure A0={11, 2, 3, 4, 5, 6}
Nucleus Structure B0={1, 2, 3, 4, 5, 6}

Figure 35A:
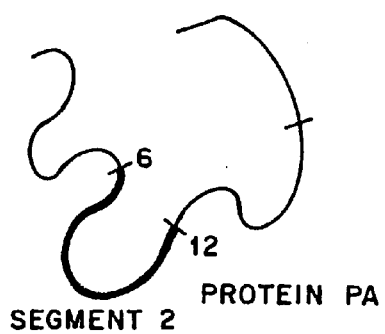
Figure 35B:
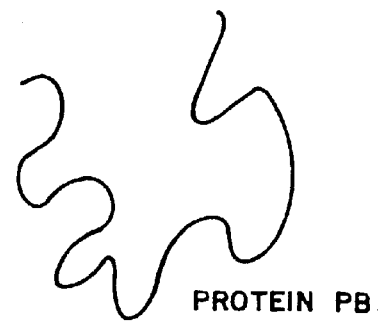

Subsequently, a structure analogous to the segment 2 of the protein PA is retrieved from the protein PB as seen from FIGS. 35(A) and 35(B). In this instance, since a structure analogous to the segment 2 is not retrieved from the protein PB as seen from FIG. 35(B), contents of the nucleus structures A0 and B0 are similar to those described hereinabove with reference to FIGS. 34(A) and 34(B).

Figure 36A:
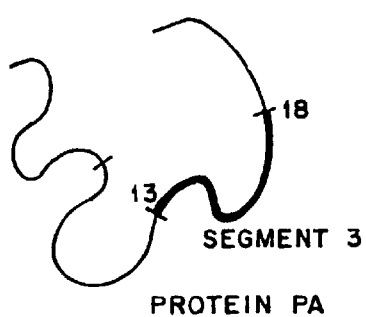
Figure 36B:
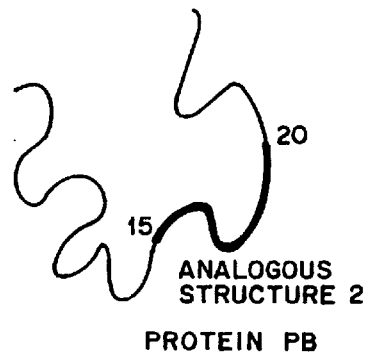
Figure 37A:
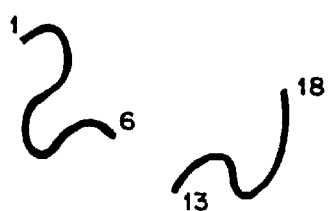
Figure 37B:
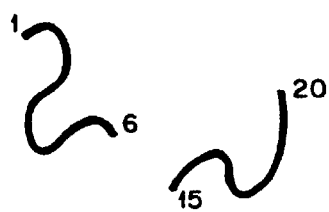

Thereafter, a structure analogous to the segment 3 of the protein PA is retrieved from the protein PB as seen from FIGS. 36(A) and 36(B). It is assumed here that the elements of the array numbers 15 to 20 of amino acids constituting the protein PB are retrieved as an analogous structure 2 to the segment 3 as seen from FIG. 36(B). In this instance, since the nucleus structures A0 and B0 are registered already, analogy between a structure including the segment 3 and the nucleus structure A0 and another structure including the analogous structure 2 and the nucleus structure B0 is investigated (processing at step S65 in FIG. 31).

If the determination of the analogy proves that the threshold value requirement of the rmsd value and the geometrical requirement of the point sets constituting the individual structures are satisfied, then the segment 3 and the analogous structure 2 are added to the nucleus structure A0 and the nucleus structure B0, respectively. As a result such nucleus structures A0 and B0 given below are obtained. The nucleus structures A0 and B0 are diagrammatically shown in FIGS. 37(A) and 37(B), respectively.

Nucleus Structure A0={11, 2, 3, 4, 5, 6, 13, 14, 15, 16, 17, 181}
Nucleus Structure B0={1, 2, 3, 4, 5, 6, 15, 16, 17, 18, 19, 20}

Figure 38A:
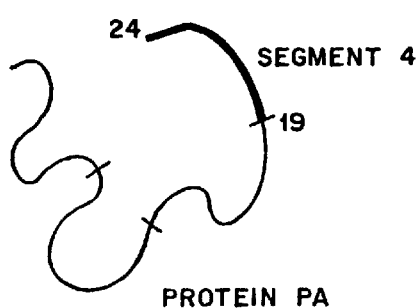
Figure 38B:
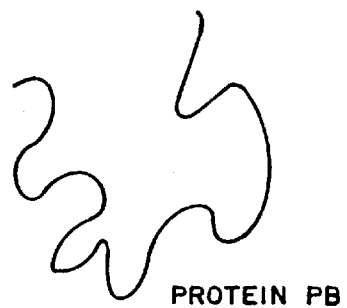

Finally, a structure analogous to the segment 4 of the protein PA is retrieved from the protein PB as seen from FIGS. 38(A) and 38(B). In this instance, since a structure analogous to the segment 4 is not retrieved from the protein PB as seen from FIG. 38(B), contents of the nucleus structures A0 and B0 are maintained. Since the retrieval processing based on the last segment is completed with this, the finally obtained nucleus structures are such as given above.

C7. Production of an Analogous Structure Map

While, in the nucleus structure extraction processing described hereinabove with reference to FIGS. 31 and 32, the nucleus structures A0 and B0 retrieved as structures analogous to a segment are extracted as sets of numbers representing individual elements as described above, in the following, production of an analogous structure map in which the relation of analogous structures (including nucleus structures) of two three-dimensional structures is illustrated and extraction of a nucleus structure using the analogous structure map will be described with reference to FIGS. 39 to 44(B).

First, a procedure (algorithm) of analogous structure map production in the present embodiment will be described with reference to a flow chart (steps S79 to S87) shown in FIG. 39.

Figure 39:
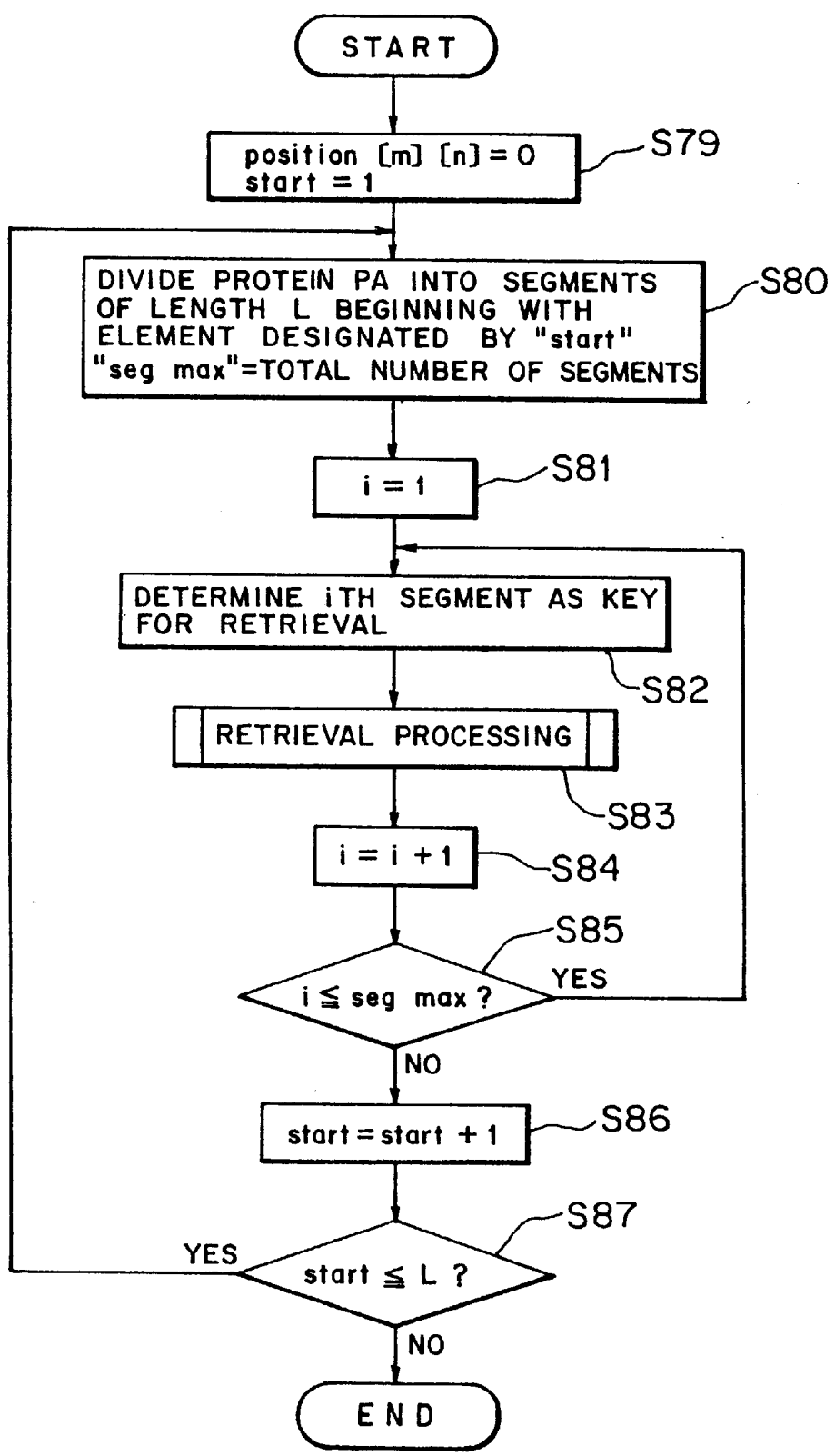
FIG. 39 is a flow chart illustrating a procedure of analogous structure map production processing by the common structure extraction apparatus.

In the procedure illustrated in FIG. 39, the numbers of elements (numbers of amino acids) constituting two proteins PA and PB which make an object for common structure extraction are represented by m and n, respectively. Further, the position at which segmentation is started is represented by "start", and the two-dimensional array (analogous structure map) for storing analogous structures is represented by "position [m] [n]".

Referring to FIG. 39, the two-dimensional array "position [m] [n]" is first initialized to "0" and the segmentation starting position "start" is initialized to "1" (step S79), and then the protein PA is divided into segments of a fixed length L beginning with the element at the segmentation starting position "start" (step S80). In this instance, the total number of the thus obtained segments is registered as "seg max".

Then, a number i for designating a segment is set to "1" (step S81), and designating the ith segment as a key for retrieval (step S82), retrieval processing is executed (step S83).

Figure 40:
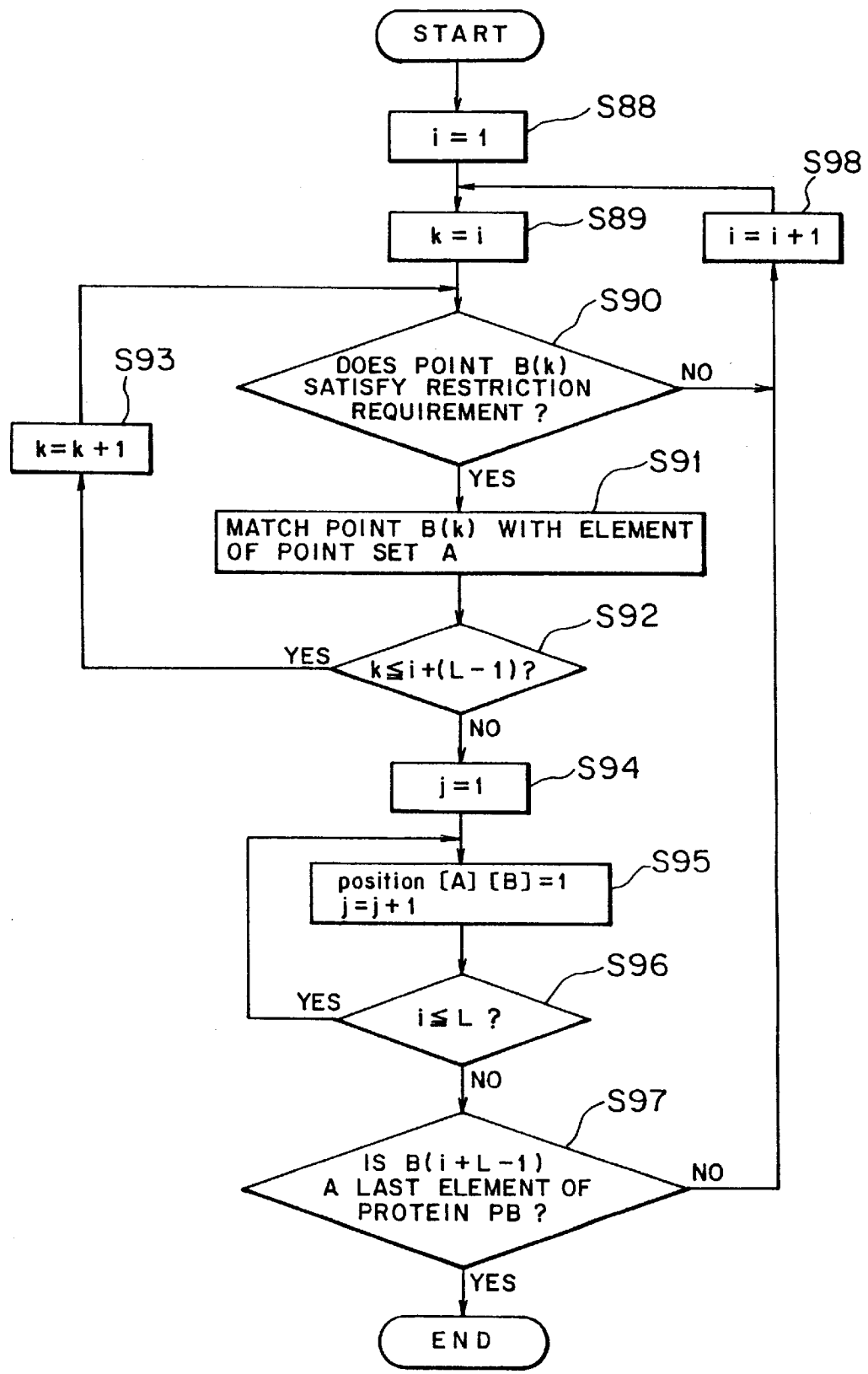
FIG. 40 is a flow chart illustrating a procedure of retrieval processing executed in the analogous structure map production processing illustrated in FIG. 39.

The algorithm of the retrieval processing at step S83 will be described with reference to a flow chart (steps S88 to S98) shown in FIG. 40. As seen from FIG. 40, also the retrieval processing is executed in a substantially similar manner as in the retrieval processing described hereinabove with reference to FIG. 32. Then, the number i is first set to "1" (step S88), and the number i is set as a number k for designating an element (point) of the point set B (S89), and then it is determined whether or not the point B(k) of the point set B satisfies the restriction requirement (step S90).

When the restriction requirement is satisfied, the point B(k) is matched with the segment (subset of the point set A which includes L elements) selected as a probe at present (step S91). The matching is performed taking the geometrical relation between the point B(k) and the elements of the segment of the point set A, a threshold value requirement and so forth into consideration.

Then, it is determined whether or not the number k is equal to or smaller than i+(L−1) (step S92), and if k≦i+(L−1), then the number k is incremented by one (step S93), whereafter the control sequence returns to step S90.

By repeating the processing at steps S90 to S93, matching of the L elements of the point set B beginning with the point B(i) with the elements of the segment of the point set A is performed. When it is determined at step S90 that the point B(k) does not satisfy the restriction requirement, the number i is incremented by one (step S98), and the control sequence returns to step S89 so that matching of elements of the point set B beginning with an element displaced by one element with the segment of the point set A is performed subsequently.

When k>i+(L−1) is determined at step S92, this signifies that the L elements of the point set B beginning with the point B(i) are matched with the L elements of the segment of the point set A.

In this instance, a number j is set to "1" (step S94), and the matched relation between the L points B(k) [i≦k≦i+(L−1)] matched with the segment of the point set A by the processing at steps S90 to S93 and the L elements of the segment of the point set A is registered one by one at the two-dimensional array "position [A] [B]" (step S95).

In particular, as hereinafter described with reference to FIG. 41, predetermined data "1" is placed into cross points between the positions (array numbers) of the L points B(k) matched with the segment of the point set A and the positions (array numbers) of the L elements of the segment of the point set A.

It is to be noted that, in this instance, when a matched relation is registered, the number j is incremented by one, and it is determined whether or not the number is equal to or smaller than L (step S96). If j≦L, then the control sequence returns to step S95. By repeating the processing at steps S95 and S96, the matching relation of the L pairs of elements matched in the present cycle is registered on the two-dimensional array "position [A] [B]".

Thereafter, it is determined whether or not the point B(i+L−1) is the last element of the protein PB (step S97), and if the point B(i+L−1) is not the last element, then the control sequence returns to step S98 to repeat processing similar to that described above, but if the point B(i+L−1) is the last element, then the retrieval processing for the present segment of the point set A is ended, and the control sequence advances to step S84 of FIG. 39.

By the retrieval processing described above with reference to FIG. 40, L elements are successively selected in accordance with the sequence of components from the point set B constituting the protein PB to perform matching between L elements of the point set B with the individual elements of the segment of the point set A. Then, when all of the elements of the segment of the point set A are matched with the L elements of the point set B (when an analogous structure is retrieved), the matching relation between the elements of the segment of the point set A and the element B(i) of the point set B matched with the elements of the point set is registered onto the two-dimensional array "position [A] [B]". In particular, in response to the matching relation, "1" is placed onto the two-dimensional array "position [element position of the protein PA] [element position of the protein PB]" on the analogous structure map for recording of a distribution of analogous structures.

Referring to FIG. 39, after the retrieval processing at step S83 is ended, the segment designation number i is incremented by one (step S84), and it is determined whether or not the new number is equal to or smaller than the total number "seg max" of the segments (step S85). If i≦"seg max", then the control sequence returns to step S82 to execute the retrieval processing described hereinabove with reference to FIG. 40 for a next segment of the point set A.

On the other hand, if i>"seg max" is determined at step S85, it is determined that the retrieval processing for all of the divisional segments beginning with the segmentation starting position "start" has been completed, and the segmentation starting position "start" is incremented by one (step S86). Then, it is determined whether or not the new segmentation starting position "start" is equal to or smaller than L (step S87).

If "start">L, then the analogous structure map production processing is ended, but if "start"≦L, then the control sequence returns to step S80 to repeat processing similar to that described above. In particular, the segmentation starting position "start" is displaced by one, and then segmentation of the point set A is performed, whereafter extraction of an analogous structure and production of an analogous structure map are executed for the new segment. By performing such processing, the point sets A and B can be matched with each other more accurately than where divisional segments whose segmentation starting positions are fixed are used as in the nucleus structure extraction processing described hereinabove with reference to FIGS. 31 and 32.

Subsequently, an example of an analogous structure map produced by the procedure described above with reference to FIGS. 39 and 40 will be described with reference to FIGS. 41(A) and 41(B).

Figures 41A, 41B:
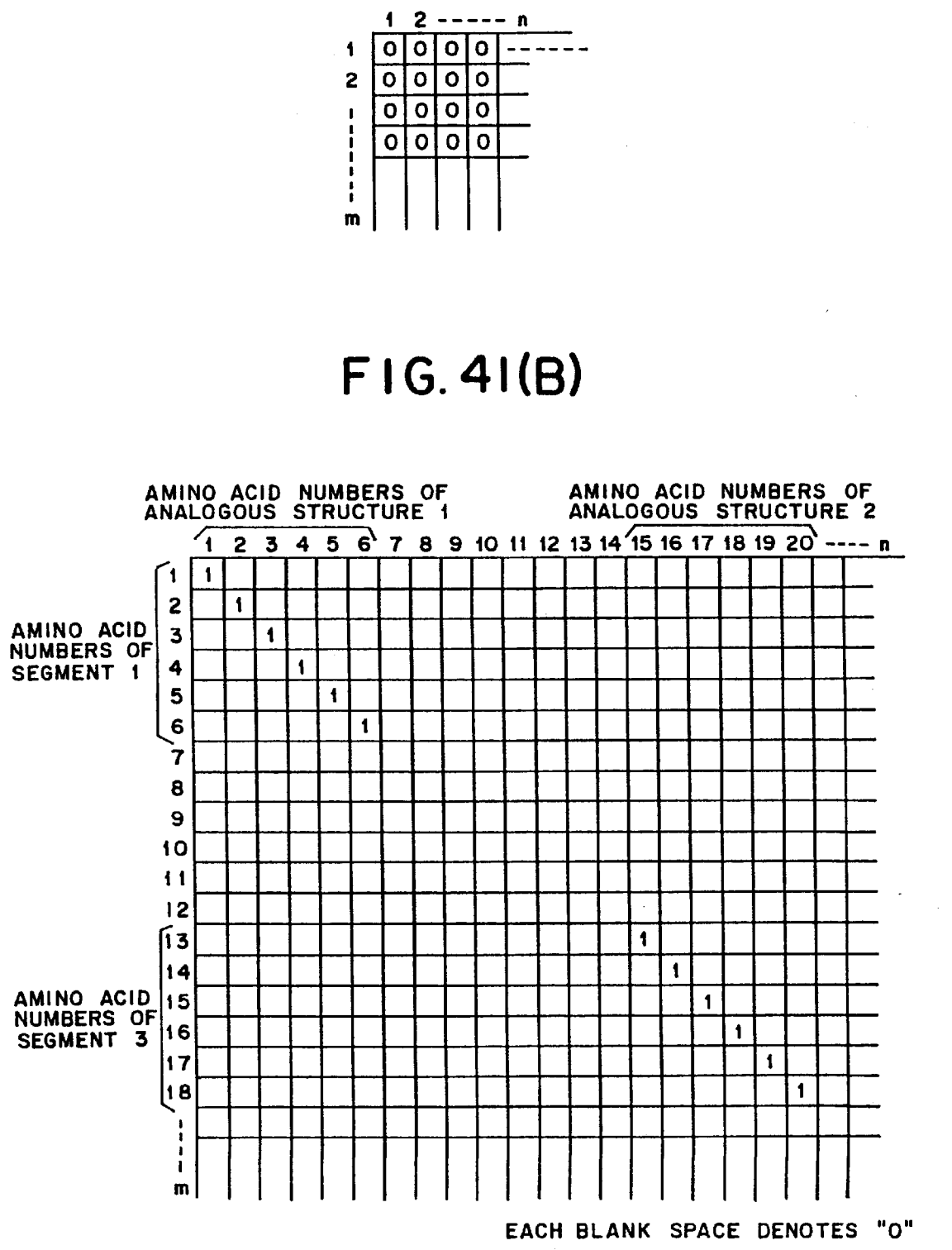

FIG. 41(A) shows the analogous structure map in an initialized state. As seen from FIG. 41(A), in the analogous structure map in the present embodiment, array numbers of amino acids constituting the protein PA are set in the direction of a row (length m) while array numbers of amino acids constituting the protein PB are set in the direction of a column (length n). In the initial condition, the two-dimensional arrays position [m] [n]" are all set to "0".

An analogous structure map produced by the analogous structure map production processing described hereinabove with reference to FIGS. 39 and 40 when the protein PA and the protein PB have the structures described hereinabove with reference to FIGS. 33 to 38 is shown in FIG. 41(B).

Referring to FIG. 41(B), the amino acids 1 to 6 of the protein PB are first matched as the analogous structure 1 with the segment 1 (amino acid array numbers 1 to 6) of the protein PA, and "1" is placed into positions (cross points) at which the amino acid array numbers of the segment 1 and the analogous structure 1 are matched with each other.

Thereafter, by successively performing matching after the segmentation starting position of the protein PA is displaced one by one, the segment 3 and the analogous structure 2 are matched similarly as in the example shown in FIG. 36, and "1" is placed into positions (cross points) at which the amino acid array numbers of the segment 3 and the analogous structure 2 are matched with each other. It is to be noted that "0" is placed in each blank area in FIG. 41(B).

C8. Extraction of a Nucleus Structure Based on an Analogous Structure Map

After an analogous structure map is produced in accordance with the procedure described hereinabove with reference to FIGS. 39 and 40, extraction of a nucleus structure is performed in the following manner.

The procedure (algorithm) of the nucleus structure extraction processing based on the analogous structure map in the present embodiment will be described with reference to a flow chart (steps S101 to S109) shown in FIG. 42.

Here, it is assumed that the two proteins which make an object for common structure extraction are a protein PA and another protein PB; the structures which make nuclei for best superposition of three-dimensional structures of the proteins PA and PB are a nucleus structure A0 and another nucleus structure B0, respectively; and the structures of analogous structure portions of the proteins PA and PB are analogous structures A1 and B1, respectively. Further, a two-dimensional array for recording a distribution of analogous structures is represented by "position [m] [n]", and the searching starting positions of the two-dimensional array "position [m] [n]" are represented by "a start" and "b start".

Figure 42:
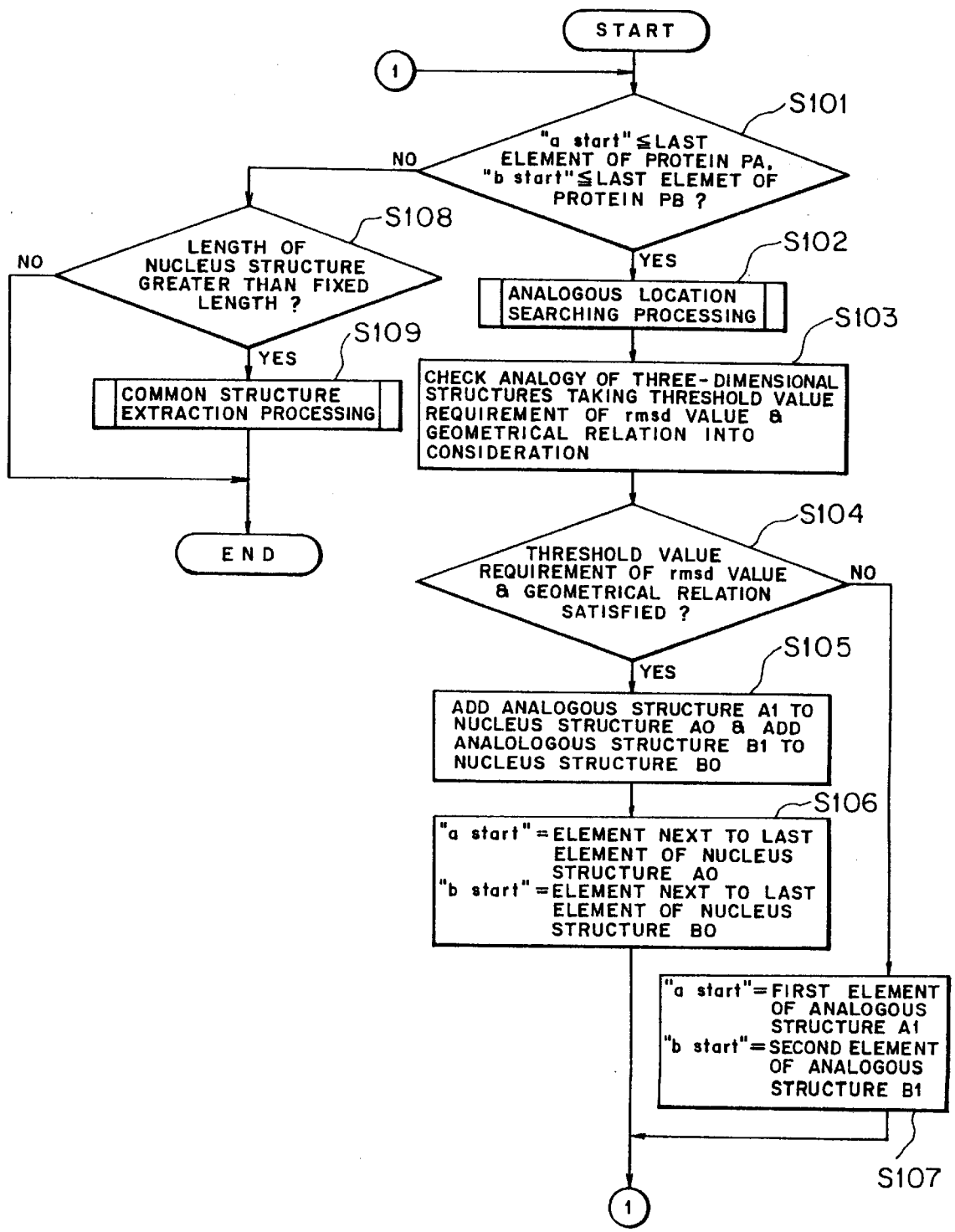
FIG. 42 is a flow chart illustrating a procedure of nucleus structure extraction processing by the common structure extraction apparatus based on the analogous structure map illustrated in FIGS. 41(A) and 41(B)

Referring to FIG. 42, it is first determined whether or not the searching starting positions "a start" and "b start" are the last elements of the proteins PA and PB, respectively (step S101), and if none of the searching starting positions "a start" and "b start" is the last element of any of the proteins PA and PB, analogous location searching processing is executed (step S102).

The algorithm of the analogous location searching processing at step S102 will be described with reference to a flow chart (steps S111 to S120) shown in FIG. 43.

Here, of analogous locations, an analogous location of the structure of the protein PA is represented by A[k], and an analogous location of the structure of the protein PB is represented by B[m]. Further, as described above, the two-dimensional array for recording a distribution of analogous structures is represented by "position [m] [n]", and the searching starting positions of the two-dimensional array "position [m] [in]" are represented by "a start" and "b start".

Figure 43:
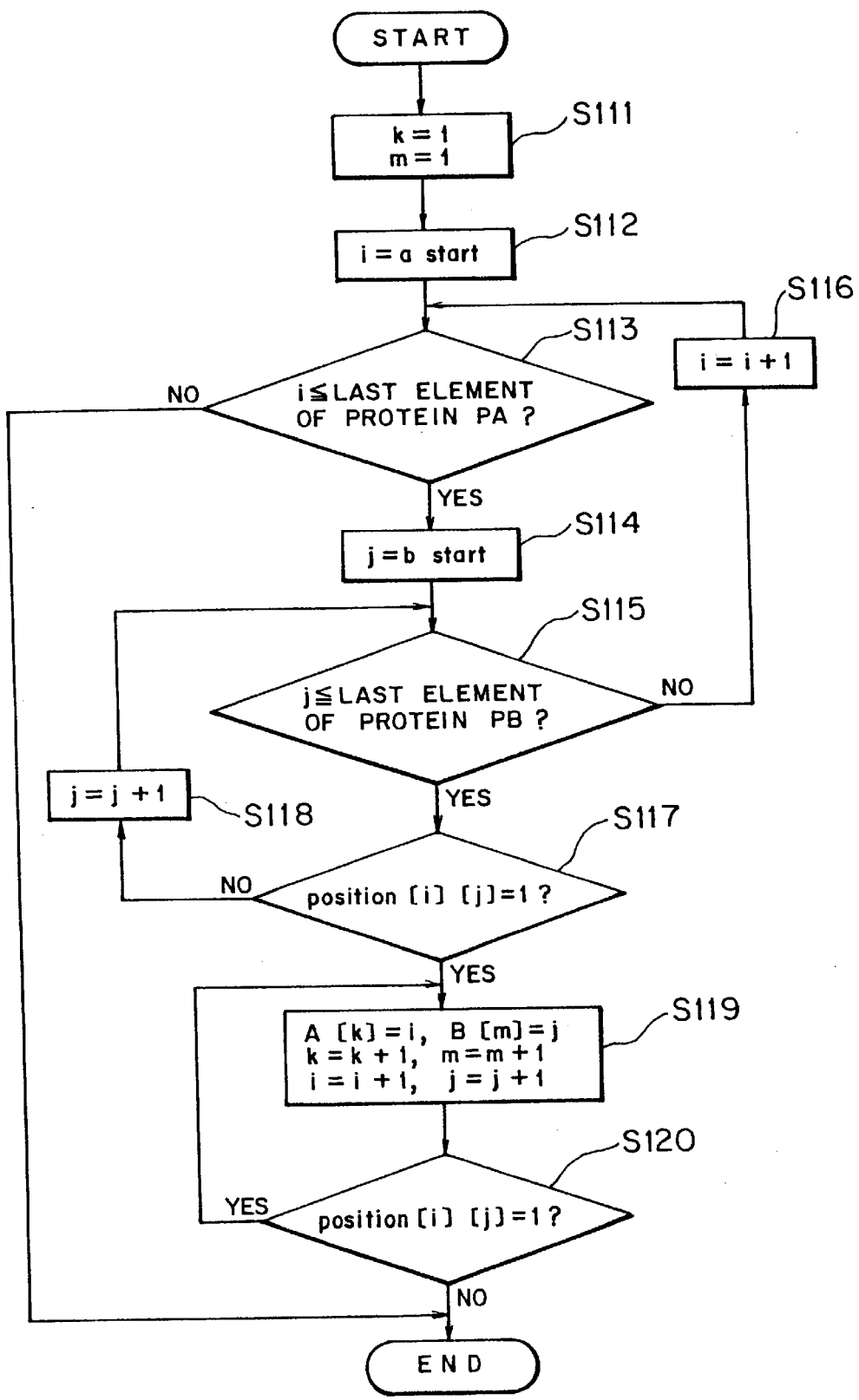
FIG. 43 is a flow chart illustrating a procedure of analogous portion searching processing executed in the nucleus structure extraction processing illustrated in FIG. 42.

Referring to FIG. 43, in the analogous location searching processing illustrated, k and m are first initialized to k=1 and m=1, respectively (step S111), and then a number i is set to the searching starting position "a start" of the protein PA (step S112), whereafter it is determined whether or not the number i is the last element of the protein PA (step S113). If the number i is the last element of the protein PA, then the analogous location searching processing is ended, and the control sequence advances to step S103 of FIG. 42. On the other hand, if the number is not the last element of the protein PA, a number j is set to the searching starting position "b start" of the protein PB (step S114).

Then, it is determined whether or not the number j is the last element of the protein PB (step S115), and if the number j is the last element of the protein PA, then the number i is incremented by one (step S116), and then the control sequence returns to step S113. But if the number j is not the last element of the protein PB, it is determined whether or not a two-dimensional array "position [i] [j]" of the analogous structure map (in the initial state, the first column of the first row) is "1" (step S117).

If the two-dimensional array "position [i] [j]" is not "1" but "0", the control sequence returns to step S115. But if the two-dimensional array "position [i] [j]" is "1", then A[k]=i and B[m]=j are set as analogous locations of the proteins PA and PB, and the numbers k, m, i and j are each incremented by one (step S119), whereafter it is determined whether or not the next array position (position displaced downwardly by one row and rightwardly by one column from the precedent position) "position [i], [j]" is "1" (step S120).

If the determination at step S120 proves that the array position "position [i] [i]" is "1", then the control sequence returns to step S119 to search an analogous location in a similar manner as described above. But if the array position "position [i] [j]" is not "1" but "0", then the analogous location searching processing is ended, and the control sequence advances to step S103 of FIG. 42.

After the analogous location searching processing at step S102 is completed, analogy between the three-dimensional structures is investigated from both of the analogous structures A1 and B1 obtained by the analogous location searching processing and the nucleus structures A and B obtained formerly. In this instance, not only a threshold value requirement of a preset rmsd value is taken into consideration, but also the geometrical relation between a point set constituting a structure including both of the nucleus structure A0 and the analogous structure Al and another point set constituting another structure including both of the nucleus structure B0 and the analogous structure B1 is taken into consideration (step S103).

Then, it is determined in accordance with a result of the investigation for analogy at step S103 whether or not the threshold value requirement of the rmsd value and the geometrical relation are satisfied (step S104), and when those requirements are satisfied, the analogous structures A1 and B1 are added to the nucleus structures A0 and B0, respectively (step S105).

Thereafter, the searching starting positions "a start" and "b start" are set to next elements to the last elements of the nucleus structures A0 and b0, respectively (step S106), and then the control sequence returns to step S101 to repeat processing similar to that described above.

On the other hand, when it is determined at step S104 that the predetermined requirements are not satisfied, the analogous structures A1 and B1 are not added to the nucleus structures A0 and B0, but the searching starting position "a start" of the protein PA is set to the first element of the analogous structure A1 and the searching starting position "b start" of the protein PB is set to the second element of the analogous structure B1 (step S107). Thereafter, the control sequence returns to step S101 to repeat processing similar to that described above.

While the processing described above is performed repetitively, if it is determined at step S101 that the searching starting positions "a start" and "b start" designate the last elements of the proteins PA and PB, then it is determined whether or not the length of the extracted nucleus structure is equal to or greater than a fixed value (step S108). If the length is not equal to or greater than the fixed value, then the processing is ended, but if the length is equal to or greater than the fixed value, then the common structure extraction processing described hereinabove with reference to FIGS. 2 to 30 is executed using the nucleus structure as partial matching information (step S109). If a plurality of nucleus structures have been obtained, then the common structure extraction processing is executed for each of the nucleus structures.

C9. Narrowing Down of Candidates Based on a Geometrical Relation

By matching the elements of the point sets A and B based on a geometrical relation in the nucleus structure extraction processing (FIGS. 31, 42 and so forth) described hereinabove, production of useless combinations of point pairs can be prevented and the point sets A and B can be matched with each other efficiently. In the following, the geometrical restriction will be described.

Upon matching of elements, candidates to be matched can be narrowed down by selecting and matching only those points with which the difference between a distance relation $|a_i-a_{i-s}|$ which stands between an element $a_i$ in the point set A and adjacent s ($1 \leq s \leq i-1$) points and another distance relation $|b_j-b_{j-s}|$ between an element $b_j$ ($1 \leq s \leq j-1$) in the point set B and adjacent s elements is within a tolerance $\Delta d$ ($\||a_i-a_{i-s}|-|b_j-b_{j-s}|\| \leq \Delta d$).

Figure 44A:
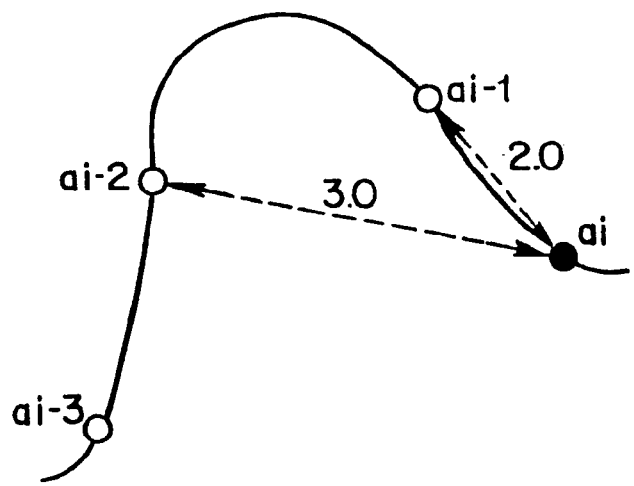
FIGS. 44(A) and 44(B) are diagrammatic views illustrating narrowing down of candidates based on a geometrical relation (distance relation among n points)
Figure 44B:
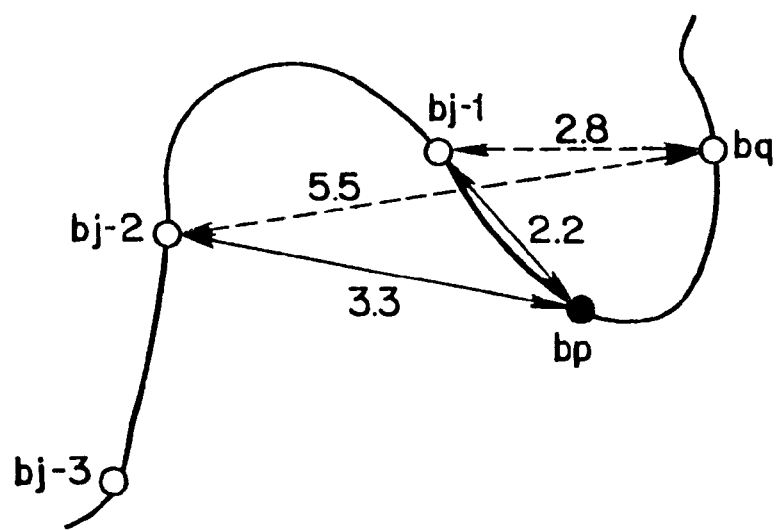

FIGS. 44(A) and 44(B) illustrate an example wherein narrowing down of candidates based on a geometrical relation is applied to selection of a point $b_j$ in the point set B to be matched with an element $a_i$ in the point set A.

In the point set A shown in FIG. 44(A), the distance relations which stand between the element $a_i$ and adjacent s=2 points $a_{i-1}$ and $a_i-2$ in the point set A are $|a_i-a_{i-1}|=2.0$ and $|a_i-a_{i-2}|$ 32 3.0, respectively.

Upon matching of a point in the point set B shown in FIG. 44(B) with the element $a_i$, distance relations $|b_j-b_{j-s}|$ between elements $b_p$ and $b_q$ which make candidates and adjacent two elements $b_{j-1}$ and $b_{j-2}$ in the point set B are calculated, and only those points with which the differences of the distance relations $|b_j-b_{j-s}|$ from the distance relations $|a_i-a_{i-1}|=2.0$ and $|a_i-a_{i-2}|=3.0$ illustrated in FIG. 44(A) remain within the tolerance $\Delta d=0.5$ to narrow the candidates.

In the example illustrated in FIG. 44(B), since $|b_q-b_{j-1}|=2.8$; $|b_q-b_{j-2}|=5.5$; $|b_p-b_{j-1}|=2.2$; and $|b_p-b_{j-2}|=3.3$, comparison of the distances between the corresponding points as a geometrical relation reveals that only the point $b_p$ satisfies the requirement that the distance relation thereof is within the tolerance $\Delta d=0.5$. Consequently, the candidates for the point $b_j$ corresponding to the element $a_i$ are narrowed down to the point $b_p$.

C10. Narrowing Down of Candidates Based on a Threshold Value Requirement

Further, by setting a suitable threshold value in the nucleus structure extraction processing (FIGS. 31, 42 and so forth) described above and excepting a candidate when an attribute value of the candidate is higher than the threshold value, matching between the point sets A and B can be performed efficiently.

For example, narrowing down of candidates is performed by restriction with an rmsd value. In particular, if the rmsd value between all points matched formerly is degraded extremely by matching an element $b_j$ of the point set B with an element $a_i$ of the point set A, it is desirable to except the point $b_j$ from a candidate in matching. Therefore, the rmsd value between all points when the element $b_j$ is matched with the element $a_i$ is calculated, and if the rmsd value is smaller than a predetermined threshold value, the point $b_j$ is selected as a candidate for matching, but if the rmsd value exceeds the predetermined threshold value, the point $b_j$ is excepted from a candidate for matching. Consequently, candidates for matching can be determined narrowing down them efficiently.

D. System to Which the Apparatus of the Present Embodiment is Applied

Figure 80:
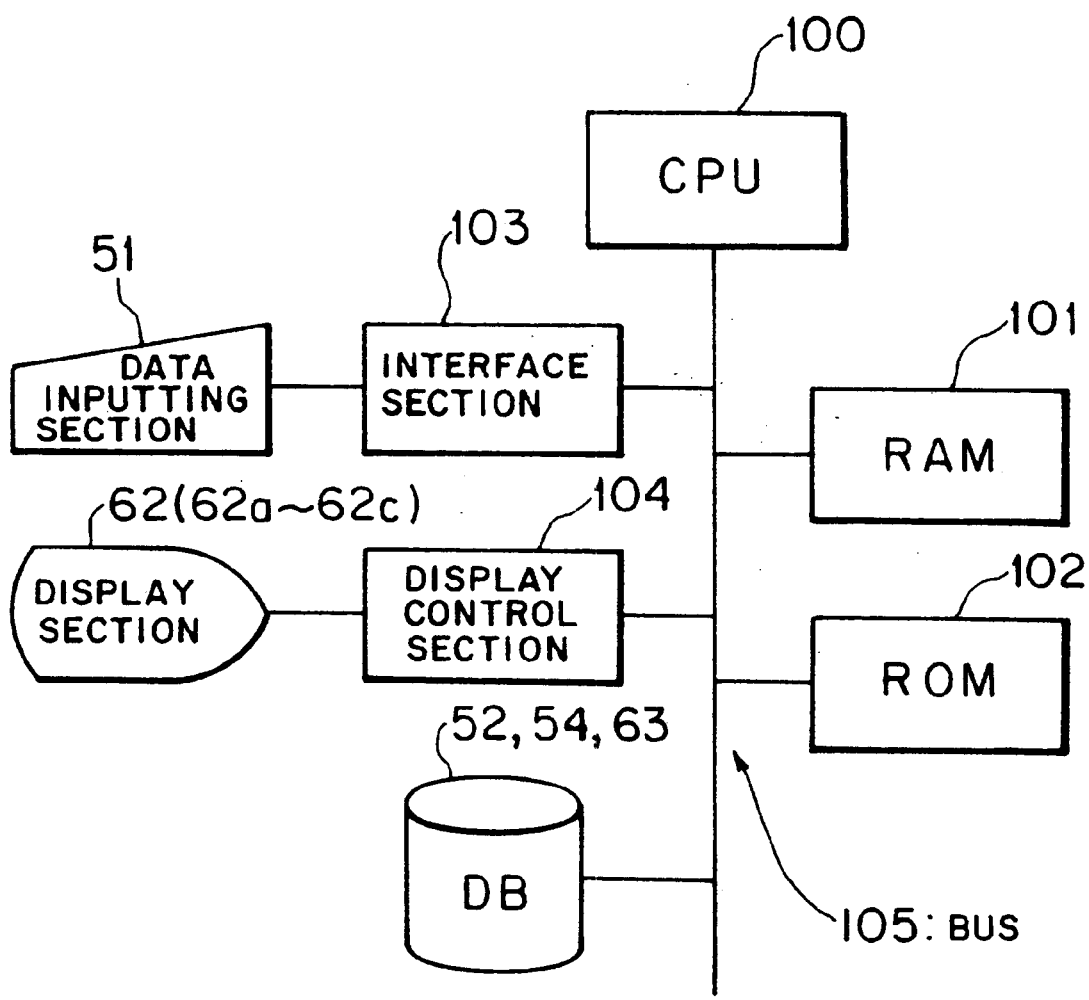
FIG. 80 is a block diagram showing an example of construction of a computer system for realizing the common structure extraction apparatus shown in FIG. 2.

First, an example of construction of a computer system for realizing the common structure extraction apparatus of the present embodiment will be described with reference to FIG. 80.

The computer system shown includes a CPU 100, a RAM 101 which is used as a working area upon processing operation of the CPU 100, and a ROM 102 in which a program and various data necessary for common structure extraction processing which will be hereinafter described are stored.

The computer system further includes an interface section 103 for performing interface processing with a data inputting section (a keyboard, a mouse or the like) 51 which will be hereinafter described, a display control section 104 for controlling the displaying condition of a display unit or units 62 (62a to 62c) which will be hereinafter described, and a bus 105 interconnecting the CPU 100, the RAM 101, the ROM 102, the interface section 103 and the display control section 104.

Also data bases (DBs) 52, 54 and 63, which will be hereinafter described, are connected to the bus 105 so that data may be retrieved from the data bases 52, 54 and 63 by way of the bus 105 by the CPU 100.

The CPU 100 executes the program (software) stored in the ROM 102 so that it functions as an analogous structure retrieval section 53, a common structure extraction section 55, a nucleus structure extraction section 64, an analogy discrimination section 65 and/or a function estimation section 67. Accordingly, the common structure extraction apparatus of the present embodiment can be realized with such computer system as shown in FIG. 80.

Figure 45:
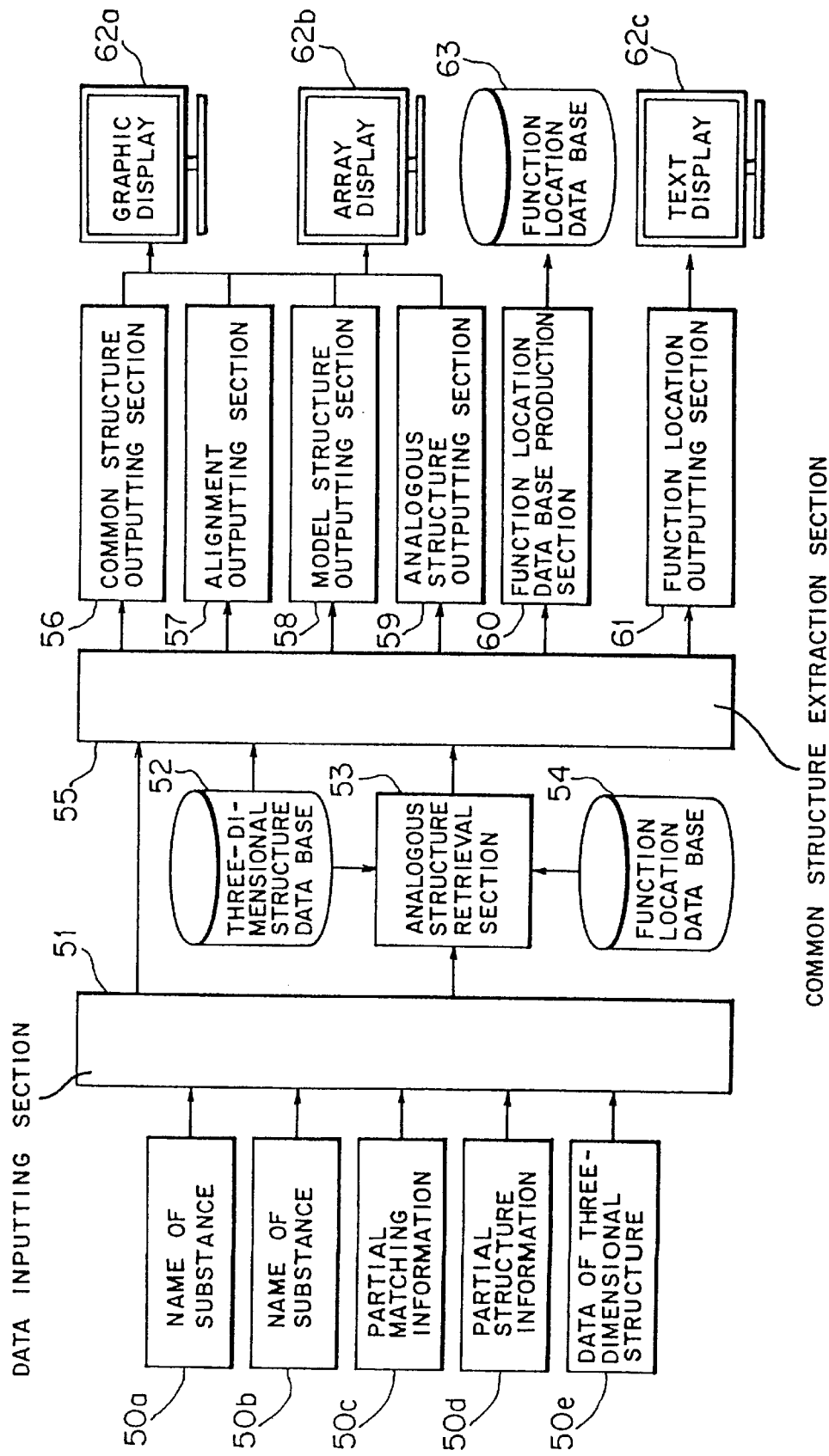
FIG. 45 is a block diagram showing a system which is constructed using a common structure extraction section and the analogous structure retrieval section of the common structure extraction apparatus.

FIG. 45 shows the construction of a system which is constituted employing the common structure extraction section and the analogous structure retrieval section according to the present embodiment described above.

In the following description, object three-dimensional structures from which a common structure is to be extracted are three-dimensional structures of proteins. Basically, however, three-dimensional structures which make an object for extraction are not particularly limited only if object structures have three-dimensional coordinates. Since also such a three-dimensional structure as a ribonucleic acid (RNA) is regarded as a sequenced point set, the present technique can be applied as it is to extraction of a common portion between such structures. Further, the present technique can be applied also to general molecular structures.

It is to be noted that, upon actual calculation, coordinates of α carbons (Cα) of amino acids constituting a protein are used as positions of the amino acids, and serial numbers of a carbons registered in the PDB (Protein Data Bank) are used as amino acid residue numbers (amino acid array numbers). Therefore, an amino acid array number is sometimes different from an original amino acid residue number.

The system shown in FIG. 45 is actually constructed using an information processing apparatus and includes, in addition to a CPU and a memory (for storage of data and programs) not shown, inputting and outputting apparatus such as a keyboard, a mouse or the like for inputting various data and a display unit, a printer or the like for three-dimensional display of a three-dimensional structures alignment display of amino acids of a protein, display of text data and so forth. The system further includes a file storage apparatus constituting data bases 52 and 54. Various functions of components of the present system which will be hereinafter described with reference to FIG. 45 can be executed by control processing (algorithms) of the CPU and the individual components.

By combining different components of the system construction, various common structure extraction apparatus having functions of the following items ① to ⑥ (detailed constructions and operation of the individual apparatus will be hereinafter described) can be constructed individually. It is apparent that apparatus having combinations of different ones of the functions of the items ①  to ⑥ can be constructed similarly.

①  Common structure extraction apparatus which displays a three-dimensional structure;

②  Common structure extraction apparatus which performs alignment display;

③  Common structure extraction apparatus which supports modeling;

④  Common structure extraction apparatus which retrieves a three-dimensional structure;

⑤  Common structure extraction apparatus which produces a function location data base; and ⑥  Common structure extraction apparatus which performs function estimation.

Referring to FIG. 45, reference characters 50a to 50e denote various input data inputted for various applications such as, for example, names of two substances (proteins) P and T which make an object for extraction of a common structure, partial matching information, partial structure information, and data of a three-dimensional structure.

The system shown includes a data inputting section 51 for inputting input data 50a to 50e and acts as an interface for supplying the input data 50a to 50e to various components of the system. Actually, the data inputting section 51 is constituted from a keyboard, a mouse or the like.

The system further includes a three-dimensional structure data base 52 in which data of three-dimensional structures of substances (for example, three-dimensional coordinate data of amino acid residues constituting various proteins or the like) are stored in advance, and an analogous structure retrieval section 53 for retrieving an analogous structure between two substances (proteins). The analogous structure retrieval section 53 has a same function as that of the analogous structure retrieval section 2 described hereinabove with reference to FIG. 3.

The system further includes a function location data base 54 in which functions of substances and three-dimensional structures (function locations) relating to the functions are stored in advance, and a common structure extraction section 55 having a same function as that of the common structure extraction section 1A described hereinabove with reference to FIGS. 5 to 30.

The system further includes a common structure outputting section 56 (for a three-dimensional structure display unit) for outputting display data in order to allow a common structure extracted by the common structure extraction section 55 to be displayed, an alignment outputting section 57 (for an alignment apparatus) for outputting array (alignment) data of elements constituting a three-dimensional structure of a substance (a common structure extracted by the common structure extraction section 55), and a model structure outputting section 58 (for a modeling supporting apparatus) for outputting a common structure extracted by the common structure extraction section 55 as three-dimensional coordinate information.

The system further includes an analogous structure outputting section 59 (for a three-dimensional structure retrieval apparatus) for outputting an attribute of an analogous structure, an rmsd value and a length of a longest common portion based on a result of retrieval by the analogous structure retrieval section 53 and a result of extraction by the common structure extraction section 55, and a function location data base production section 60 (for a function location data base production apparatus) for outputting and registering a function of a substance and a three-dimensional structure (function location) relating to the function to and into a function location data base 63 based on a result of retrieval by the analogous structure retrieval section 53 and a result of extraction by the common structure extraction section 55.

It is to be noted that, while the function location data base 63 into which data are registered by the function location data base production section 60 is described to be separate from the function location data base 54 described hereinabove, the two function location data bases 54 and 63 may otherwise be formed as a single data base such that the function location data base 63 produced by the function location data base production section 60 can be used as it is as the function location data base 54.

The system further includes a function location outputting section 61 for a function estimation apparatus. The function location outputting section 61 specifies, for a three-dimensional structure having an unknown function, and outputs, a function of the three-dimensional structure and a structure (function location) relating to the function based on a result of extraction by the common structure extraction section 55.

The system further includes display units (display sections) 62a to 62c for displaying information regarding a three-dimensional structure extracted by the apparatus of the present embodiment.

For example, the display unit 62a receives data from the common structure outputting section 56, the model structure outputting section 58 and the analogous structure outputting section 59 and displays a three-dimensional structure, a model structure, an analogous structure and so forth of the substance as three-dimensional graphics.

Meanwhile, the display unit 62b receives array data from the alignment outputting section 57 and displays a three-dimensional structure, a model structure, an analogous structure and so forth of a substance by array display (alignment display: display in a condition in which information regarding different points constituting a three-dimensional structure is displayed in a juxtaposed relationship in accordance with an array sequence).

Further, the display unit 62c receives data from the function location outputting section 61 and displays a function location of a protein by text display.

It is to be noted that, while the display units 62a to 62c are described to be separate display units from one another, they may otherwise be constructed as a single display unit.

In the following, examples of constructions of various apparatus (the apparatus described in the items ① to ⑥ above) realized by combinations of the components of the system shown in FIG. 45 will be described with reference to FIGS. 46 to 63.

D1. Common Structure Extraction Apparatus Which Displays a Three-Dimensional Structure (a Common Structure Extraction Apparatus Which Performs Alignment Display, a Common Structure Extraction Apparatus Which Supports Modeling)

Generally, upon analysis of a relation between a structure and a function of a substance, since structures of different substances are superposed with each other to proceed with an analyzing operation while discriminating a common structure or a specific structure, an apparatus by which the substances can be superposed with each other simply to display a common structure is required.

Figure 46:
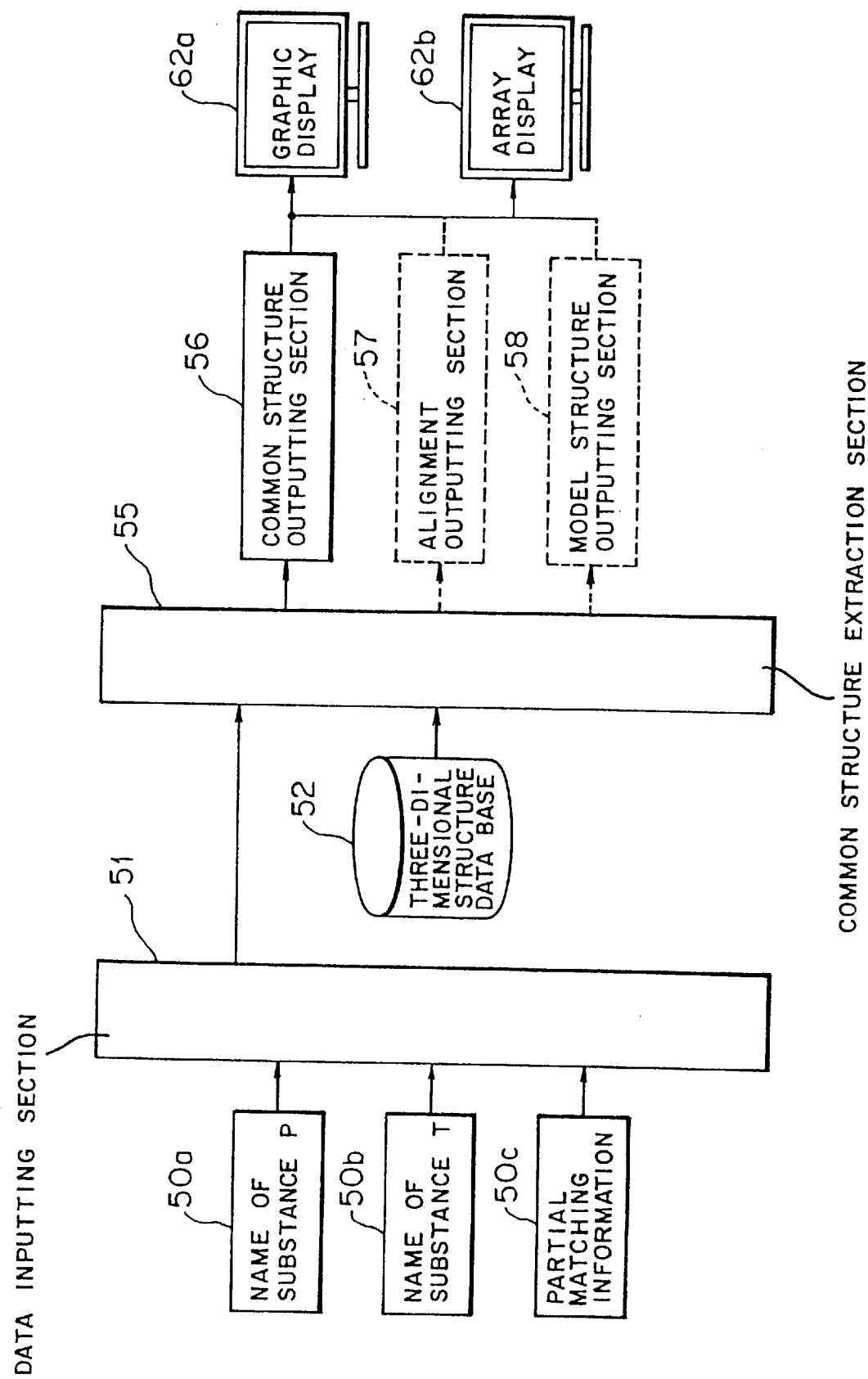
FIG. 46 is a block diagram showing components which cooperatively function as a common structure extraction apparatus having a function of displaying a three-dimensional structure.

In the present embodiment, the apparatus just described can be constructed in such a manner as shown in FIG. 46. FIG. 46 shows components which cooperatively function as a common structure extraction apparatus which displays a three-dimensional structure. Since the construction of a principal portion of the apparatus which displays a three-dimensional structure is same as that of another apparatus which performs alignment display or supports modeling, FIG. 46 also displays another common structure extraction apparatus which performs alignment display and a further apparatus which supports modeling.

In the following, functions and operation of the principal portion of the apparatus shown in FIG. 46 which operates as an apparatus which displays a three-dimensional structure will be described in detail.

The data inputting section 51 includes an interface for inputting input data 50a to 50c. Thus, from the data inputting section 51, the names of substances P and T from which a common structure should be extracted by way of superposition are inputted as the input data 50a and 50b, respectively, and partial matching information which designates a position at which superposition should be performed is inputted as the input data 50c. The input data 50a to 50c are fed to the common structure extraction section 55.

The three-dimensional structure data base 52 stores in advance therein, names of substances, kinds of atoms constructing the substances (where the substances are proteins, kinds of amino acids), three-dimensional coordinates of the atoms or amino acids and so forth.

The common structure extraction section 55 fetches from the three-dimensional structure data base 52 three-dimensional structures (three-dimensional coordinates) of substances corresponding to the names of the two substances P and T inputted from the data inputting section 51, superposes the thus fetched two three-dimensional structures (point sets) based on partial matching information, extracts, from the two three-dimensional structures, a common structure which exhibits a greatest length and a lowest rmsd value in accordance with the procedure described hereinabove with reference to FIGS. 2 and 5 to 30, and sends a result of the extraction to the common structure outputting section 56. In the extraction processing, the three-dimensional structure of each protein is regarded as a sequenced point set in accordance with an array sequence of amino acids constituting the protein, and a common structure is extracted by the processing described hereinabove.

The common structure outputting section 56 produces display data to be displayed on the display unit 62a In order to display a common structure by three-dimensional graphic display based on a result of extraction by the common structure extraction section 55. In this instance, two three-dimensional structures each formed from a set of points are displayed in a superposed condition on the display unit 62a. Further, by rotating the thus displayed three-dimensional structures, it can be visually discriminated on the display unit 62a in what manner what portions are superposed or what portions of the three-dimensional structures form a common structure.

By the way, where the apparatus of the construction shown in FIG. 46 is used as a common structure extraction apparatus which performs alignment display, an alignment outputting section 57 indicated by a broken line in FIG. 46 is provided in place of the common structure outputting section 56. The alignment outputting section 57 outputs to the display unit 62b information regarding amino acids corresponding to a common structure extracted by the common structure extraction section 55 in a juxtaposed relationship in accordance with an array sequence. Consequently, the amino acids are displayed in an array on the display unit 62b.

On the other hand, where the apparatus of the construction shown in FIG. 46 is used as a common structure extraction apparatus which supports modeling, a model structure outputting section 58 indicated by a broken line is provided in place of the common structure outputting section 56 or the alignment outputting section 57. The model structure outputting section 58 outputs a common structure extracted by the common structure extraction section 55 as three-dimensional coordinate information to the display unit 62a and the display unit 62b so that the three-dimensional coordinate information may be displayed on the display units 62a and 62b thereby to support production of a three-dimensional model of a protein by way of extraction of a common structure.

It is to be noted that, while, in the examples described above, array display or display in which three-dimensional information is displayed on the display unit 62a or 62b is described, the data may otherwise be printed by means of a printer or the like.

Subsequently, an example of extraction of a common structure by the apparatus which performs three-dimensional structure display (alignment display, modeling support) described above will be described with is reference to FIGS. 47 to 58.

Figure 47:
FIG. 47 is a diagrammatic view showing the three-dimensional structure of trypsin (4PTP)
Figure 48:
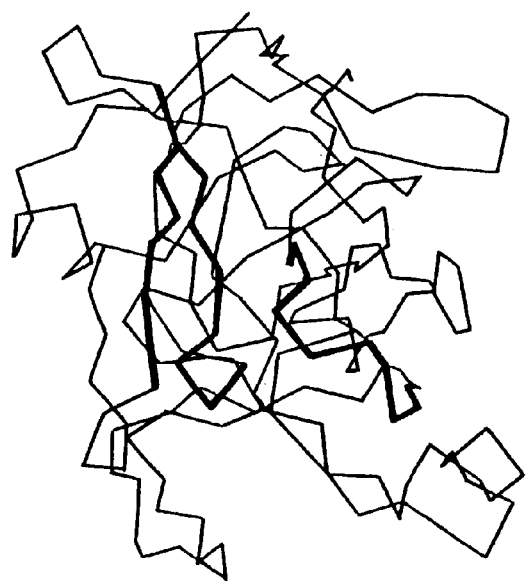
FIG. 48 is a similar view but showing the three-dimensional structure of alpha-lytic protease (2ALP)

FIG. 47 shows a three-dimensional structure of trypsin (whose file name in the PDB is 4PTP) which is one of proteins), and FIG. 48 shows a three-dimensional structure of alpha-lytic protease (whose file name in the PDB is 2ALP). The trypsin and the alpha-lytic protease are proteins having a common function of decomposing a polypeptide chain, but have low homology in amino acid array and have different general structures. From results of investigations in the past, it is known that the center of activity is formed from histidine (H), aspartic acid (D) and serine (S) (those structures are called catalyzer triad).

Thus, in order to compare the structures of the centers of activity of the trypsin and the alpha-lytic protease with each other, using the apparatus of the present embodiment shown in FIG. 46, a common structure between the proteins is displayed around a peripheral structure of histidine of trypsin.

First, a structure analogous to an activity location of histidine of trypsin is retrieved from alpha-lytic protease, and using the thus retrieved analogous structure as partial matching information, a common structure is extracted by the common structure extraction section 55. The partial matching information which is used upon such extraction processing is illustrated in FIG. 50.

Figures 49, 50:
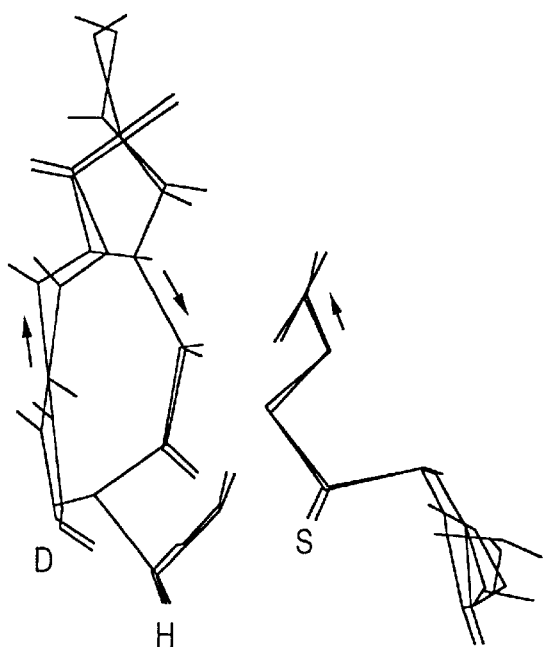
FIG. 49 is a diagrammatic view showing the structure of catalyzer triad extracted by the common structure extraction apparatus.
FIG. 50 is a table illustrating partial matching information used upon extraction processing.

In FIG. 50 and several figures showing an alignment display condition which will be hereinafter described, an amino acid array of the structure of a protein which is an object for retrieval is displayed at a position corresponding to "<target>", and for example, amino acids of different kinds are represented by single alphabetic characters such as K, C, F, V, . . . Then, at a position corresponding to "(serial)", amino acid array numbers (in the example shown in FIG. 50, numbers 29, 30, . . . , 37) applied to the individual amino acids are displayed. Further, similarly as in the case of "<target>", at a position corresponding to "<probe>", an amino acid array of the structure of another protein which makes a key for retrieval is displayed, and at another position corresponding to "(serial)", array numbers of individual amino acids are displayed.

Examples in which a common structure extracted by the common structure extraction section 55 by superposing the three-dimensional structure of trypsin and the three-dimensional structure of alpha-lytic protease with each other in accordance with such partial matching information as seen in FIG. 50 is displayed in a juxtaposed relationship with the amino acid array (in an alignment display form) are shown in FIGS. 51 and 52. in FIGS. 51 and 52, each value displayed at a position corresponding to "(distance)" below a position at which an amino acid is indicated represents the distance between amino acids (Cα), and each underline in FIGS. 51 and 52 represents a portion of a catalyzer triad.

The structure of a thus extracted catalyzer triad is shown in FIG. 49. In FIG. 49, the direction from an N (nitrogen) end to a C (carbon) end is indicated by arrow marks, and each short line indicates the positions of an α carbon (Cα) and a β carbon (Cβ) of a side chain. Further, the positions of catalyzer triads in the general structures of the individual proteins are indicated by thick lines in FIGS. 47 and 48.

When trypsin and alpha-lytic protease are superposed with each other with reference to histidine (H) in this manner, since also aspartic acid (D) and serine (S) which are different catalyzer locations are extracted as common structures, it is estimated that, although the analogy in array between the two proteins is low, they have catalyzer triads having a three-dimensionally same structure and have analogous mechanisms for decomposing a polypeptide chain. Actually, it has been proved that such result of estimation coincides with a result of a biochemical experiment.

From this, it is recognized that, even where the two proteins have low homology in array of amino acids and have different general structures, a structure regarding a function of a protein is maintained. Further, if the structure of part of the center of activity is known, then also the structure of the remaining portion of the center of activity can be discriminated by the present apparatus.

Meanwhile, the common structure extraction apparatus which includes the model structure outputting section 58 and supports modeling is used as an apparatus for estimating a three-dimensional structure of a protein (object protein) whose three-dimensional structure is unknown. A technique adopted at present for estimating a three-dimensional structure is called homology modeling. According to the homology modeling, proteins (reference proteins) which are high in homology with an amino acid array of an object protein and have a known three-dimensional structure are searched out, and a structure which is held commonly between or among the reference proteins is determined as a nucleus structure, and then the remaining structure is estimated by energy calculation or from analogy in conformation to effect modeling. The homology with an amino acid array of a reference protein is empirically 50% or more.

In such a modeling system as described above, what is important is a determination method of a nucleus structure. A nucleus structure can be determined using the technique for common structure extraction described hereinabove with reference to FIG. 3 or the technique for common structure extraction described hereinabove with reference to FIGS. 31 to 44.

Figure 53:
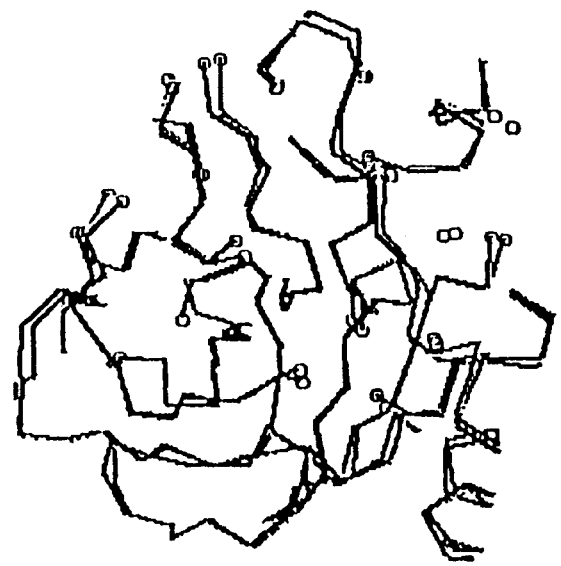
FIG. 53 is a diagrammatic view showing the three-dimensional structure of elastase.
Figure 54:
FIG. 54 is a similar view but showing common structures between trypsin and elastase.
Figure 55:
FIG. 55 is a similar view but showing common structures (positions on the entire structure) between trypsin and elastase.

A detailed example of modeling will be described below. An example of extraction of a common structure from trypsin illustrated in FIG. 47 and a protein of elastase (whose file name in the PDB is 3EST) which has such a three-dimensional structure as shown in FIG. 53 and is high in analogy in amino acid array with trypsin is illustrated in FIGS. 54 to 58. FIG. 54 shows a three-dimensional structure of elastase; FIG. 55 shows a common structure between trypsin and elastase; and FIGS. 56 to 58 show displays of the positions of common structures on the entire structures of trypsin and elastase in the alignment display form.

It is to be noted that, in the display example shown in FIGS. 56 to 58, a result of calculation based on matching information of the structures given by a user is shown.

According to this technique (manual system), two three-dimensional structures can be superposed with each other as desired by the user. Further, also in a display example shown in FIGS. 67 to 69 which will be hereinafter described, the positions of common structures on the entire structures of trypsin and elastase are displayed in the alignment display form. In the display example shown in FIGS. 67 to 69, however, a result of extraction of the common structures using a technique of nucleus structure extraction is shown.

In the example shown in FIGS. 56 to 58, a structure analogous to an activity location of histidine which is the center of activity of trypsin and the protein of elastase is retrieved from elastase using the technique of analogous structure retrieval described hereinabove, and a common structure is extracted designating a result of the retrieval as partial matching information.

Further, in the example shown here, when the threshold value "ERROR" for the distance between matched points was set to 1.5 angstrom, a nucleus structure which has an rmsd value of 0.78 angstrom and is constituted from 171 acid residues was extracted successfully (refer to the indication at a lowermost portion in FIG. 58), and a result that the centers of activity of trypsin and elastase coincide with each other was obtained.

While, in FIGS. 54 to 58, the example wherein a common structure is displayed in the alignment display form or in the three-dimensional graphic display form for convenience of illustration, since refinement of a structure by energy calculation is finally performed for a constructed model on an apparatus which actually performs modeling support, a common structure extracted is outputted in the form of three-dimensional coordinates from the model structure outputting section 58.

D2. Common Structure Extraction Apparatus Which Retrieves a Three-Dimensional Structure (a Common Structure Extraction Apparatus Which Produces a Function Location Data Base)

Generally, in order to develop a substance having a new function as in development of a novel medicine or to reinforce a function of an existing substance, it is essentially required to make clear a correlation between a function of a substance and a structure of the substance. In proceeding with an operation for this, it is required to refer to a large number of substances having analogous three-dimensional structures.

Therefore, an apparatus for retrieval of a three-dimensional structure which can fetch substances analogous in three-dimensional structure readily from the three-dimensional structure data base 52 is required. Further, by such apparatus, the function location data base 63 can be produced by collecting three-dimensional structures relating to functions.

In the present embodiment, the apparatus just mentioned can be constructed in such a manner as shown in FIG. 59, which shows components which cooperatively function as a common structure extraction apparatus which performs three-dimensional structure retrieval. Since the construction of a principal portion of the apparatus which performs three-dimensional structure retrieval is same as that of an apparatus which produces a function location data base, also a common structure extraction apparatus which performs function location data base production is shown in FIG. 59.

In the following, a function and operation of a principal portion of the apparatus shown in FIG. 59 which operates as an apparatus which performs three-dimensional structure retrieval will be described in detail.

A data inputting section 51 has an interface for inputting input data 50*a* and 50*b*. From the data inputting section 51, the name of a substance P which makes an object for three-dimensional structure retrieval is inputted as the input data 50a, and partial structure information representative of the position of a structure which is used as a probe (retrieval key) in the substance P is inputted as input data 50d. The input data 50a and 50d are sent to a common structure extraction section 55.

Meanwhile, information similar to that provided In the common structure extraction apparatus which performs three-dimensional structure display described hereinabove with reference to FIG. 47 is stored in a three-dimensional structure data base 52.

An analogous structure retrieval section 53 retrieves from the three-dimensional structure data base 52 a substance or substances having a structure analogous to partial structure information of a substance (protein) designated as a probe. A protein or proteins having an analogous structure, which have been obtained as a result of the retrieval, are set to the common structure extraction section 55. In this instance, an rmsd value is used as the scale for analogy.

The common structure extraction section 55 receives, as inputs thereto, a three-dimensional structure of a substance obtained by the retrieval of the analogous structure retrieval section 53 and a three-dimensional structure of a substance of the probe, calculates the length of a longest common portion from three-dimensional structures (three-dimensional coordinates) of the substances using partial structure information as partial matching information, and sends a result of the calculation to an analogous structure outputting section 59. Upon extraction processing by the common structure extraction section 55, the length of a longest common portion is calculated by the processing described hereinabove considering the three-dimensional structure of each protein as a sequenced point set in accordance with an array sequence of amino acids constituting the protein.

Then, the analogous structure outputting section 59 outputs the numbers of amino acid residues of an analogous structure, the kinds of the amino acids, an rmsd value and the length of a longest common portion based on the result of retrieval by the analogous structure retrieval section 53 and the result of extraction by the common structure extraction section 55.

By the way, in order to construct the common structure extraction apparatus shown in FIG. 59 which performs three-dimensional structure retrieval as a function location data base production apparatus, a function location data base production section 60 indicated by a broken line in FIG. 59 is provided in place of the analogous structure outputting section 59. The function location data base production section 60 outputs and registers a function of a substance and a three-dimensional structure (function location) relating to the function to and into a function location data base 63 based on the result of retrieval by the analogous structure retrieval section 53 and the result of extraction by the common structure extraction section 55.

A detailed example of retrieval by such common structure extraction apparatus which performs three-dimensional structure retrieval will be described below.

Similarly as in the case of the apparatus which performs three-dimensional structure display described above, a result of retrieval of an analogous structure to a probe from alpha-lytic protease (FIG. 48) using an activity location of histidine (FIG. 47) of trypsin as the probe is illustrated in FIG. 60.

It can be seen from FIG. 60 that, in this instance, four structures (1) to (4) whose rmsd value is smaller than 1.5 angstrom were retrieved, and the two (1) and (2) of them have rmsd values of 0.769 and 0.483 and accordingly have very similar structures to the structure of the probe.

In the present embodiment, also the length LCS (represented as "lcs" in FIG. 60) of a longest common portion is outputted as a result of each retrieval. Thus, by referring to the length LCS of the longest common portion, the coincidence condition between the entire three-dimensional structures can be discriminated.

By referring to the length LCS of a longest common structure in the example shown in FIG. 60, it can be seen that, while the structure (1) having the rmsd value=0.769 coincides only at a portion thereof with the structure of the probe since the lcs of the structure (1) is 10 and the length (number of amino acids) of the structure of the probe is 9, the structure (2) having the rmsd value=0.483 generally coincides much more with the structure of the probe since the lcs of the structure (2) is 72.

Further, from comparison of the amino acid array of the retrieved structure, it can be seen that the structure (2) is a significantly analogous structure also from the fact that the structure which includes histidine as a kind of amino acid corresponding to histidine (H) which is the center of activity of trypsin is only the structure (2) whose rmsd value is 0.483.

Where the common structure extraction apparatus which performs three-dimensional structure retrieval in this manner is used, by designating a three-dimensional structure of a substance which serves as a probe, an analogous structure can be retrieved from the three-dimensional structure data base 52 in which three-dimensional structures of substances are stored, and by referring to a length LCS of a longest common portion, analogy at the other portion than the structure retrieved between the protein used as a probe and the retrieved protein can be discriminated. Consequently, it can be determined readily whether the two proteins are analogous only locally or analogous entirely, and a structure which exhibits coincidence by chance can be eliminated. Accordingly, the efficiency in operation can be improved.

D3. Common Structure Extraction Apparatus Which Performs Function Estimation

Generally, when a protein manifests a certain function, it is considered that the protein has a three-dimensional structure specific to the function. Accordingly, where the function location data bases 54 and 63 are produced as data bases in which relations between functions and three-dimensional structures specific to the functions are stored, when a three-dimensional structure of a novel substance is determined by a technique. such as an X-ray crystal analysis or NMR, by checking up the three-dimensional structure with structures registered in the function location data bases 54 and 63, it can be estimated what function the novel substance has or at which location (which is referred to as function location) the function is positioned in the three-dimensional structure.

FIG. 61 shows components which cooperatively function as a common structure for performing such function estimation. In the following, functions and operation of a principal portion of the apparatus shown in FIG. 61 which operates as an apparatus which performs function estimation will be described in detail.

A data inputting section 51 has an interface for inputting input data 50e. From the data inputting section 51, data of a three-dimensional structure of a novel substance is inputted as the input data 50e. The input data 50e is sent to an analogous structure retrieval section 53.

Information regarding functions of substances and three-dimensional structures (function locations) specific to the functions is stored in advance in a function location data base 54. More particularly, names of the functions, three-dimensional coordinates of atoms constituting three-dimensional structures specific to the functions and so forth are stored in the function location data base 54.

The analogous structure retrieval section 53 retrieves a structure or structures analogous to the function locations registered in the function location data base 54 from the three-dimensional structure of a novel substance, and sends a result of the retrieval to a common structure extraction section 55. In this instance, an rmsd value is used as the scale for analogy.

The common structure extraction section 55 calculates the length of a longest common portion from three-dimensional structures (three-dimensional coordinates) of the substances using the structure of a function location used as a probe and structures retrieved by the analogous structure retrieval section 53 as partial matching information, and sends a result of the calculation to an analogous structure outputting section 59. Extraction processing by the common structure extraction section 55 is performed in accordance with the procedure described hereinabove with reference to FIGS. 5 to 30 considering the three-dimensional structure of each protein as a sequenced point set in accordance with an array sequence of amino acids constituting the protein.

Further, a function location outputting section 61 outputs the name of a function registered in the function location data base 54 as well as an amino acid array name and an amino acid residue number of a function location corresponding to the function name and outputs an rmsd value as a scale for analogy based on a result of extraction from the common structure extraction section 55. The output information of the function location outputting section 61 is displayed on a display unit 62c.

A detailed example of estimation operation by the common structure extraction apparatus which performs such function estimation will be described below.

Structures of ras protein (whose file name in the PDB is 5P21) of a protein analogous to a phosphoric acid coupling location (amino acid residue number 10 to 17) and a $Mg^{2+}$ coupling location (amino acid residue number 56 to 58) of GTP (guanosine triphosphoric acid) were retrieved from another protein of adenylate kinase (whose file name in the PDB is 3ADK). The retrieval revealed that the amino acid residue numbers 15 to 22 and 92 to 94 of adenylate kinase exhibit structures similar to the two function locations described above, respectively.

Results of extraction of common structures between ras protein and adenylate kinase based on the results described above are shown in FIGS. 62 and 63. From FIGS. 62 and 63, it can be seen that ras protein has a structure analogous to function locations registered in the function location data base 54 and has common structures with adenylate kinase in terms of 67 acid residues as a whole. Accordingly, the analogy between the two proteins cannot be considered to be analogy by chance, but rather, it is suggested that they couple substrates to each other by the same mechanism.

It is to be noted that, at an upper portion of FIG. 62, the structures of the two function locations described above which are used as partial matching information, the distances between the matched points and the rmsd value (0.600) of the partial matching information are shown. Further, below the portion of FIG. 62 in which the partial matching information is shown and in FIG. 63, a result of extraction of common structures between ras protein and adenylate kinase is shown. At a lower portion of FIG. 63, the number 67 of acid residues which make an analogous structure and the rmsd value of 1.659 of the entire common structure are shown.

Meanwhile, it is known from results of experiments in the past that adenylate kinase couples to ATP (adenosine triphosphorate acid) and $Mg^{2+}$ intervenes upon such coupling. The phosphoric acid coupling location has been identified already, and this coincides well with the result of estimation by the function estimation in the present embodiment described above. However, the coupling location of $Mg^{2+}$ is not yet identified, and experiments are proceeding. However, the result of estimation described above can be proved, for example, by producing a variant wherein the aspartic acid mentioned hereinabove is replaced by another amino acid by a genetic recombination operation and measuring the ATP coupling ability (activity) of the variant under the intervention of $Mg^{2+}$.

In this manner, where the apparatus which performs function estimation in the present embodiment is used, a function and a function location of a structure determined newly can be estimated based on analogy with known three-dimensional structures and function locations identified by experiments. Accordingly, in operation for making clear or improving a function of a protein which has conventionally been proceeded by trial and error, a research and development cycle in which a function is estimated in advance and then a result of the estimation is proved by an experiment can be established, and consequently, the efficiency in operation can be improved.

D4. Common Structure Extraction Apparatus Which Involves Nucleus Structure Extraction The apparatus of the items D1 to D3 described hereinabove are an apparatus which extracts, using partial matching information known in advance between two three-dimensional structures, a common structure in the remaining portions (the common structure extraction apparatus shown in FIG. 46 which displays a three-dimensional structure) and apparatus which retrieve an analogous structure between two three-dimensional structures by the analogous structure retrieval section 53 and extracts another common structure in the remaining portions using an analogous structure obtained by the retrieval as partial matching information (the apparatus shown in FIG. 59 which retrieves a three-dimensional structure, and the apparatus shown in FIG. 61 which estimates a function).

The analogous structure retrieval section 53 in the apparatus shown in FIGS. 59 and 61 among the apparatus mentioned above extracts, when a nucleus structure which makes the center of superposition between two three-dimensional structures is unknown, a common structure by trial and error by the common structure outputting section 56 using a retrieved analogous structure (a plurality of analogous structures may be present depending upon the degree of analogy) as partial matching information. However, by using the technique of extracting a nucleus structure which makes the center of superposition, an apparatus which can perform extraction of a common structure, retrieval of an analogous structure and estimation of a function from two three-dimensional structures whose common function and common structure are unknown. It is to be noted that a detailed procedure and so forth of extraction of a nucleus structure are such as described hereinabove with reference to FIGS. 4 and 31 to 44.

A nucleus structure extraction apparatus which employs the nucleus structure extraction will be described below with reference to FIGS. 64 to 76.

Figure 64:
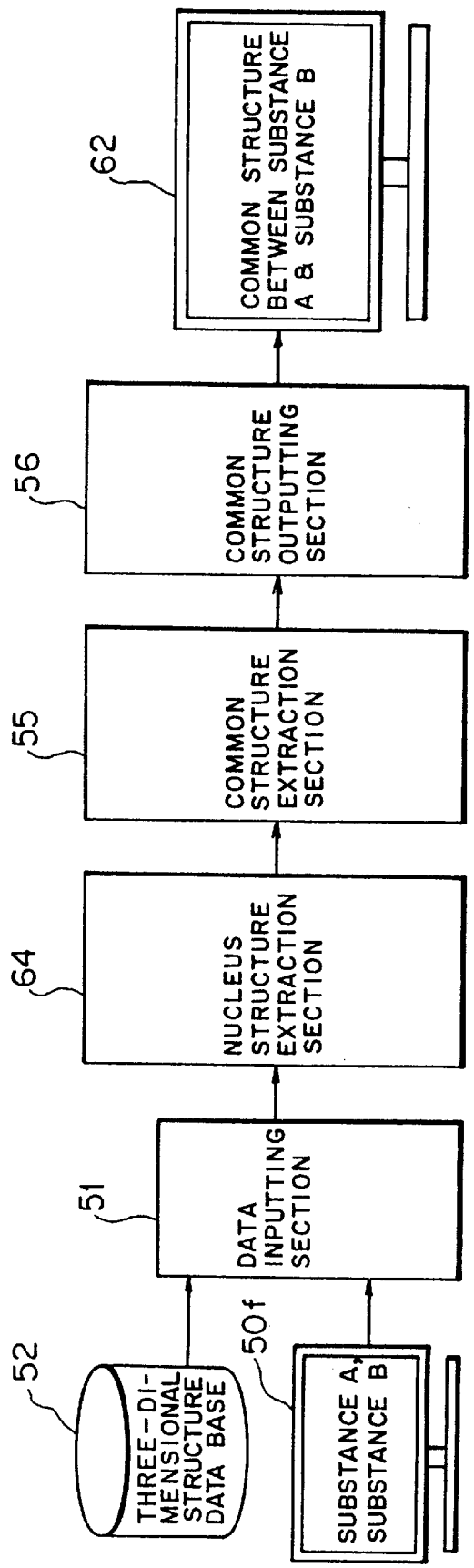
FIG. 64 is a block diagram showing a modified common structure extraction apparatus which involves extraction of a nucleus structure.

FIG. 64 shows the construction of the common structure extraction apparatus which employs the nucleus structure extraction in the present embodiment.

The common structure extraction apparatus shown in FIG. 64 includes a three-dimensional structure data base 52, a data inputting section 51, a common structure extraction section 55, a common structure outputting section 56 and a display unit 62 (which is a display section which performs both or one of graphic display and array display, which are constructed in a similar manner as those provided in the system shown in FIG. 45 (system which includes the apparatus shown in any of FIGS. 46, 59 and 61).

The common structure extraction apparatus shown in FIG. 64 and the system shown in FIG. 45 are different from each other in that the former includes a nucleus structure extraction section 64 for executing nucleus structure extraction processing described hereinabove with reference to FIGS. 4 and 31 to 44. In the following, a case wherein a substance of a three-dimensional structure is a protein constituted from a point set of three-dimensional coordinates will be described as an example.

Operation of the apparatus which includes the nucleus structure extraction section 64 in this manner will be described. First, a user will input names of substances A and B, which make an object for extraction of a common structure, as input data 50f in accordance with an input command. The data inputting section 51 reads in three-dimensional structure data of the substances A and B registered in the three-dimensional structure data base 52 in accordance with the input command and sends the three-dimensional data to the nucleus structure extraction section 64.

The nucleus structure extraction section 64 divides, as described hereinabove, one of the two three-dimensional structures into segments, extracts a nucleus structure which makes the center of appropriate superposition of the two three-dimensional structures by matching the three-dimensional structure spatially with the other three-dimensional structure in accordance with an array sequence of amino acids constituting the protein of the three-dimensional structure, and sends a result of the extraction (nucleus structure) to the common structure extraction section 55.

The common structure extraction section 55 superposes the two three-dimensional structures with each other based on the nucleus structure extracted by the nucleus structure extraction section 64 to extract a common structure existing in the two structures.

Then, for the common structure extracted based on the nucleus structure from the nucleus structure extraction section 64, the names and the array numbers of amino acids of the segmented protein are outputted in the alignment display form together with the names and the array numbers of amino acids of the common portion of the other protein from the common structure outputting section 56 and are displayed on the display unit 62. It is to be noted that also an rmsd value is displayed simultaneously as a scale of the analogy of the extracted common structure on the display unit 62.

An example of extraction operation of the common structure extraction apparatus which employs the nucleus structure extraction shown in FIG. 64 will be described with reference to FIGS. 65 and 66. FIG. 65 shows an array of amino acids of trypsin which is a kind of protein, and FIG. 66 shows an array of amino acids of elastase. The three-dimensional structures of trypsin and elastase are shown in FIGS. 47 and 53, respectively.

It is to be noted that, since the numbers of amino acid residues shown in FIGS. 65 and 66 are numbers applied simply in order beginning with 1 to the amino acids described in the PDB, they are different from original amino acid array numbers. This similarly applies to other examples hereinafter described. Further, below "Missing residues" shown at lower portions of FIGS. 65 and 66, the array numbers of those amino acids which are known to be present but whose coordinate positions on a three-dimensional structure have not been found out by an X-ray analysis and so forth.

The proteins illustrated in FIGS. 65 and 66 are kinds of proteolytic enzyme called serine protease, and histidine, serine and aspartic acid are essential factors to the activity location thereof. While the substrate uniqueness is quite different among the enzymes, since they are analogous in terms of the structure, the catalyzer and so forth, they are considered to evolutionally make a group of enzymes.

Figure 70:
FIG. 70 is a diagrammatic view showing a graphic displaying condition of common structures extracted from trypsin and elastase using a result of the nucleus structure extraction.

Results of extraction of a common structure between trypsin and elastase by the common structure extraction section 55 using a nucleus structure extracted by the nucleus structure extraction section 64 as partial matching information are illustrated in FIGS. 67 to 69, and a graphic display condition of the extracted common structure is shown in FIG. 70.

It is to be noted that, in the example shown in FIGS. 67 to 69, since the processing method is different from that employed for the example described hereinabove with reference to FIGS. 56 to 58 and nucleus structure extraction is performed by a computer and consequently matching information to be used for superposition is different, also the results of extraction are different. Further, in FIG. 70, the three-dimensional structures of the two proteins are superposed with each other with a common portion indicated by a thick line.

Referring to FIGS. 67 to 69, it can be seen that histidine at the 45th acid residue of elastase, aspartic acid at the 93rd acid residue and serine at the 188th acid residue are matched with histidine at the 40th acid residue, aspartic acid at the 84th acid residue and serine at the 177th acid residue which are three centers of activity of trypsin, respectively. Those results are coincident with results obtained by biochemical experiments.

Since a nucleus structure can be extracted automatically by designating two three-dimensional structures which make an object for extraction of a common structure by means of a common structure extraction apparatus which employs extraction of a common structure in this manner, upon extraction of a common structure, a common structure can be extracted also from a protein whose structure is unknown at the center of activity which makes the center for superposition.

The construction shown in FIG. 64 can be used as a common structure display apparatus by graphically displaying a result of extraction of a common structure from two three-dimensional structures stored in the three-dimensional structure data base 52.

Meanwhile, the construction shown in FIG. 45 can be used as a common structure extraction apparatus which supports modeling. By homology modeling which is a representative technique of modeling, a three dimensional structure of a protein whose structure is unknown can be estimated based on analogy in structure and array between family elements of proteins. In this technique, in order to build up a structure of an object protein, one reference protein whose structure is known is required. However, when a single reference protein is used, a high degree of accuracy cannot be achieved by the modeling. Accordingly, it is necessary to effectively utilize analogy between known three-dimensional structures.

The apparatus which performs such modeling support can perform modeling with a high degree of accuracy by extracting a common structure maintained structurally between a plurality of reference proteins.

Further, the construction of FIG. 45 described above can be used as a common structure extraction apparatus which performs alignment display of three-dimensional structures. In order to investigate a function or a structure of a newly analyzed protein, comparison with a known protein is required. The apparatus which performs alignment display of three-dimensional structures extracts a common structure between the two three-dimensional structures and displays the thus extracted portion in alignment with the two three-dimensional structures.

Figure 71:
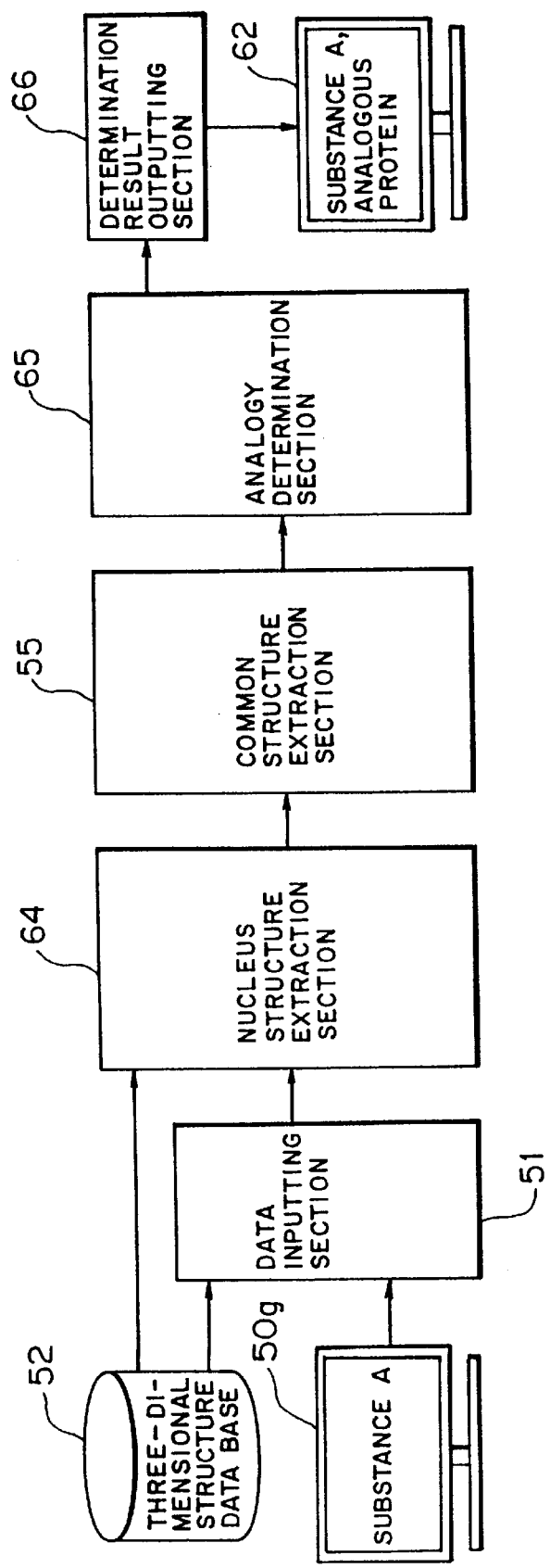
FIG. 71 is a block diagram showing a common structure extraction apparatus which retrieves an analogous structure using the nucleus structure extraction.

FIG. 71 shows the construction of a common structure extraction apparatus which performs retrieval of an analogous structure making use of the nucleus structure extraction in the present embodiment.

Referring to FIG. 71, the common structure extraction apparatus shown includes a three-dimensional structure data base 52, a data inputting section 51, a nucleus structure extraction section 64, a common structure extraction section 55 and a display unit 62 which are constructed in a similar manner to those provided in the apparatus shown in FIG. 64.

It is to be noted, however, that the apparatus shown in FIG. 71 additionally includes an analogy determination section 65 and a determination result outputting section 66.

The analogy determination section 65 determines analogy between two three-dimensional structures (common portions) depending upon whether or not the ratio between the number of acid residues which constitute a structure extracted as a common structure by the common structure extraction section 55 and an average of the numbers of acid residues constituting the two three-dimensional structures is equal to or higher than a preset value.

Meanwhile, the determination result outputting section 66 outputs, when it is determined by the analogy determination section 65 that the analogy between two three-dimensional structures (common portions) is high, an extracted common structure in such a display form that the names and the array numbers of amino acids of one of the proteins are juxtaposed with the names and the array numbers of amino acids of the other protein so that they may be displayed on the display unit 62. It is to be noted that also an rmsd value as a scale of analogy of the extracted common structure is simultaneously displayed on the display unit 62.

Operation of the apparatus described above with reference to FIG. 61 will be described subsequently. First, a user will input, as input data 50g, a substance A, which makes an object for retrieval of an analogous structure, in accordance with an input command. The data inputting section 51 reads in data of the three-dimensional structure of the inputted substance A and three-dimensional structures recorded in the three-dimensional structure data base 52 one by one and sends them to the nucleus structure extraction section 64.

The nucleus structure extraction section 64 divides one of the three-dimensional structures into segments and spatially matches the three-dimensional structure with the other three-dimensional structure in accordance with an array order of amino acids constituting the protein to extract a nucleus structure which makes the center for superposition of the two three-dimensional structures. The common structure extraction section 55 superposes the two three-dimensional structures with each other based on the thus extracted nucleus structure to extract a three-dimensional structure which exists commonly between the two three-dimensional structures.

Then, the analogy of the thus extracted common structure is determined by the analogy determination section 65, and when it is determined that the analogy between the two three-dimensional structures (common portions) is high, the extracted common structure is outputted from the determination result outputting section 66 to the display unit 62 so that it is displayed on the display unit 62.

Figure 72:
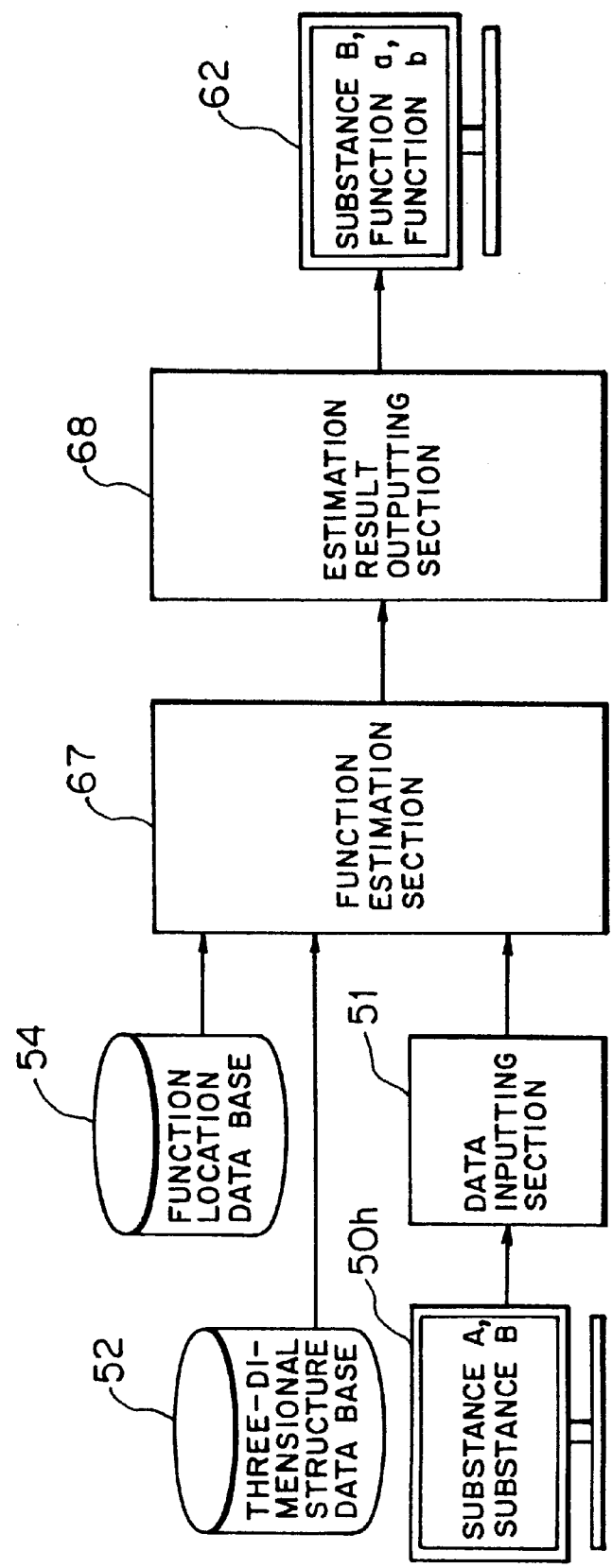
FIG. 72 is a block diagram showing a common structure extraction apparatus which performs estimation of a function using the nucleus structure extraction.

FIG. 72 shows the construction of a common structure extraction apparatus which performs function estimation based on the nucleus structure extraction in the present embodiment.

Referring to FIG. 72, the common structure extraction apparatus shown includes a three-dimensional structure data base 52, a data inputting section 51 and a function location data base 54 which are same as like elements denoted by like reference numerals in FIG. 45 and described hereinabove. The common structure extraction apparatus shown in FIG. 72, however, additionally includes a function estimation section 67 and an estimation result outputting section 68. It is to be noted that, in the apparatus shown in FIG. 72, the functions of the common structure extraction section 55 and the nucleus structure extraction section 64 described hereinabove are included in the function estimation section 67.

In particular, the function estimation section 67 extracts, by the function as the nucleus structure extraction section 64, a nucleus structure from a three-dimensional structure having a known function and another three-dimensional structure having an unknown function, extracts, by the function as the common structure extraction section 55, a common structure using the thus extracted nucleus structure as partial matching information, and refers to information of the function location data base 54 based on the thus extracted common structure to discriminate whether or not the function location which achieves the predetermined function is included in the three-dimensional structure having the unknown function to effect function estimation of the three-dimensional structure.

Meanwhile, the estimation result outputting section 68 outputs a result of the estimation by the function estimation section 67 as the names and the array numbers of amino acids of the function location corresponding to the estimation function so that the information may be displayed on the display unit 62.

The common structure extraction apparatus shown in FIG. 72 which performs function estimation extracts a common structure between a protein whose function has been made clear and an unknown protein in order to estimate a function of the unknown protein or a function location in the three-dimensional structure of the unknown protein as described hereinabove with reference to FIG. 61. When input data 50h designating a substance A whose function is unknown is inputted to the data inputting section 51 in accordance with an input command, the function estimation section 67 starts its operation.

Operation of the function estimation section 67 will be described below with reference to a flow chart (steps S121 to S127) shown in FIG. 73.

Figure 73:
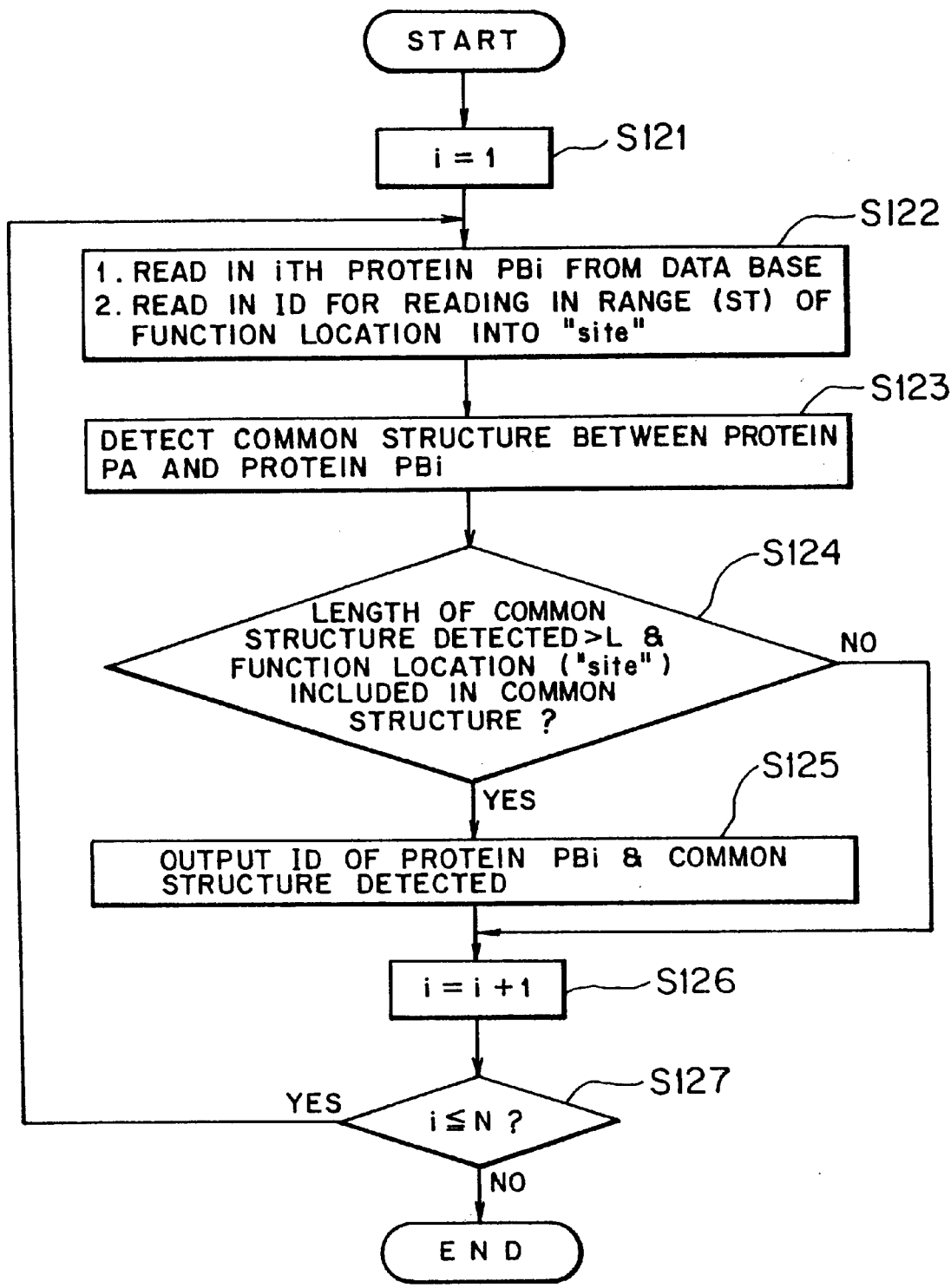
FIG. 73 is a flow chart illustrating operation of a function estimation section of the common structure extraction apparatus of FIG. 72.

In FIG. 73, the function of a protein PA is unknown, and another protein $PB_i$ has a known function and is registered as ith data ($1 \leq i \leq N$) in the function location data base 54. Meanwhile, the reference to the length of a common structure is represented by L, and an area for storing a function location is represented as "site".

Referring to FIG. 73, a number i for designating the protein $PB_i$, whose function is known, in the function location data base 54 is first set to "1" as initialization (step S121), and then the ith protein $PB_i$ whose function is known is fetched from the three-dimensional structure data base 52 and an ID (name of a function location, that is, an entry number of the function location data base 54) for reading the range (ST) of a function location of the protein $PB_i$ into the area "site" is read in from the function location data base 54 (step S122).

Subsequently, a common structure between the protein PA and the protein $PB_i$ is extracted (step S123). Upon such extraction processing of a common structure, a nucleus structure obtained by nucleus structure extraction processing (processing for retrieving an analogous structure by segmentation) is used as partial matching information and superposition with respect to the nucleus structure is performed as described hereinabove.

Then, it is determined whether or not the common structure obtained by the common structure extraction processing is longer than a fixed length L (the length of each segment) and a function location is included in the common structure (step S124). If such requirements are satisfied, then the ID of the protein $PB_i$ and the common structure obtained are outputted (step S125), and then the number i is incremented by one (step S126) so that similar processing may be performed for a next protein $PB_i$ registered in the function location data base 54.

The processing at steps S122 to S126 is performed repetitively until i<N is determined at step S127, that is, until common structure extraction processing between all proteins stored in the function location data base 54 and the protein PA is completed.

Figures 74, 75A, 75B:
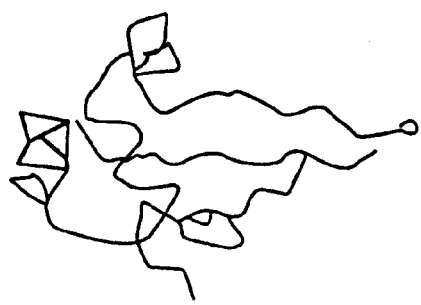
FIG. 74 is a diagrammatic view illustrating an example of registration of a function location data base employed in the common structure extraction apparatus of FIG. 72.
FIG. 75(A) is a table illustrating an array of amino acids of λ-phage Cro protein.
FIG. 75(B) is a diagrammatic view showing the three-dimensional structure of λ-phage Cro protein.

It is to be noted that the data of the protein $PB_i$ registered in the function location data base 54 is such, for example, as illustrated in FIG. 74. In FIG. 74, for example, the name of a function location is registered in the item of "ID", and the range of the function location of the protein $PB_i$ is registered in the item of "ST" in terms of an amino acid acid residue number.

In the following, a detailed example of operation of a common structure extraction apparatus which performs function estimation based on nucleus structure extraction will be described with reference to FIGS. 75(A) to 78.

Figures 76A, 76B:
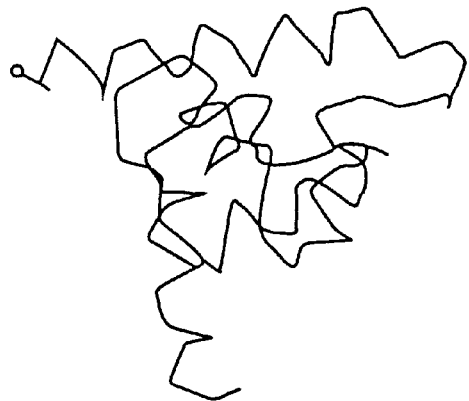
FIG. 76(A) is a table illustrating an array of amino acids of λ-phage repressor.
FIG. 76(B) is a diagrammatic view showing the three-dimensional structure of λ-phage repressor.

FIG. 75(A) shows an array of amino acids of λ-phage Cro protein, and FIG. 75(B) shows the three-dimensional structure of λ-phage Cro protein. Meanwhile, FIG. 76(A) shows an array of amino acids of a λ-phage repressor, and FIG. 76(B) shows the three-dimensional structure of λ-phase repressor.

Figure 78:
FIG. 78 is a diagrammatic view showing a graphic displaying condition of a result of extraction of the common structures between λ-phage Cro protein and λ-phage repressor.
Figure 79A:
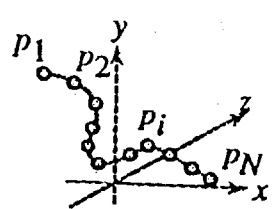
FIGS. 79(A) to 79(D) are diagrammatic views illustrating an ordinary technique for calculation of an rmsd value.
Figure 79B:
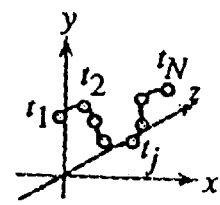
Figure 79C:
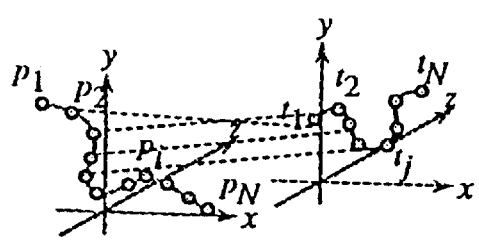
Figure 79D:

It is known that DNA couples to λ-phage Cro protein and the coupling location is amino acids of the amino acid residue numbers 16 to 35. An example of display in the alignment display form of a result of extraction of a common structure from λ-phage Cro protein and λ-phage repressor is illustrated in FIG. 77, and an example of graphic display of the result is shown in FIG. 78.

It can be seen from FIG. 77 that, while one amino acid which is not matched with an acid residue for the amino acid residue numbers 16 to 35 of λ-phage Cro protein, the amino acids of the amino acid radial numbers 28 to 47 of λ-phage repressor are matched with the amino acid residue numbers 16 to 35. Also it is known that λ-phage repressor couples to DNA, and the results described above coincide with results obtained by biochemical experiments.

By extracting a common structure between the three-dimensional structure of a substance having a known function and the three-dimensional structure of another substance having an unknown function using the apparatus shown in FIG. 72 in this manner, a function of a novel substance can be estimated.

E. Effects of the Embodiment

As described above, with the common structure extraction apparatus of the present embodiment, a plurality of three-dimensional structures which can be matched partially with each other can be superposed with each other to extract another common structure existing between the three-dimensional structures accurately and rapidly. Consequently, display of a common structure by a graphic system, retrieval of an analogous structure from the three-dimensional structure data base 52, estimation of a function based on analogy in structure and so forth can be performed.

Accordingly, since operation which has conventionally been proceeded by trial and error by research workers in order to achieve improvements in discovery or reinforcement of a function of a substance such as a protein is established and executed as a research and development cycle in which a function is estimated based on a structure and then a result of the estimation is proved by an experiment, the efficiency in operation can be improved very much.

Further, by automatically extracting a nucleus structure which makes the center of superposition of two three-dimensional structures using the technique of nucleus structure extraction and extracting a common structure based on the thus extracted nucleus structure, the efficiency in operation for discovery or estimation of a three-dimensional structure and a function of a substance such as a protein is similarly improved very much.

Furthermore, in the present embodiment, since a cost function is introduced, useless retrieval processing upon extraction processing of a common structure between substances such as proteins can be prevented. Consequently, extraction processing of a common structure can be performed very efficiently, and common structures can be extracted over a wide range and the accuracy in extraction can be improved significantly.

In the following, effects provided by adoption of the optimization searching technique which makes use of the cost function in the present embodiment will be described in more detail.

Upon extraction processing of a common structure, the number of points matched with one point increases in proportion to the magnitude of the threshold value "ERROR" for the distance between points to be matched, and as a result, the number of combinations of elements which form a longest common portion increases exponentially.

Therefore, the common structure extraction apparatus of the present embodiment is improved in that, by introducing the optimization searching method based on a cumulative cost described hereinabove with reference to FIGS. 15 to 30, searching processing is increased in speed and a longest common portion can be calculated irrespective of the value of the threshold value "ERROR".

Table 1 and Table 2 given below indicate calculation times required to calculate a length of a common structure for various values of the threshold value "ERROR" in the cases wherein the optimization searching technique based on a cumulative cost was and was not introduced and further indicate lengths of thus calculated common structures.

Table 1 indicates, for various values of the threshold value "ERROR", the processing execution time when optimization searching was performed upon extraction of a common structure between trypsin (4PTP; refer to FIG. 47) and elastase (3EST; refer to FIG. 53), the processing execution time when optimization searching was not performed but all solution searching was performed, and the length of a thus extracted longest common portion. In the example shown in Table 1, common structures between two three-dimensional structures which have high analogy in general structure are extracted.

Table 2 indicates, for various values of the threshold value "ERROR", the processing execution time when optimization searching was performed upon extraction of a common structure between ras protein (5P21) and adenylate kinase (3ADK), the processing execution time when optimization searching was not performed but all solution searching was performed, and the length of a thus extracted longest common portion. In the example shown in Table 2, common structures between two three-dimensional structures which have low analogy in general structure are extracted.

TABLE 1

Comparison in speed in common structure extraction from 4PTP and 3EST

| ERROR [Angstrom] | Optimization Search [Seconds] | No Optimization [Seconds] | Length of Common Structure |
|---|---|---|---|
| 1.5 | 2.7 | 2.7 | 171 |
| 2 | 2.7 | 2.8 | 198 |
| 2.5 | 2.7 | 2.8 | 209 |
| 3 | 2.8 | 2.8 | 213 |
| 3.5 | 2.8 | 2.9 | 217 |
| 4 | 2.8 | 4.5 | 221 |
| 4.5 | 3 | 427.1 | 221 |
| 5 | 4.2 | — | 221 |

TABLE 2

Comparison in speed in common structure extraction from 5P21 and 3ADK

| ERROR [Angstrom] | Optimization Search [Seconds] | No Optimization [Seconds] | Length of Common Structure |
|---|---|---|---|
| 1.5 | 2.1 | 2.1 | 38 |
| 2 | 2.1 | 2.1 | 47 |
| 2.5 | 2.1 | 2.2 | 57 |
| 3 | 2.1 | 6.9 | 67 |
| 3.5 | 2.2 | 83.5 | 70 |
| 4 | 2.2 | 1720.6 | 73 |
| 4.5 | 2.2 | — | 82 |
| 5 | 2.2 | — | 89 |

As apparently seen from Table 1 and Table 2, when all solution searching is performed without performing optimization searching, the calculation time increases exponentially in response to an increase in threshold value "ERROR". However, when optimization searching is performed, calculation can be completed substantially in a fixed time irrespective of any increase in threshold value "ERROR".

Further, where optimization processing is not involved but all solution searching is involved, when the analogy in general structure is high, the threshold value "ERROR"=4.0 angstrom is a limitation to extraction processing, and when the analogy in general structure is low, the threshold value "ERROR"=3.0 angstrom is a limitation to extraction processing. However, where optimization processing is involved, extraction processing can be performed with a higher value of the threshold value "ERROR", and accordingly, common structures can be extracted over a wider range and the accuracy in extraction can be improved significantly.

It is to be noted that, while, in the embodiment described above, three-dimensional structures are proteins, the present invention is not limited to this, and the three-dimensional structures which make an object for extraction of a common structure are not limited particularly if they have three-dimensional coordinates. Thus, applying the present technique to a three-dimensional structure such as RNA, a general molecular structure or the like which can be regarded as a set of sequenced points, similar effects to those of the present embodiment described above can be achieved.

However, where the three-dimensional structure is a substance, molecules or atoms constituting the substance are regarded as points and the three-dimensional structure is taken as a sequenced set of molecules or atoms sequenced in accordance with a predetermined array.

The present invention is not limited to the specifically described embodiment, and variations and modifications may be made without departing from the scope of the present invention.

What is claimed is:

1. A common structure extraction apparatus for extracting, from two point sets of sequenced points, a set of points of a common portion between the two point sets as a common structure between two three-dimensional structures formed by the two point sets, comprising:

an entire structure superposition section for relatively moving the two point sets in parallel and by rotating in accordance with partial matching information for partial matching between the two point sets to superpose the two point sets on each other;

a common portion length calculation section for calculating a number of points paired with each other to form at least one common portion between the two point sets superposed on each other by said entire structure superposition section as a common portion length;

a cumulative distance calculation section for accumulating distances between the points paired with each other to form the at least one common portion between the two point sets superposed on each other by said entire structure superposition section to obtain cumulative distance information for each of the at least one common portion; and a common portion extraction section for extracting from the at least one common portion between the two point sets an extracted common portion representing a common structure, based on maximizing the common portion length calculated by said common portion length calculation section while minimizing the cumulative distance information calculated by said cumulative distance calculation section.

2. A common structure extraction apparatus as claimed in claim 1, further comprising a cost function calculation section for calculating a cost function based on distances between points paired in the at least one common portion between the two point sets, said cost function calculation section calculating, when the at least one common portion includes a plurality of common portions having a plurality of routes with an equal longest common portion length, each time a point constituting any of the routes is successively searched out while said cumulative distance calculation section successively searches points constituting the routes to calculate the cumulative distance information, a value of the cost function at the point, and wherein said cumulative distance calculation section compares, when a certain point is searched out for a current route, a new value of the cost function calculated by said cost function calculation section at the certain point and an old value of the cost function calculated previously by said cost function calculation section at the certain point, and when the new value is equal to or higher than the old value, said cumulative distance calculation section stops searching for the current route and starts searching for a next route, but when the new value is lower than the old value, said cumulative distance calculation section continues searching for the current route.

3. A common structure extraction apparatus as claimed in claim 2, wherein the cost function is a cumulative sum of square values of distances between paired points from start points to searching points of the routes.

4. A common structure extraction apparatus as claimed in claim 2, further comprising a display section for displaying two three-dimensional structures formed from the two point sets based on the common structures extracted by said common portion extraction section in a superposed relationship with each other.

5. A common structure extraction apparatus as claimed in claim 4, wherein said display section displays the two three-dimensional structures as a three-dimensional graphic display.

6. A common structure extraction apparatus as claimed in claim 2, further comprising an alignment outputting section for outputting information regarding extracted points of the two point sets constituting the common structure extracted by said common portion extraction section in a juxtaposed relationship with each other in accordance with a sequence of the sequenced points in each of the point sets.

7. A common structure extraction apparatus as claimed in claim 2, further comprising a model structure outputting section for outputting the common structure extracted by said common portion extraction section as three-dimensional coordinate information.

8. A common structure extraction apparatus as claimed in claim 2, further comprising:
 a data inputting section for inputting partial structure information as information regarding a first one of the two point sets;
 a three-dimensional structure data base for storing in advance information regarding three-dimensional structures as information regarding a second one of the point sets;
 an analogous structure retrieval section for retrieving from said three-dimensional structure data base analogous three-dimensional structures analogous to the partial structure information inputted from said data inputting section; and
 an analogous structure outputting section for outputting information regarding the analogous three-dimensional structures retrieved by said analogous structure retrieval section and information regarding the common structure extracted by said common portion extraction section using each of the analogous three-dimensional structures as the partial matching information.

9. A common structure extraction apparatus as claimed in claim 2, further comprising:
 a data inputting section for inputting information regarding a partial structure having a known function as information regarding a first one of the two point sets;
 a three-dimensional structure data base for storing in advance information regarding three-dimensional structures as information regarding a second one of the point sets;
 a function location data base for storing relations between predetermined functions and three-dimensional structures relating to the predetermined functions;
 an analogous structure retrieval section for retrieving from said three-dimensional structure data base analogous three-dimensional structures analogous to the partial structure inputted from said data inputting section and having the known function; and
 a function location data base production section for outputting and registering information regarding the analogous three-dimensional structures retrieved by said analogous structure retrieval section, information regarding the common structure extracted by said common portion extraction section using each of the analogous structures as the partial matching information and information regarding the predetermined functions to and into said function location data base.

10. A common structure extraction apparatus as claimed in claim 2, further comprising:
 a data inputting section for inputting information regarding an object three-dimensional structure having an unknown function as information regarding one of the two points sets;
 a function location data base for storing relations between known functions and known three-dimensional structures relating to the known functions;
 an analogous structure retrieval section for retrieving analogous three-dimensional structures analogous to the three-dimensional structures stored in said function location data base from the object three-dimensional structure inputted from said data inputting section; and
 a function location outputting section for specifying and outputting an object function of the object three-dimensional structure and an object structure relating to the object function based on common structures between the object three-dimensional structure and the known three-dimensional structures stored in said function location data base, retrieved by said common portion extraction section using each of the analogous structures retrieved by said analogous structure retrieval section as the partial matching information.

11. A common structure extraction apparatus as claimed in claim 1, further comprising:
 a data inputting section for inputting information regarding an object three-dimensional structure having an unknown function as information regarding one of the two point sets;
 a function location data base for storing relations between known functions and known three-dimensional structures relating to the known functions;
 an analogous structure retrieval section for retrieving analogous three-dimensional structures analogous to the known three-dimensional structures stored in said function location data base from the object three-dimensional structure inputted from said data inputting section; and
 a function location outputting section for specifying and outputting an object function of the object three-dimensional structure and an object structure relating to the object function based on common structures between the object three-dimensional structure and the known three-dimensional structures stored in said function location data base, retrieved by said common portion extraction section using each of the analogous structures retrieved by said analogous structure retrieval section as the partial matching information.

12. A common structure extraction apparatus as claimed in claim 1, wherein said entire structure superposition section includes:
- a gravity center calculation section for calculating the centers of gravity of subsets of the two point sets matched with each other by the partial matching information;
- a parallelly moving section for parallelly moving the two point sets so that the two centers of gravity calculated by said gravity center calculation section may coincide with each other;
- a rotational angle calculation section for calculating a rotational angle around the centers of gravity necessary to superpose the subsets of the two point sets with each other; and
- a rotating superposition section for rotating an entire one of the two point sets by the rotational angle calculated by said rotational angle calculation section to superpose the entire two point set with each other.

13. A common structure extraction apparatus as claimed in claim 1, wherein said common portion length calculation section includes:
- a matching table production section for producing a matching table for storing combinations of points which may possibly be matched as a common portion between the two point sets superposed with each other by said entire structure superposition section; and
- a longest common portion length calculation section for calculating, based on the matching table produced by said matching table production section, a number of paired points in a point set matched as a common portion between the two point sets as a longest common portion length.

14. A common structure extraction apparatus as claimed in claim 1, wherein said cumulative distance calculation section calculates a square root of a mean square value of distances between points paired as a common portion between the two point sets superposed with each other by said entire structure superposition section as the cumulative distance information.

15. A common structure extraction apparatus as claimed in claim 1, wherein a common structure extracted by said common portion extraction section is used as the partial matching information, and a series of processes by said entire structure superposition section, said common portion extraction section are repeated recursively until the number of points to be paired as a common portion between the two point sets exhibits no more variation to extract an optimum common structure.

16. A common structure extraction apparatus as claimed in claim 1, further comprising an analogous structure retrieval section for dividing one of the two point sets in order beginning with a first one of points of the point set in accordance with a sequence of the points into subsets of a fixed number of points and searching a point set analogous to each of the subsets as an analogous structure from the other point set, the common structures being extracted using each of the analogous structures retrieved by said analogous structure retrieval section as the partial matching information.

17. A common structure extraction apparatus as claimed in claim 16, further comprising a display section for displaying two three-dimensional structures formed from the two points sets based on the common structures extracted by said common portion extraction section in a superposed relationship with each other.

18. A common structure extraction apparatus as claimed in claim 17, wherein said display section displays the two three-dimensional structures as a three-dimensional graphic display.

19. A common structure extraction apparatus as claimed in claim 16, further comprising an alignment outputting section for outputting information regarding those points of the two point sets which constitute the common structures extracted by said common portion extraction section in a juxtaposed relationship with each other in accordance with a sequence of the points in each of the point sets.

20. A common structure extraction apparatus as claimed in claim 16, further comprising a model structure outputting section for outputting the common structures extracted by said common portion extraction section as three-dimensional coordinate information.

21. A common structure extraction apparatus as claimed in claim 1, further comprising a nucleus structure extraction section for extracting, from the two point sets, a point set which makes a nucleus for appropriate superposition of the two point sets, as a nucleus structure, and wherein said nucleus structure extraction section divides one of the two point sets into segments of a fixed length in accordance with a sequence of points of the point set while successively displacing the start point for such point for such division one by one point beginning with the first point of the point set, retrieves point sets analogous to the segments obtained by the division as analogous structures from the other point set, select a most analogous one of the thus retrieved analogous structures as a nucleus structure, and outputs the thus selected nucleus structure as the partial matching information.

22. A common structure extraction apparatus as claimed in claim 21, wherein said nucleus structure extraction section allocates points of the two points sets to rows and columns in accordance with a sequence of the points and sets predetermined data at cross points of the rows and columns in accordance with the positions of the retrieved analogous structures on the two point sets to produce an analogous structure map in order to grasp a distribution of the analogous structures existing between the two points sets, and refers to the analogous structure map to extract the nucleus structure.

23. A common structure extraction apparatus as claimed in claim 22, further comprising:
- an analogy determination section for determining analogy between the two point sets having the common structures extracted by said common portion extraction section using each of the nucleus structure extracted by said nucleus structure extraction section as the partial matching information; and
- a display section for displaying, when said analogy determination section determines that the analogy between the two points sets having the common structures is high the common structures.

24. A common structure extraction apparatus as claimed in claim 22, further comprising:
- a data inputting section for inputting information regarding a three-dimensional structure having a known function as information regarding one of the two points sets and inputting information regarding a three-dimensional structure having an unknown function as information regarding the other point set;
- a function location data base for storing relations between certain functions and three-dimensional structures relating to the functions;
- a function estimation section for referring to said function location data base based on the common structures extracted by said common portion extraction section using, as the partial matching information, the nucleus structure extracted by said nucleus structure extraction section from the three-dimensional structure inputted from said data inputting section and having the known function and the three-dimensional structure having the unknown structure to perform function estimation of the three-dimensional structure having the unknown function; and a display section for displaying a function location of the three-dimensional structure having the unknown function, estimated by said function estimation section.

25. A common structure extraction apparatus as claimed in claim 21, further comprising a display section for displaying two three-dimensional structures formed from the two point sets based on the common structures extracted by said common portion extraction section in a superposed relationship with each other.

26. A common structure extraction apparatus as claimed in claim 25, wherein said display section displays the two three-dimensional structures as a three-dimensional graphic display.

27. A common structure extraction apparatus as claimed in claim 21, further comprising an alignment outputting section for outputting information regarding those points of the two point sets which constitute the common structures extracted by said common portion extraction section in a juxtaposed relationship with each other in accordance with a sequence of the points in each of the point sets.

28. A common structure extraction apparatus as claimed in claim 21, further comprising a model structure outputting section for outputting the common structures extracted by said common portion extraction section as three-dimensional coordinate information.

29. A common structure extraction apparatus as claimed in claim 21, further comprising:

an analogy determination section for determining analogy between the two point sets having the common structures extracted by said common portion extraction section using each of the nucleus structure extracted by said nucleus structure extraction section as the partial matching information; and a display section for displaying, when said analogy determination section determines that the analogy between the two points sets having the common structures is high the common structures.

30. A common structure extraction apparatus as claimed in claim 21, further comprising:

a data inputting section for inputting information regarding a three-dimensional structure having a known function as information regarding one of the two point sets and inputting information regarding a three-dimensional structure having an unknown function as information regarding the other point set;

a function location data base for storing relations between certain functions and three-dimensional structures relating to the functions;

a function estimation section for referring to said function location data base based on the common structures extracted by said common portion extraction section using, as the partial matching information, the nucleus structure extracted by said nucleus structure extraction section from the three-dimensional structure inputted from said data inputting section and having the known function and the three-dimensional structure having the unknown structure to perform function estimation of the three-dimensional structure having the unknown function; and a display section for displaying a function location of the three-dimensional structure having the unknown function, estimated by said function estimation section.

31. A common structure extraction apparatus as claimed in claim 1, further comprising a display section for displaying two three-dimensional structures formed from the two points sets based on the common structures extracted by said common portion extraction section in a superposed relationship with each other.

32. A common structure extraction apparatus as claimed in claim 31, wherein said display section displays the two three-dimensional structures as a three-dimensional graphic display.

33. A common structure extraction apparatus as claimed in claim 1, further comprising an alignment outputting section for outputting information regarding those points of the two point sets which constitute the common structures extracted by said common portion extraction section in a juxtaposed relationship with each other in accordance with a sequence of the points in each of the point sets.

34. A common structure extraction apparatus as claimed in claim 1, further comprising a model structure outputting section for outputting the common structure extracted by said common portion extraction as three-dimensional coordinate information.

35. A common structure extraction apparatus as claimed in claim 1, further comprising:

a data inputting section for inputting partial structure information as information regarding one of the two point sets;

a three-dimensional structure data base for storing in advance information regarding three-dimensional structures as information regarding the other point set;

an analogous structure retrieval section for retrieving three-dimensional structures analogous to the partial structure information inputted from said data inputting section as analogous structures from said three-dimensional structure data base; and an analogous structure, outputting section for outputting information regarding the analogous structures retrieved by said analogous structure retrieval section and information regarding the common structures extracted by said common portion extraction section using the analogous structures each as the partial matching information.

36. A common structure extraction apparatus as claimed in claim 1, further comprising:

a data inputting section for inputting information regarding a partial structure having a known function as information regarding one of the two point sets;

a three-dimensional structure data base for storing in advance information regarding three dimensional structures as information regarding the other point set;

a function location data base for storing relations between predetermined functions and three-dimensional structures relating to the functions;

an analogous structure retrieval section for retrieving three-dimensional structures analogous to the partial structure inputted from said data inputting section and having the know function as analogous structures from said three-dimensional structure database; and a function location data base production section for outputting and registering information regarding the analogous structures retrieved by said analogous structure retrieval section, information regarding the common structures extracted by said common portion extraction section using each of the analogous structures as the partial matching information and information regarding the predetermined functions to and into said function location data base.

37. A common structure extraction apparatus as claimed in claim 1, wherein each of the three-dimensional structures is a three-dimensional structure of a substance, and each of the point sets is taken, regarding molecules or atoms constituting the substance as points, as a sequenced set of such molecules or atoms sequenced in accordance with a predetermined array.

38. A common structure extraction apparatus as claimed in claim 1, wherein each of the three-dimensional structures in a three-dimensional structure of a protein, and each of the point sets is taken, regarding amino acids constituting the protein as points, as a sequenced set of the amino acids sequenced in accordance with array numbers of the amino acids.

* * * * *

UNITED STATES PATENT AND TRADEMARK OFFICE
CERTIFICATE OF CORRECTION

PATENT NO. : 6,453,064 B1
DATED : September 17, 2002
INVENTOR(S) : Seiichi Aikawa et al.

It is certified that error appears in the above-identified patent and that said Letters Patent is hereby corrected as shown below:

Title page,
Item [56], OTHER PUBLICATIONS, "Alexandrov, et al.," reference, change "Homogous" to -- Homologous --.

Column 63,
Line 19, change "set" to -- sets --; and
Line 47, (by counting lines, although appears to be line 46), after "portion" insert -- length calculation section, said cumulative distance calculation section and said common portion --.

Column 64,
Line 29, (by counting lines, although appears to be line 28), change "select" to -- selects --;
Line 54, (by counting lines, although appears to be line 53), change "points" to -- point --;
Line 55, (by counting lines, although appears to be line 54), after "high" insert -- , --; and
Line 60, (by counting lines, although appears to be line 59), change "points" to -- point --.

Column 65,
Line 45, (by counting lines, although appears to be line 46), change "points" to -- point --; and
Line 46, (by counting lines, although appears to be line 47), after "high" insert -- , --.

Column 66,
Line 11, (by counting lines, although appears to be line 12), change "points" to -- point --; and
Line 28, (by counting lines, although appears to be line 29), after "extraction" insert -- section --.

UNITED STATES PATENT AND TRADEMARK OFFICE
CERTIFICATE OF CORRECTION

PATENT NO. : 6,453,064 B1
DATED : September 17, 2002
INVENTOR(S) : Seiichi Aikawa et al.

It is certified that error appears in the above-identified patent and that said Letters Patent is hereby corrected as shown below:

Column 67,
Line 2, change "know" to -- known --.

Column 68,
Line 8, (by counting lines, although appears to be line 9), change "in" to -- is --.

Signed and Sealed this

First Day of April, 2003

JAMES E. ROGAN
*Director of the United States Patent and Trademark Office*